US008880552B2

(12) United States Patent
Matsumura et al.

(10) Patent No.: US 8,880,552 B2
(45) Date of Patent: Nov. 4, 2014

(54) DATABASE SYSTEM AND DATABASE CONTROL METHOD

(75) Inventors: Ryo Matsumura, Kawasaki (JP); Tomoaki Mizoo, Kawasaki (JP); Yasuki Yoshihashi, Kawasaki (JP); Shoichi Kogiso, Kawasaki (JP)

(73) Assignee: Fujitsu Limited, Kawasaki-shi (JP)

( * ) Notice: Subject to any disclaimer, the term of this patent is extended or adjusted under 35 U.S.C. 154(b) by 94 days.

(21) Appl. No.: 12/987,607

(22) Filed: Jan. 10, 2011

(65) Prior Publication Data
US 2011/0173233 A1 Jul. 14, 2011

(30) Foreign Application Priority Data
Jan. 13, 2010 (JP) .................. 2010-005106

(51) Int. Cl.
G06F 17/30 (2006.01)
G06F 11/20 (2006.01)
(52) U.S. Cl.
CPC ........ *G06F 11/2028* (2013.01); *G06F 11/2038* (2013.01); *G06F 11/2048* (2013.01)
USPC ..................................................... 707/781
(58) Field of Classification Search
None
See application file for complete search history.

(56) References Cited

U.S. PATENT DOCUMENTS 6,199,069 B1 * 3/2001 Dettinger et al. ............ 1/1
7,650,369 B2 1/2010 Taniguchi et al.
2006/0253727 A1 * 11/2006 Leveille et al. ............ 714/4
2007/0033236 A1 2/2007 Kaneko et al.
2007/0233699 A1 * 10/2007 Taniguchi et al. ......... 707/10
2008/0104347 A1 * 5/2008 Iwamura et al. ........... 711/162

FOREIGN PATENT DOCUMENTS

JP 2006-526212 A 11/2006
JP 2007-041888 A 2/2007
JP 2007-293821 A 11/2007

OTHER PUBLICATIONS

Japanese Office Action issued Dec. 3, 2013 in Japanese Patent Application No. 2010-005106 with partial English Translation.
Takizawa, Takashi. "Clustering Today Starting with DRBD—Apache, DB, iSCSI—", SoftwareDesign, Japan, Gijutsu-Hyohron Co., Ltd., Jun. 18, 2009, The 290th issue (No. 224), pp. 18-25.

* cited by examiner

*Primary Examiner* — Usmaan Saeed
*Assistant Examiner* — Yu Zhao
(74) *Attorney, Agent, or Firm* — Oblon, Spivak, McClelland, Maier & Neustadt, L.L.P.

(57) ABSTRACT

A database control method comprising a first main system processing in which, upon first data being stored in a second storage unit included in a second server communicably connected with the first server, the first data is stored in a first storage unit following instructions from a host computer, a first inhibiting processing in which, upon detecting an abnormality in communication with the second server, storing the first data in the first storage unit following instructions from a host computer is inhibited, a first query processing performing a first query to an arbitrating device arbitrating between the first server and the second server, and a processing executing or stopping the first main system processing in accordance with instructions from the arbitrating device.

21 Claims, 32 Drawing Sheets

DATABASE SYSTEM AND DATABASE CONTROL METHOD

CROSS-REFERENCE TO RELATED APPLICATIONS

This application is based upon and claims the benefit of priority of the prior Japanese Patent Application No. 2010-005106, filed on Jan. 13, 2010, the entire contents of which are incorporated herein by reference.

FIELD

The present invention relates to a database system and a database control method.

BACKGROUND

With a database system having multiple systems such as a main system and a sub system, such that a database is redundant, a user needs to judge switchover of systems and manually switch systems over in the event that there is no device to perform arbitration of the systems. A device which performs arbitration of the systems is called an "arbitrating device".

On the other hand, with a database system having an arbitrating device, the user visually confirms that the main system database is stopped before switching systems, since there may be network failure between the arbitrating device and the databases of the systems, or the database itself may be busy.

There are known database reconfiguration devices relating to the above art, which enable transition to a database without dependency on a database management method and without practically stopping online services (e.g., Japanese Unexamined Patent Application Publication No. 2007-041888).

Also, there are known database systems which, in the event that the database device of the main center becomes unusable, speedily perform work to switch to operations at the database device a sub center, and following restoration return operations to the database device of the main center without copying all records (e.g., Japanese Unexamined Patent Application Publication No. 2007-293821).

With a database system in which the database is redundant over multiple systems, and each system independently has a storage medium for storing the database, a situation wherein databases at multiple systems are capable of being updated at the same time when the main system or sub system goes down needs to be prevented. A state wherein databases at multiple systems are capable of being updated at the same time is called a "split-brain state".

In this case, the main system and sub system need to monitor each other and each decide state transition for itself in accordance with the change in state of the other. However, there has been a problem in that, in the event that there is an abnormality in a path between systems communicably connecting the main system and sub system, each system cannot detect the change in state of the other, meaning that each system is incapable of deciding state transition of itself.

Using an arbitrating device to perform arbitration between the systems has been conceived to solve this problem.

FIG. 1 is a diagram illustrating a database system 100 including a first database server 101 and database 102 making up a main system, a second database server 103 and database 104 making up of sub system, and an arbitrating device 105 for performing arbitration regarding the states of the systems. The numbers (1) through (6) in FIG. 1 correspond to the following descriptions (1) through (6).

The first database server 101 manages and controls the database 102. For example, the first database server 101 manages and controls the state and so forth of the system of the database 102. In the same way, the second database server 103 manages and controls the database 104. For example, the second database server 103 manages and controls the state and so forth of the system of the database 104.

Also, the first database server 101 and second database server 103 have an update inhibition flag to be used to control updating of databases. In the event that the update inhibition flag is set to "valid", updating of the database is inhibited. Also, in the event that "invalid" is set for the update inhibition flag, the database can be updated.

In FIG. 1, the first database server 101 is the main system, so the update inhibition flag is set to "invalid". Also, the second database server 103 is the sub system, so the update inhibition flag is set to "valid".

(1) Let us consider a case where, for example, trouble occurs on the network communicably connecting the first database server 101 and the second database server 103, such as line breakage, and the first database server 101 and the second database server 103 are in an incommunicable state with each other.

(2) In this case, upon detecting that the first database server 101 and the second database server 103 are in an incommunicable state with each other, the second database server 103 makes a state transition query to the arbitrating device 105.

(3) In response, the arbitrating device 105 gives a stop instruction to the first database server 101.

(4) At the same time, the arbitrating device 105 gives a promoted main system instruction to the second database server 103, to switch over from sub system to main system.

(5) Upon receiving the promoted main system instruction, the second database server 103 changes the update inhibition flag from "valid" to "invalid". Subsequently, the second database server 103 takes over for the first database server 101 and operates as the main system.

(6) Now, in order for the second database server 103 to take over for the first database server 101 and operate as the main system, the first database server 101 operating as the main system needs to be in a stopped state, i.e., the update inhibition flag needs to be set to "valid". However, if the first database server 101 does not stop operations before the second database server 103 takes over for the first database server 101 and starts operating as the main system, the main system and sub system will be in a split brain state. Thus, there is a problem in that there are cases wherein a split brain state cannot be prevented.

SUMMARY

According to an aspect of the embodiment, a database control method includes: executing, by a first server; a first main system processing in which, upon first data being stored in a second storage means included in a second server communicably connected with the first server, said first data is stored in a first storage means following instructions from a host computer, a first inhibiting processing in which, upon detecting an abnormality in communication with the second server, storing the first data in the first storage means following instructions from a host computer is inhibited, a first query processing performing a first query to an arbitrating device arbitrating between the first server and the second server, and a processing executing or stopping the first main system processing in accordance with instructions from the arbitrating device; and executing by the second server; a sub system processing in which the first data is stored in the second storage means following instructions from the first server, a second inhibiting processing in which, upon detecting an abnormality in communication between the first server and the second server, reception of requests from the first server is inhibited, a second query processing performing a second query to the arbitrating device, and a processing executing or stopping second main system processing storing the first data in the second storage means following instructions from the host computer in accordance with instructions from the arbitrating device, wherein the arbitrating device, in the event of receiving the first query from the first server, instructs the second server to stop processing and also instructs the first server to execute the first main system processing, and in the event of receiving the second query from the second server, instructs the first server to stop processing and also instructs the second server to execute the second main system processing.

The object and advantages of the embodiment will be realized and attained by at least the elements, features, and combinations particularly pointed out in the claims.

It is to be understood that both the foregoing general description and the following detailed description are exemplary and explanatory and are not restrictive of the embodiment, as claimed.

BRIEF DESCRIPTION OF THE DRAWINGS

FIG. 31 us a diagram illustrating a problem in which both systems of a database system stop due to an abnormality such as network line breakage or the like.

DESCRIPTION OF EMBODIMENTS

The following is a description of an example of embodiments of a present database system, with reference to FIGS. 2 through 32.

First Embodiment

Figure 1:
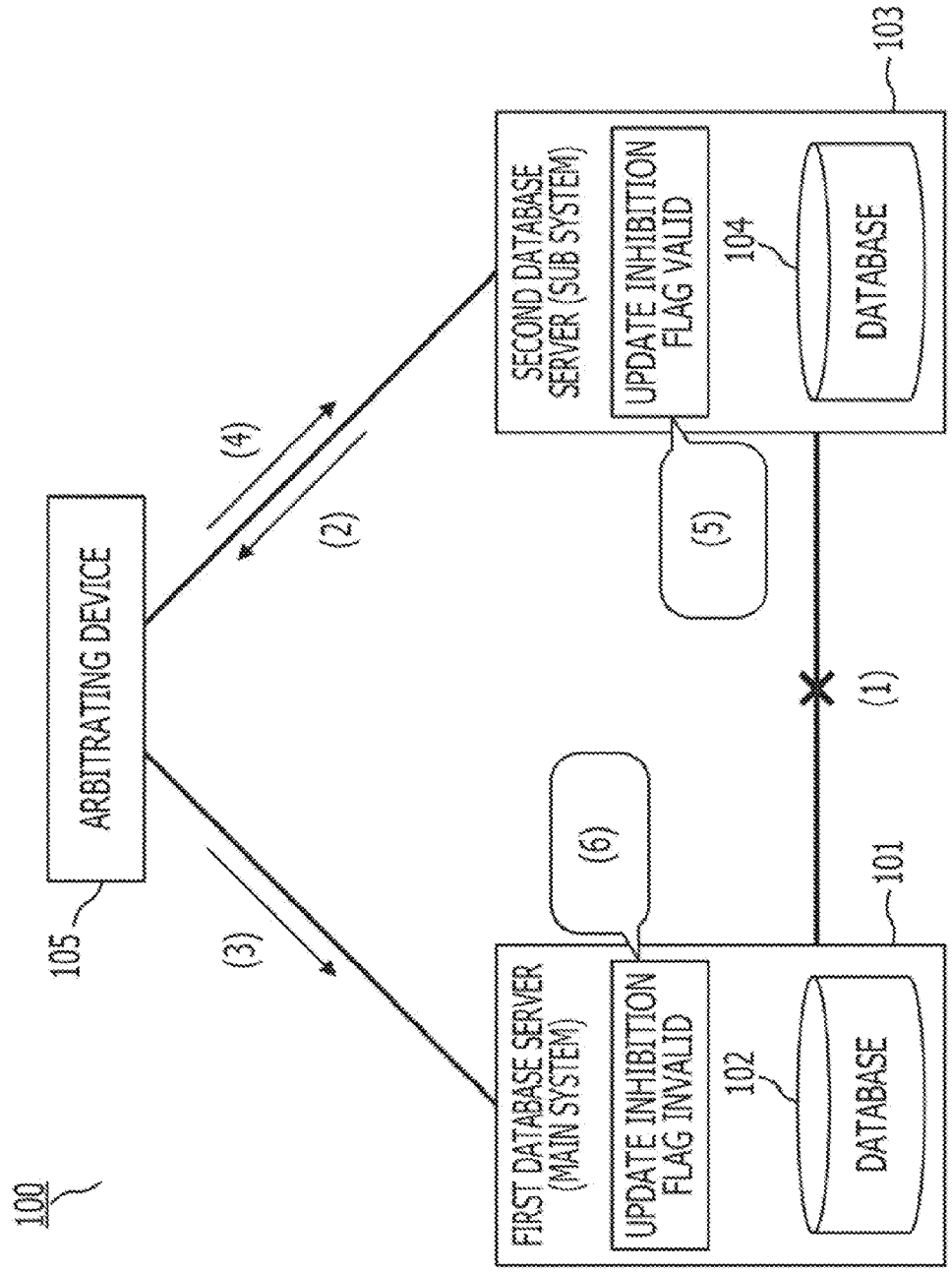
FIG. 1 is a diagram for describing a database system having an arbitrating device.
Figure 2:
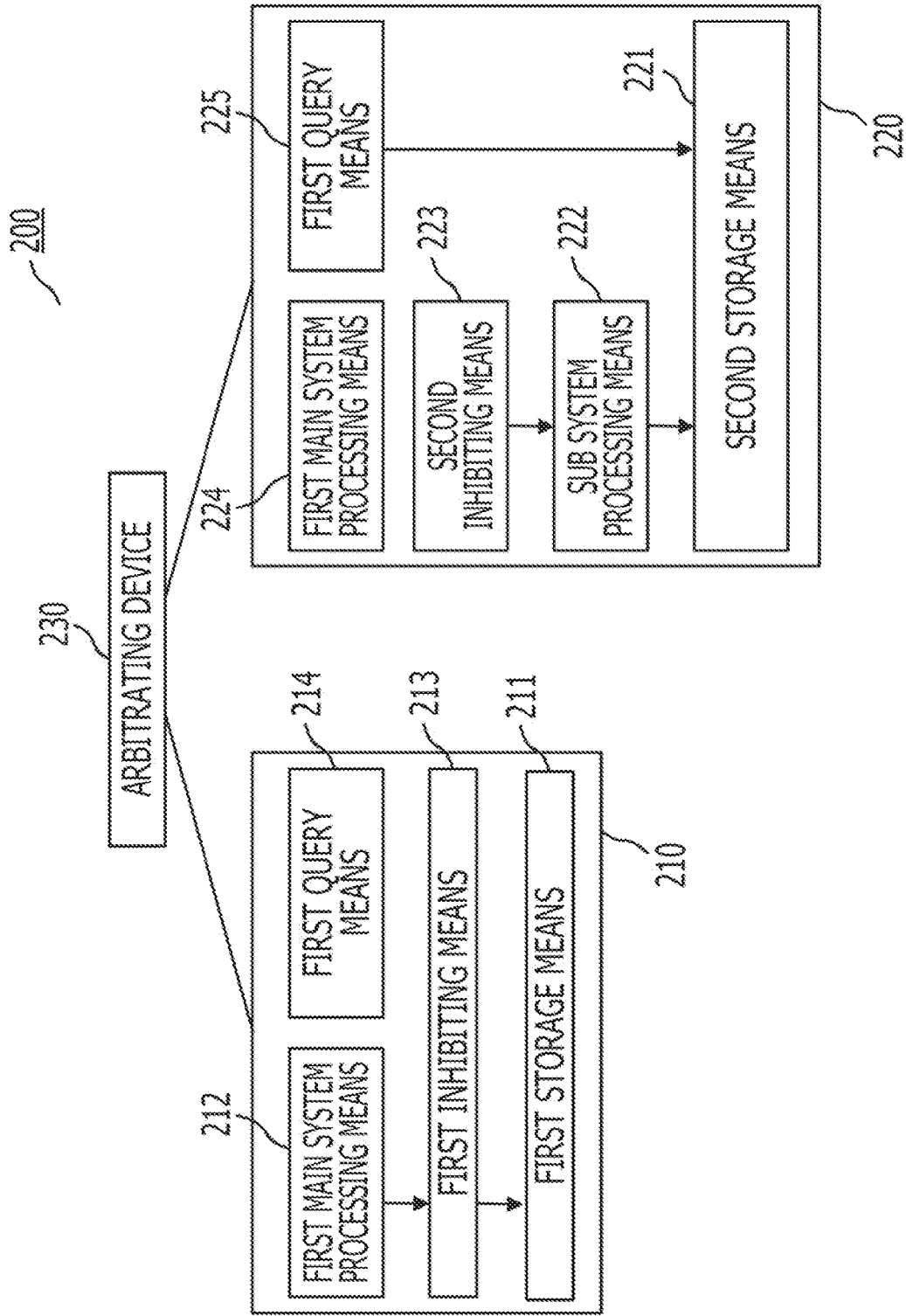
FIG. 2 is a diagram for describing a database system according to a first embodiment.

FIG. 2 is a diagram for describing a database system 200 according to the present embodiment.

The database system 200 includes a first server 210, a second server 220, and arbitrating means 230. The first server 210, second server 220, and arbitrating means 230 are connected so as to be mutually communicable.

The first server 210 includes first storage means 211, first main system processing means 212, first inhibiting means 213, and first query means 214.

The first storage means 211 are storage means for storing data. For example, the first storage means 211 can store a database. Hereinafter, any data stored in the first storage means 211 will be referred to as "first data".

The first main system processing means 212 store first data in the first storage means 211 under instructions from a host computer 306. For example, the first main system processing means 212 perform a series of updating processing including adding, deleting changing, etc., of data with regard to a database table stored in the first storage means 211, under instructions of a host computer 306.

The first inhibiting means 213 inhibit the first main system processing means 212 from storing first data in the first storage means 211.

The first query means 214 perform a first query as to the arbitrating means 230. An example of a first query is a query regarding subsequent operations of the first server 210.

Also, the second server 220 includes second storage means 221, sub system processing means 222, second inhibiting means 223, second query means 224, and second main system processing means 225.

The second storage means 221 are storage means for storing data. For example, the second storage means 221 can store a database.

The sub system processing means 222 store first data in the second storage means 221 under request from the first server 210. For example, the sub system processing means 222 perform a series of updating processing including adding, deleting changing, etc., of data with regard to a database table stored in the second storage means 221, under request from the first server 210. Due to this processing, first data which is the same as the data stored in the first storage means 211, can be stored in the second storage means 221.

The second inhibiting means 223 inhibit reception of requests from the first server 210. Due to this processing, the sub system processing means 222 can be inhibited from storing first data in the second storage means 221.

The second query means 224 performs a second query as to the arbitrating means 230. An example of a second query is a query regarding subsequent operations of the second server 220.

The second main system processing means 225 store first data in the second storage means 221 under instructions from a host computer 306. For example, the second main system processing means 225 perform a series of updating processing including adding, deleting changing, etc., of data with regard to a database table stored in the second storage means 221, under instructions of a host computer 306.

Upon receiving a first query from the first server 210, the arbitrating means 230 instruct the second server 220 to stop processing, and also instructs the first server 210 to execute the first main system processing means 212. Also, upon receiving a second query from the second server 220, the arbitrating means 230 instruct the first server 210 to stop processing, and also instructs the second server 220 to execute the second main system processing means 225.

With the above configuration, upon the second server 220 executing the sub system processing means 222 to store the first data in the second storage means 221, the first server 210 executes the first main system processing means 212 to store the first data in the first storage means 211.

Also, upon detection of an abnormality in communication between the first server 210 and the second server 220, the first server 210 inhibits execution of the first main system processing means 212 with the first inhibiting means 213. The first server 210 then makes a first query to the arbitrating means 230.

Upon receiving an instruction from the arbitrating means 230 to execute the first main system processing means 212, the first server 210 starts execution of the first main system processing means 212. Also, upon receiving an instruction from the arbitrating means 230 to stop processing, the first server 210 stops processing.

Also, upon detection of an abnormality in communication between the first server 210 and the second server 220, the second server 220 inhibits execution of the sub system processing means 222 with the second inhibiting means 223. The second server 220 then makes a second query to the arbitrating means 230.

Upon receiving an instruction from the arbitrating means 230 to execute the second main system processing means 225, the second server 220 starts execution of the second main system processing means 225. Also, upon receiving an instruction from the arbitrating means 230 to stop processing, the second server 220 stops processing.

As described above, upon detecting an abnormality in communication between the first server 210 and the second server 220, the second server 220 executes the second inhibiting means 223 to inhibit reception of requests from the first server 210. Accordingly, storing of first data in the second storage means 221 by the sub system processing means 222 is inhibited.

On the other hand, upon the second server 220 executing the sub system processing means 222 and storing the first data in the second storage means 221, the first server 210 executes the first main system processing means 212 to store the first data in the first storage means 211. Accordingly, processing of storing the first data in the first storage means 211 by the first main system processing means 212 is also inhibited.

As a result, a state in which the first server 210 executes the first main system processing means 212 during a period in which a processing stop instruction from the arbitrating means 230 is not notified to the first server 210 for some reason or another, i.e., a split brain state, can be prevented. Accordingly, the database system 200 can switch systems from the first server 210 to the second server 220 without being in a split brain state.

Second Embodiment

Figure 3:
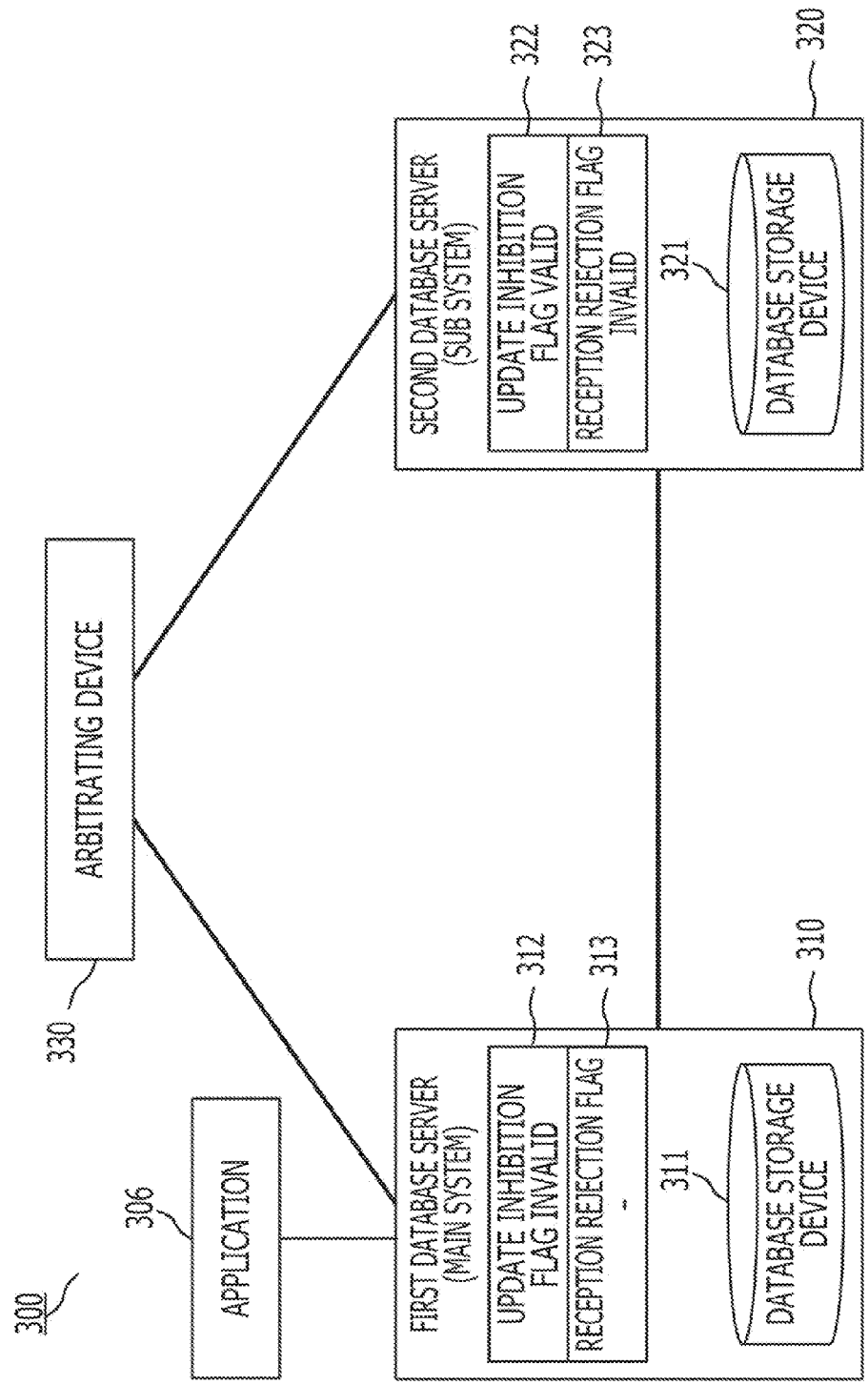
FIG. 3 is a diagram for describing a configuration example of a database system according to a second embodiment.

FIG. 3 is a diagram illustrating a configuration example of a database system 300 according to the present embodiment.

The database system 300 according to FIG. 3 includes a first database server 310, a second database server 320, and an arbitrating device 330. The first database server 310, second database server 320, and arbitrating device 330 connected via a network so as to be mutually communicable. Note however, that the first database server 310, second database server 320, and arbitrating device 330 may be connected so as to be mutually communicable via a dedicated line or the like.

Figure 32:
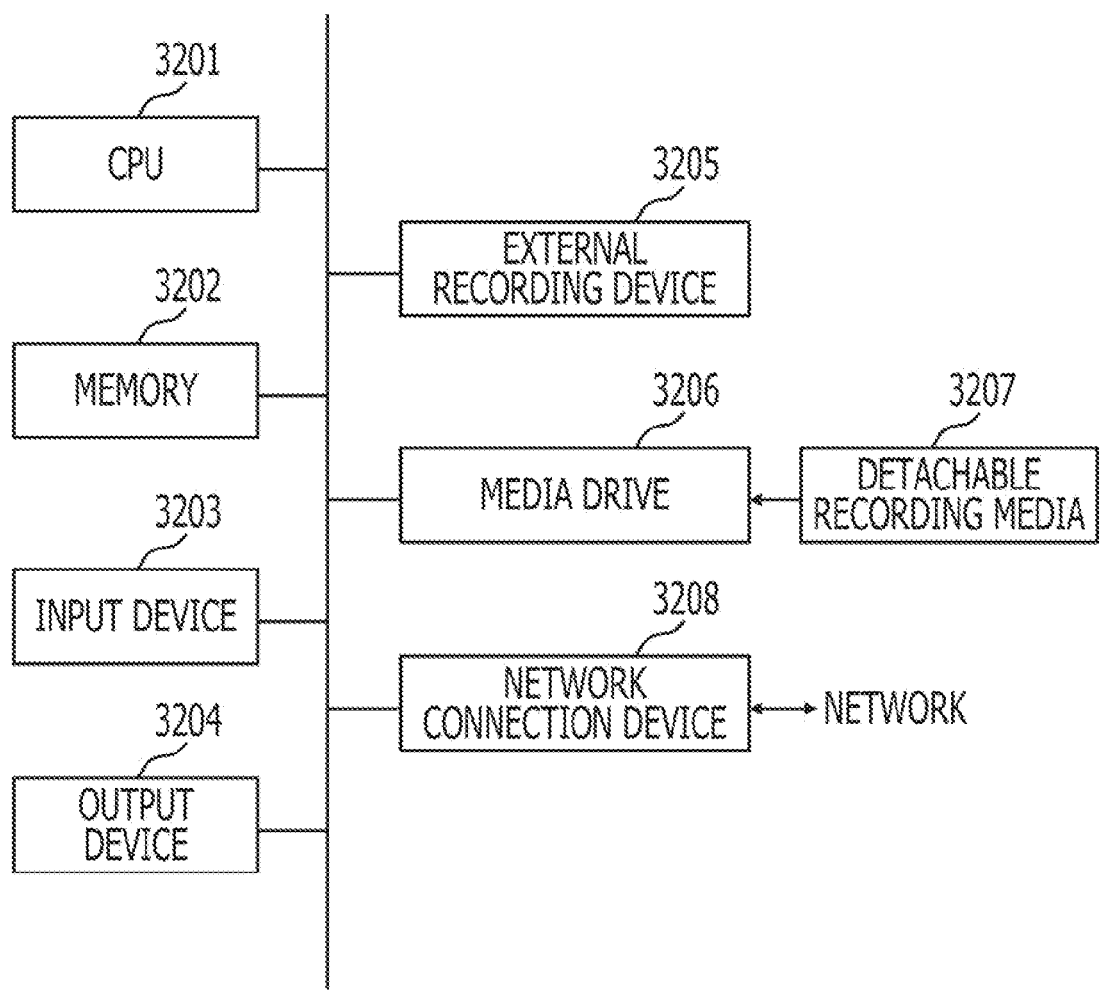
FIG. 32 is a diagram illustrating a specific configuration example of a device for realizing a first database server, a second database server, and a arbitrating device, according to the second through fourth embodiments.

The database system 300 in FIG. 3 illustrates a case wherein the first database server 310 is the main system and the second database server 320 is the sub system. The first database server 310, second database server 320, and arbitrating device 330 can be realized by causing an information processing device of a configuration such as illustrated in FIG. 32 to execute a specified program, for example.

The first database server 310 has a database storage device 311 to be used for databases. The database storage device 311 can be realized by an external storage device 3205 illustrated in FIG. 32, for example.

The first database server 310 operating as the main system performs a series of updating processing including adding, deleting changing, searching, etc., of data with regard to a database table stored in the database storage device 311 for example, under request from a host computer 306. The first database server 310 stores the series of updating processing in the database storage device 311 or the like, as a log. Hereinafter, this series of updating processing will be referred to as "transaction processing", and the log of this transaction processing will be referred to as an "update log".

Also, upon receiving a commit request from the host computer 306, the first database server 310 performs commit processing to permanently reflect the contents of the transaction processing in the database. Upon receiving a rollback request from the host computer 306, the first database server 310 executes rollback processing to restore the state of the database to the state at which the commit processing was performed earlier.

The first database server 310 also has an update inhibition flag 312 and a reception rejection flag 313, in memory 3202 or the like illustrated in FIG. 32 for example.

The update inhibition flag 312 is information used for update control of the database. For example, in the event that the update inhibition flag 312 is set to "invalid", the first database server 310 performs updating of the database, but in the event that the update inhibition flag 312 is set to "valid", the first database server 310 performs no updating of the database.

The reception rejection flag 313 is information used for reception control, such as update logs and commit requests transmitted from the main system. In a case in which the first database server 310 is operating as the main system, the reception rejection flag 313 is not used. In this case, the reception rejection flag 313 is not indispensable information. In FIG. 3, a hyphen "-" is shown for the reception rejection flag 313, indicating that the reception rejection flag 313 is unused.

The second database server 320 has a database storage device 321 to be used for databases. The database storage device 321 can be realized by the external storage device 3205 illustrated in FIG. 32, for example.

The second database server 320 operating as the sub system receives an update log from the first database server 310 operating as the main system. The second database server 320 then performs a series of updating processing including adding, deleting changing, searching, etc., of data with regard to a database table stored in the database storage device 321 for example, i.e., transaction processing, following the update log. The second database server 320 stores the updated processing in the database storage device 321 or the like as an update log.

Also, upon receiving a commit request from the first database server 310, the second database server 320 performs commit processing to permanently reflect the contents of the transaction processing in the database. Also, upon receiving a rollback request from the first database server 310, the second database server 320 executes rollback processing to restore the state of the database to the state at which the commit processing was performed earlier.

Also, the second database server 320 has an update inhibition flag 322 and a reception rejection flag 323, in memory 3202 or the like illustrated in FIG. 32 for example.

The update inhibition flag 322 is information used for update control of the database. For example, in the event that the update inhibition flag 322 is set to "invalid", the second database server 320 performs updating of the database, but in the event that the update inhibition flag 322 is set to "valid", the second database server 320 performs no updating of the database.

The reception rejection flag 323 is information used for reception control, such as update logs and commit requests transmitted from the main system. For example, in the event that the reception rejection flag 323 is set to "invalid", the second database server 320 receives update logs and commit requests and so forth transmitted from the first database server 310. Also, in the event that the reception rejection flag 313 is set to "valid", the second database server 320 does not receive the update logs and commit requests and so forth transmitted from the first database server 310.

The arbitrating device 330 performs state transition instruction such as giving stopping instructions in accordance with the state of the first database server 310 and the second database server 320, thereby performing arbitration of the states of the first database server 310 and the second database server 320.

The host computer 306 executes an application providing a business service, for example. The host computer 306 then requests the first database server 310 or second database server 320 for desired transaction processing, commit processing, and so forth, following the application.

With the database system 300 according to the present embodiment, the main system can make transition between the following states as necessary.

Figure 4:
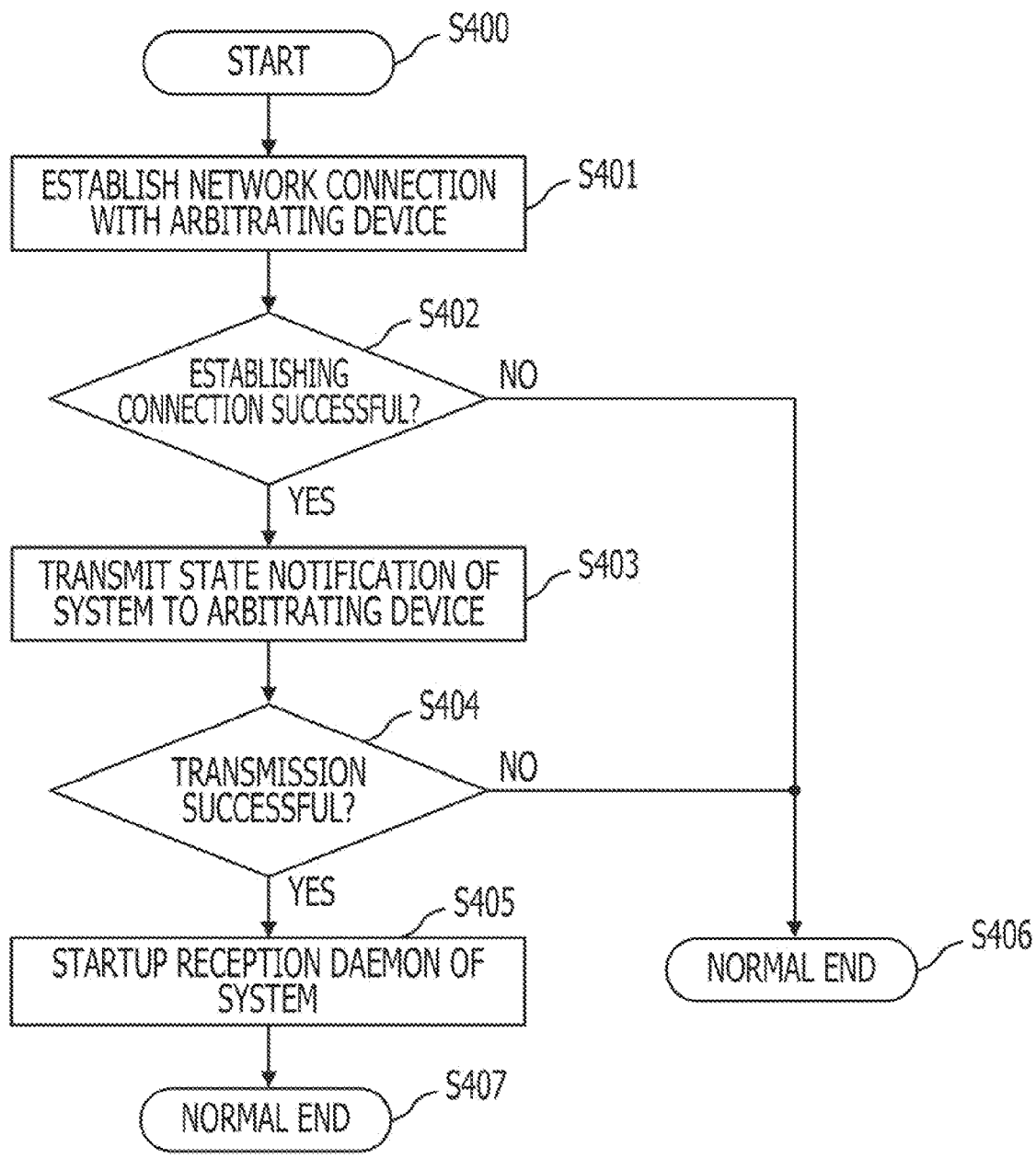
FIG. 4 is a flowchart illustrating startup processing of a main system and sub system according to the second embodiment.

FIG. 4 is a flowchart illustrating startup processing of a main system and sub system according to the present embodiment. Note that the startup processing of the first database server 310 and the second database server 320 is the same, so only the processing of the first database server 310 is illustrated in FIG. 4.

Upon the power being turned on to the first database server 310, the first database server 310 starts the startup processing (step S400).

In step S401, the first database server 310 establishes a network connection with the arbitrating device 330. Upon succeeding in establishing the network connection (YES in step S402), the first database server 310 transitions the processing to step S403. Also, in the event of failing in establishing the network connection (NO in step S402), the first database server 310 transitions the processing to step S406 and abends.

In step S403, the first database server 310 transmits to the arbitrating device 330 a state notification of the system, notifying the state of the system.

In step S404, the first database server 310 distinguishes whether or not the transmission of the state notification of the system in step S403 has succeeded. For example, the first database server 310 can distinguish whether or not the transmission of the state notification of the system has succeeded, based on whether or not there has been an ACK (ACKnowledgement) from the arbitrating device 330 as to the state notification of the system.

In the event that transmission of the state notification of the system has succeeded (YES in step S404), the first database server 310 performs startup of a reception daemon which performs reception processing for the system (step S405). The first database server 310 then performs a normal end of the startup processing (step S407). On the other hand, in the event that transmission of the state notification of the system has failed (NO in step S404), the first database server 310 transitions the processing to step S406 and abends. Note that the processing of the reception daemon of the system will be described with reference to FIG. 8.

Figure 5:
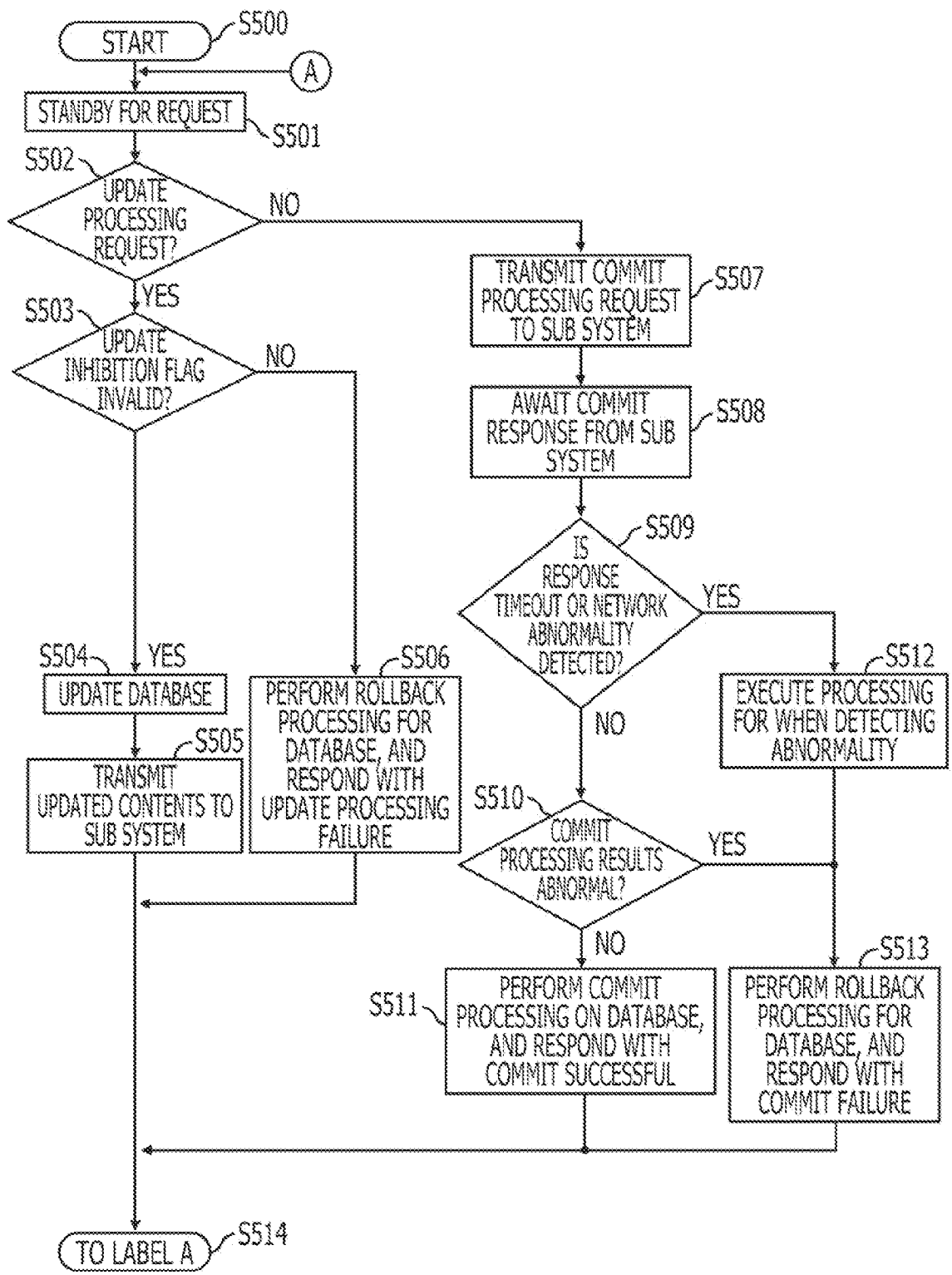
FIG. 5 is a flowchart illustrating transaction processing of the main system according to the second embodiment.

FIG. 5 is a flowchart illustrating transaction processing of the main system according to the present embodiment. Note that FIG. 5 illustrates the transaction processing of the main system in the event that the first database server 310 is operating as the main system and the second database server 320 as the sub system.

Upon startup processing ending (step S500), the first database server 310 goes into a request reception standby state from the host computer 306 (step S501). Upon receiving a request from the host computer 306, the first database server 310 transitions the processing to step S502.

In step S502, if judgment is made that the request is an update processing request from the host computer 306 (YES in step S502), the first database server 310 transitions the processing to step S503.

In step S503, the first database server 310 references the update inhibition flag 312 which the memory 3202 or the like illustrated in FIG. 32 has, for example. In the event that the update inhibition flag 312 is set to "invalid" (YES in step S503), the first database server 310 follows the update processing request from the host computer 306 to perform database update processing, i.e., transaction processing (step S504).

In step S505, when the transaction processing ends, the first database server 310 transmits, to the second database server 320 which is the sub system, an update processing request, and also an update log in which is stored the contents of updating of the database by the update processing performed in step S504. The first database server 310 goes to step S514. The first database server 310 then restarts processing from step S501.

In the event that the update inhibition flag 312 is set to "valid" in step S503 (NO in step S503), the first database server 310 transitions the processing to step S506. The first database server 310 then performs rollback processing of the database. The first database server 310 then transmits a commit response to the host computer 306 to the effect that the update processing has failed.

On the other hand, in the event that judgment is made in step S502 that the request from the host computer 306 is a commit processing request (NO in step S502), the first database server 310 transmits a commit request to the second database server 320 which is the sub system (step S507). The first database server 310 then goes into a standby state for response from the sub system regarding the commit processing request (step S508). A response at this time is referred to as a "commit response".

In step S509, in the event that a commit response is received without detecting a commit response timeout or a network abnormality between the main system and the sub system (NO in step S509), the first database server 310 transitions the processing to step S510.

In step S510, in the event that the commit processing results are normal, i.e., in the event that the commit processing has ended successfully (NO in step S510), the first database server 310 performs commit processing as to the database. The first database server 310 then transmits a commit response to the host computer 306 to the effect that the commit processing has succeeded.

Figure 7:
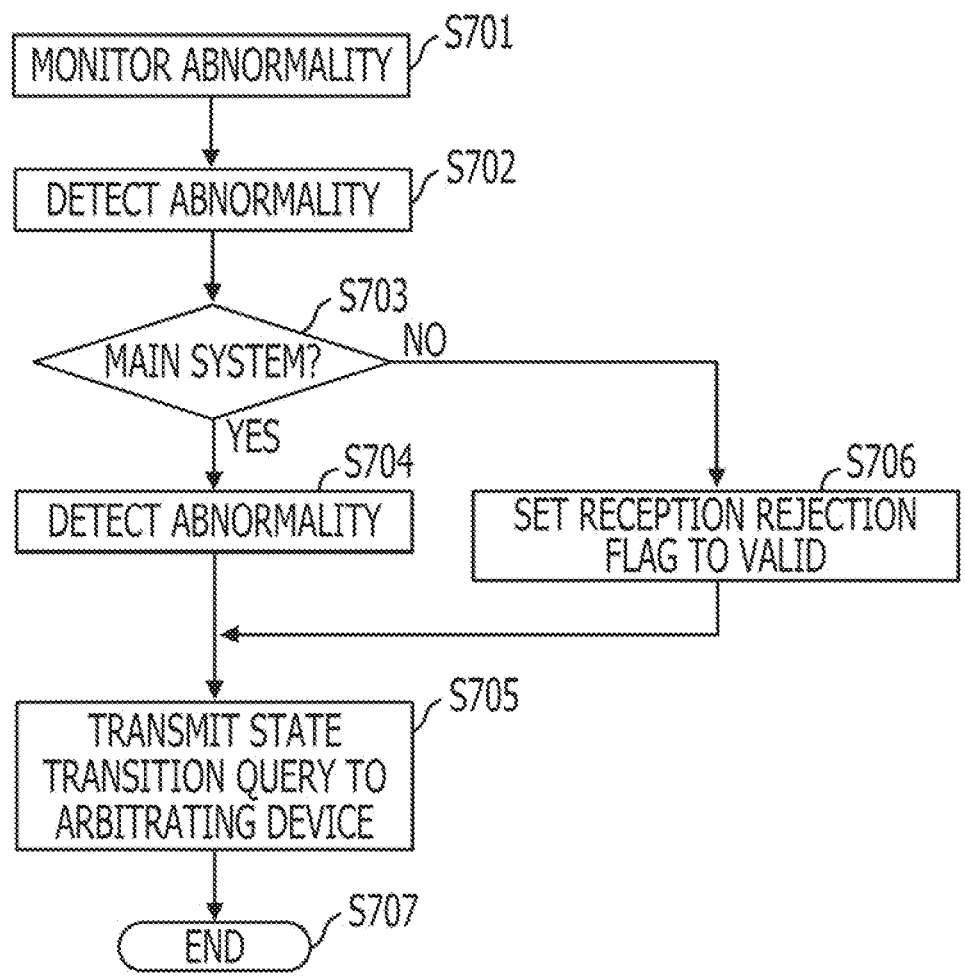
FIG. 7 is a flowchart illustrating system abnormality detection processing according to the second embodiment.

On the other hand, in the event that in step S509, a commit response timeout or a network abnormality between the main system and the sub system has been detected (YES in step S509), the first database server 310 executes processing illustrated in FIG. 7 to be performed when detecting an abnormality (step S512). The first database server 310 then transitions the processing to step S513.

Also, in the event that the commit processing results in step S510 are abnormal, i.e., in the event that the commit processing has abended (YES in step S510), the first database server 310 transitions the processing to step S513.

In step S513, the first database server 310 performs rollback processing of the database. The first database server 310 then transmits a commit response to the host computer 306 to the effect that the commit processing has failed.

Upon the above processing ending, the first database server 310 goes to step S514. The first database server 310 then restarts processing from step S501.

Figure 6:
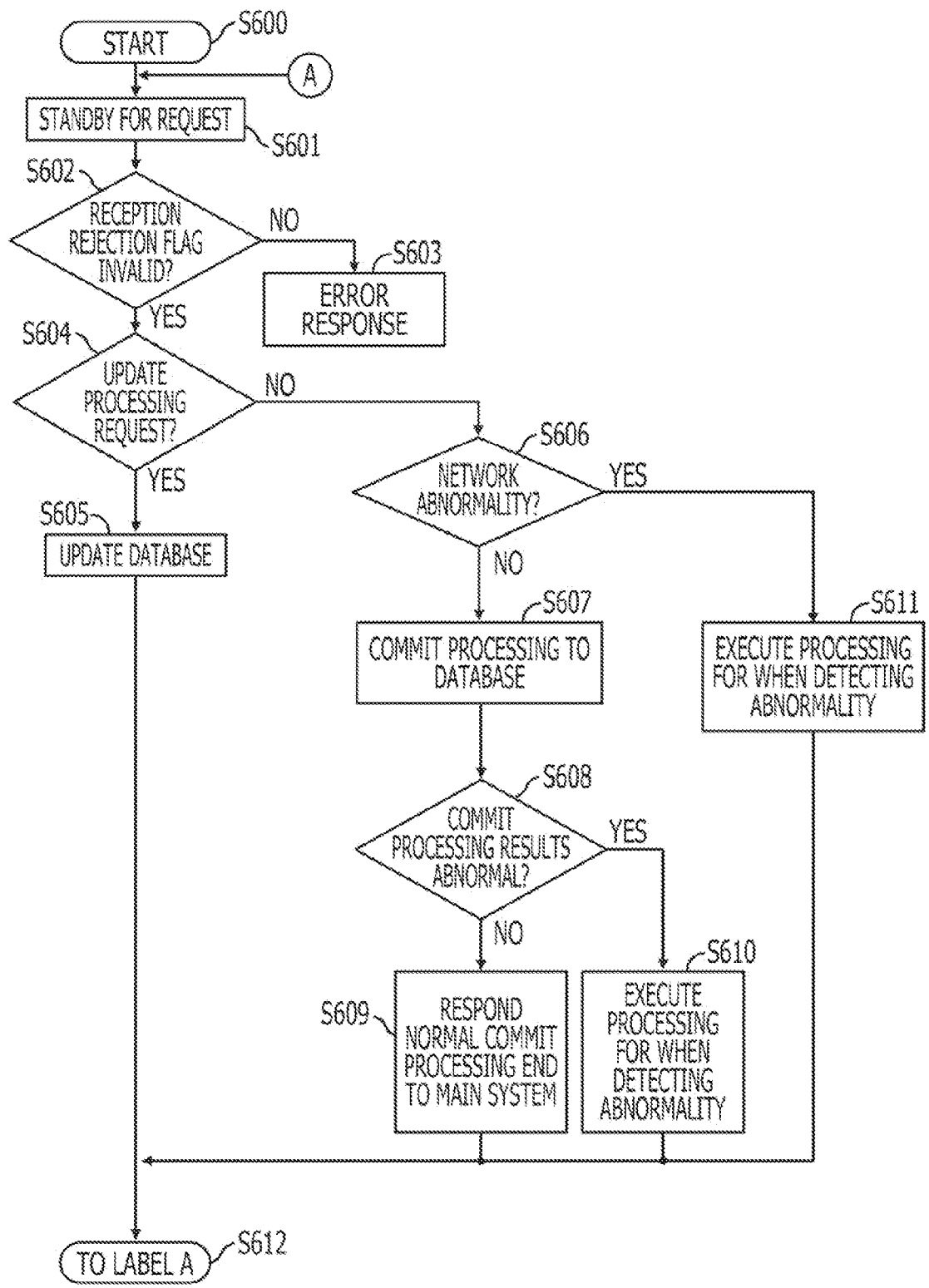
FIG. 6 is a flowchart illustrating transaction processing of the sub system according to the second embodiment.

FIG. 6 is a flowchart illustrating transaction processing of the sub system according to the present embodiment. Note that FIG. 6 illustrates transaction processing of the main system in the event that the first database server 310 is operating as the main system and the second database server 320 as the sub system.

Upon completing the startup processing (step S600), the second database server 320 goes to a request reception standby state from the first database server 310 (step S601). Upon receiving a request from the first database server 310, the second database server 320 transitions the processing to step S602.

In step S602, the second database server 320 references the reception rejection flag 323 which the memory 3202 or the like illustrated in FIG. 32 has, for example. In the event that the reception rejection flag 323 is set to "valid" (NO in step S602), the second database server 320 returns an error response to the first database server 310 and abends (step S603). Also, in the event that the reception rejection flag 323 is set to "invalid" (YES in step S602), the second database server 320 transitions the processing to step S604.

In step S604, in the event that judgment is made that the request from the first database server 310 is an update processing request (YES in step S604), the second database server 320 transitions the processing to step S605. The second database server 320 then performs updating processing of the database following the update log received from the first database server 310 along with the update processing request, i.e., performs transaction processing (step S605). The second database server 320 then restarts the processing from step S601.

On the other hand, in the event that judgment is made in step S604 that the request from the first database server 310 is a commit processing request (NO in step S604), the second database server 320 transitions the processing to step S606. In the event that there is no abnormality in the network (NO in step S606), the second database server 320 performs commit processing as to the database (step S607).

In step S608, in the event that the commit processing results are normal, i.e., in the event that the commit processing has ended successfully (NO in step S608), the second database server 320 transmits a commit response to the first database server 310 to the effect that the commit processing has been successful (step S609).

Also, in the event that the commit processing results are abnormal in step S608, i.e., in the event that the commit processing abends(YES in step S608), the second database server 320 transmits a commit response to the first database server 310 to the effect that the commit processing has failed (step S610).

On the other hand, in the event of detecting a network abnormality (YES in step S606), the second database server 320 executes the processing illustrated in FIG. 7 to be performed when detecting an abnormality (step S611).

Upon the above-described processing ending, the second database server 320 goes to step S612. The second database server 320 then restarts processing from step S601.

FIG. 7 is a flowchart illustrating abnormality detection processing of a system according to the present embodiment. Note that the flowchart illustrated in FIG. 7 illustrates processing performed in the event that the main system and sub system perform the same processing. Hereinafter, the first database server 310 and second database server 320 will be collectively referred to as "database server", and description will be made with the database server as the main entity.

Upon startup processing being completed, the database server starts abnormality monitoring for network abnormalities and the like (step S701). Upon detecting an abnormality (step S702), the database server transitions the processing to step S703.

In step S703, in the event that the database server is the main system (YES in step S703) the database server sets the update inhibition flag which the main system has, e.g., the update inhibition flag 312, to "valid" (step S704). The database server then makes a state transition query to the arbitrating device 330 (step S705).

Also, in step S703, in the event that the database server is the sub system (NO in step S703) the database server sets the reception rejection flag which the sub system has, e.g., the reception rejection flag 323, to "valid" (step S706). The database server then makes a state transition query to the arbitrating device 330 (step S705).

Upon the above processing ending, the database server goes to step S707 and ends the abnormality detecting processing, or goes to step S701 and restarts the abnormality monitoring processing.

Note that a flowchart has been illustrated in FIG. 7 for a case of the main system and sub system performing the same processing, but it is needless to say that the main system may perform processing in the order of steps S701, S702, S704, and S705, and the sub system in the order of steps S701, S702, S706, and S705.

Figure 8:
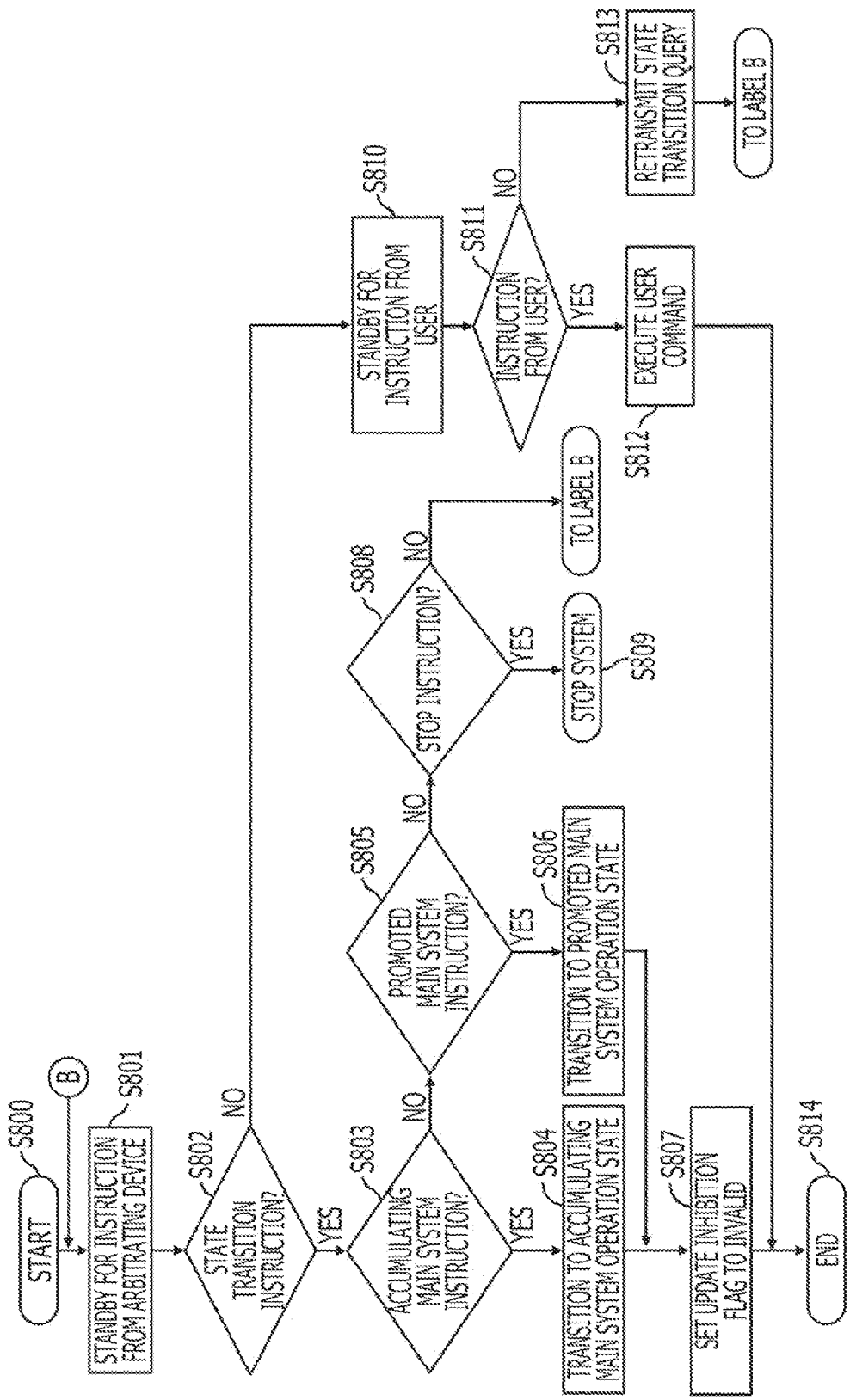
FIG. 8 is a flowchart illustrating reception daemon processing according to the second embodiment.

FIG. 8 is a flowchart illustrating the processing of a reception daemon of the system relating to the present embodiment. Note that the flowchart in FIG. 8 illustrates processing performed in the event that the main system and sub system perform the same processing. In the same way as with FIG. 7, the first database server 310 and second database server 320 will be collectively referred to as "database server", and description will be made with the database server as the main entity.

Upon startup processing being completed (step S800), the database server stands by for instructions from the arbitrating device 330 (step S801). Upon receiving an instruction from the arbitrating device 330, the database server transitions the processing to step S802.

In step S802, in the event that the received instruction is a state transition instruction (YES in step S802), the database server transitions the processing to step S803. In the event that the state transition instruction is a later-described accumulating main system instruction (YES in step S803), the database server goes to an accumulating main system operating state (step S804).

Also, in step S803, in the event that the received instruction is not a state transition instruction (NO in step S803), the database server transitions the processing to step S805. In the event that the state transition instruction is a later-described promoted main system instruction (YES in step S805), the database server goes to a promoted main system operating state (step S806).

Upon starting processing of step S804 or S806, the database server transitions the processing to step S807. The database server then sets its own update inhibition flag, i.e., update inhibition flag 312 or update inhibition flag 322, to "invalid" (step S807).

Also, in step S805, in the event that the state transition instruction is not the promoted main system instruction (NO in step S805), the database server transitions the processing to step S808. In the event that the state transition instruction is a stop instruction (YES in step S808), the database server stops the processing of the system (step S809). Also, the event that the state transition instruction is not a stop instruction (NO in step S808), the database server restarts processing from step S801.

On the other hand, in step S802, in the event that the received instruction is not a state transition instruction (NO in step S802), the database server judges the arbitrating device 330 to be down, and transitions the processing to step S810. In this case, the database server goes to a state awaiting an instruction from the user (step S810).

In step S811, upon receiving an instruction from the user via an input device 3203 illustrated in FIG. 32 for example (YES in step S811), the database server executes the command which the user has instructed. By causing the database server to execute the command, the user can force-switch the state of each system to a desired state, e.g., an accumulating main system operating state or promoted main system operating state, stopped state, or the like. Also, upon receiving an instruction which is not an instruction from the user (NO in step S811), the database server resends a state transition query to the arbitrating device 330 (step S813). The database server then restarts the processing from step S801.

Upon the processing of step S807 or S812 ending, the database server ends the reception processing (step S814), or restarts the processing from step S801.

Figure 9:
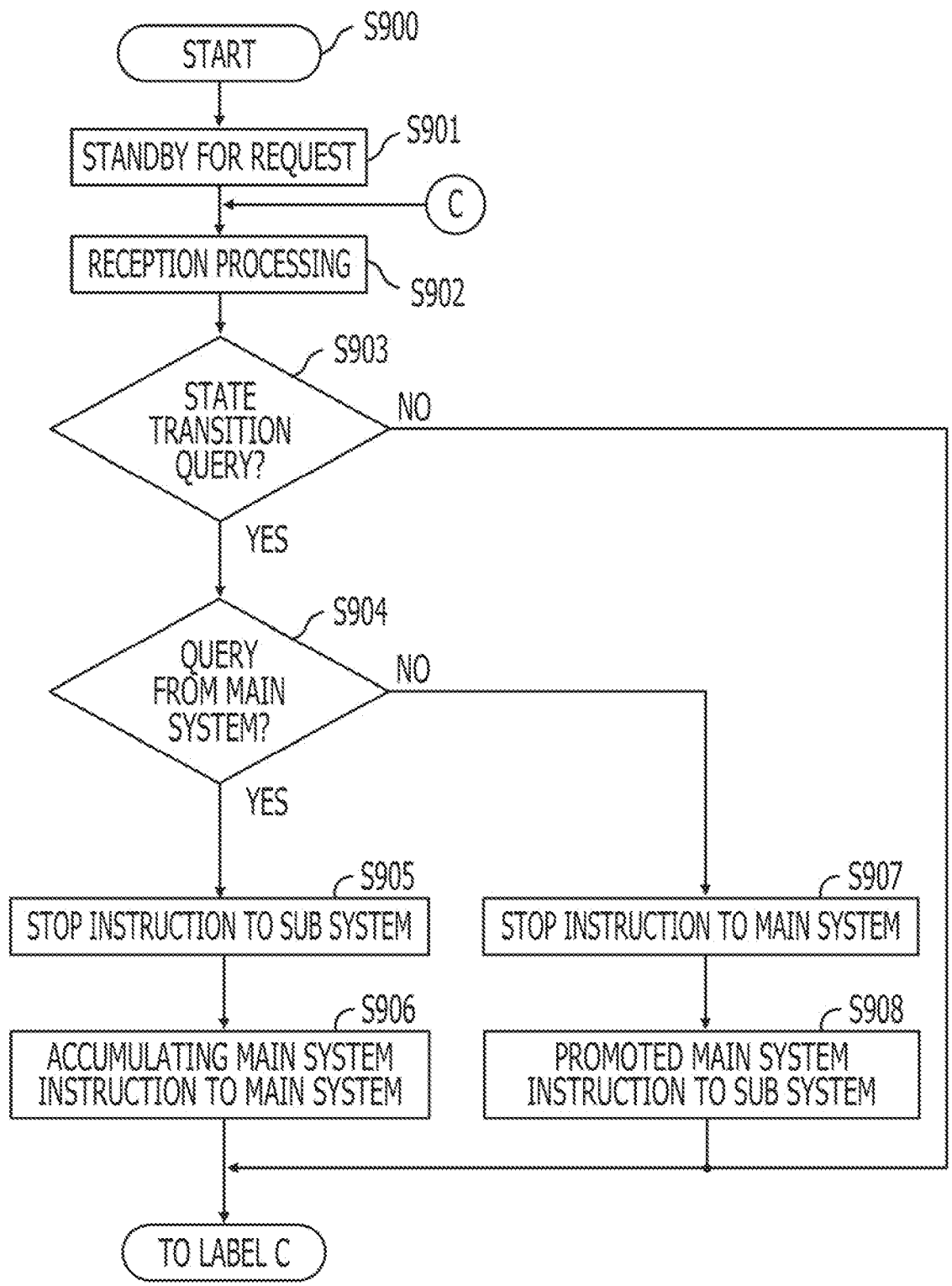
FIG. 9 is a flowchart illustrating processing of the arbitrating device according to the second embodiment.

FIG. 9 is a flowchart illustrating the processing of the arbitrating device 330 according to the present embodiment.

Upon the power being turned on to the arbitrating device 330, the arbitrating device 330 executes initialization processing that is necessary, following which transitions the processing to step S901. The arbitrating device 330 then transmits a startup notification to each system to the effect that startup processing of the arbitrating device 330 has been completed (step S901). The arbitrating device 330 then start reception processing for receiving state notifications and the like from each of the systems (step S902).

In step S902, in the event of receiving a query or the like from a system, the arbitrating device 330 transitions the processing to step S903. In the event of receiving a state transition query form a system (YES in step S903), the arbitrating device 330 transitions the processing to step S904. In the event that the state transition query received in step S902 is a query from the main system (YES in step S904), the arbitrating device 330 notifies the sub system with a stop instruction (step S905). The arbitrating device 330 further notifies the main system with an accumulating main system instruction (step S906).

On the other hand, in the event that the state transition query received in step S902 is a query from the sub system (NO in step S904), the arbitrating device 330 notifies the main system with a stop instruction (step S907). Further, the arbitrating device 330 notifies the sub system with a promoted main system instruction (step S908).

In the event that what was received in step S902 was not a state transition query from a system (NO in step S903), the arbitrating device 330 restarts the processing from step S902. In the same way, upon the processing of steps S906 or S908 ending, the arbitrating device 330 restarts the processing from step S902.

Specific description will now be made regarding the above-described database system 300 when operating normally and when there is line breakage in the network.

Figure 10:
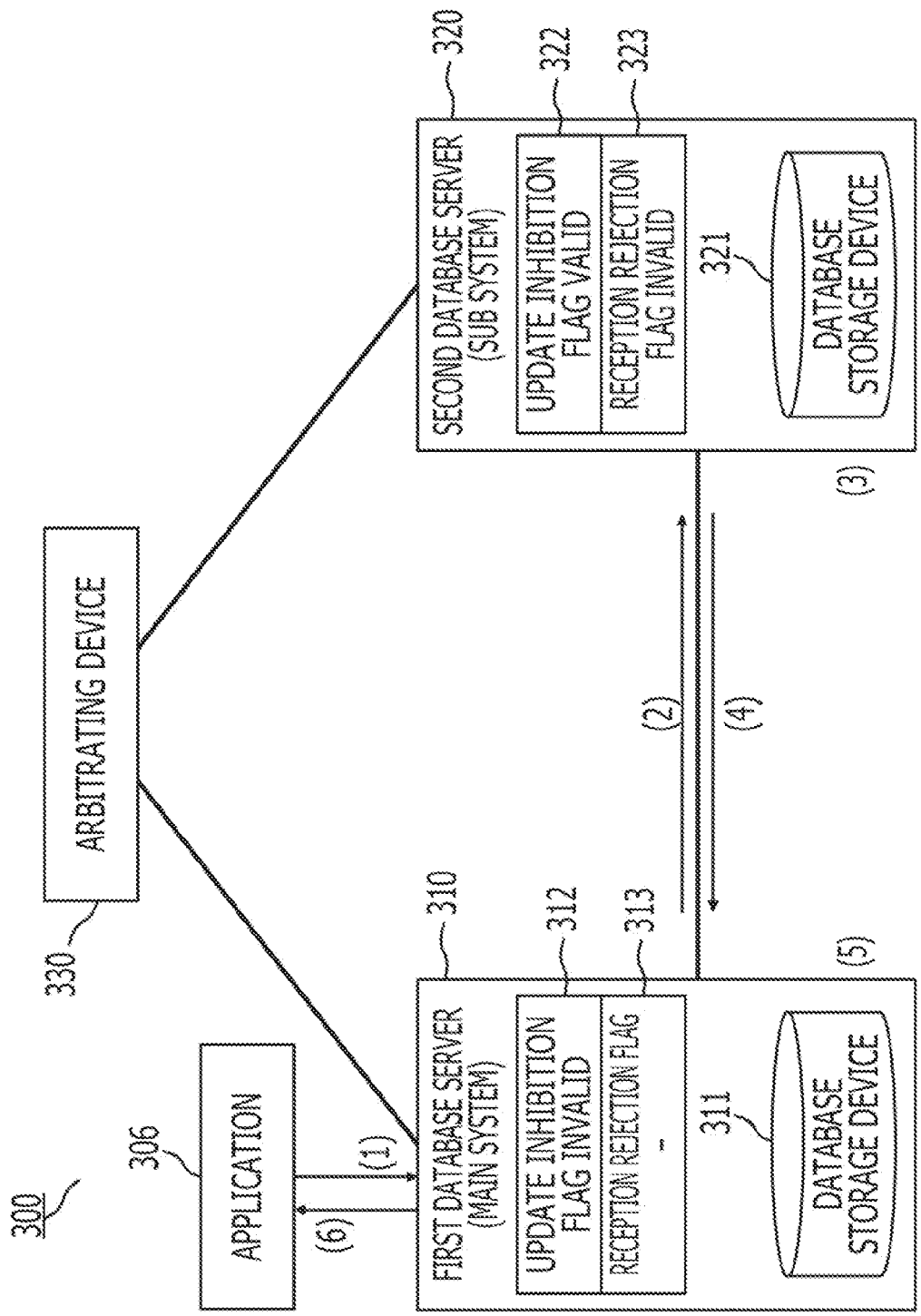
FIG. 10 is a diagram for describing processing of the database system according to the second embodiment when operating properly.

FIG. 10 is a diagram illustrating operations of the database system 300 when operating normally. Note that (1) through (6) in FIG. 10 correspond to the (1) through (6) below.

(1) Upon a specified transaction processing ending successfully, the host computer 306 notifies the first database server 310 with a commit request. (2) Upon receiving the commit request, the first database server 310 notifies the second database server 320 with the commit request (step S507 in FIG. 5).

(3) Upon receiving the commit request from the first database server 310, the second database server 320 executes commit processing as to the database storage device 321 (step S607 in FIG. 6). (4) Upon the commit processing ending successfully, the second database server 320 notifies the first database server 310 with a commit response to the effect that the commit processing has ended successfully (step S609 in FIG. 6).

(5) Upon receiving a commit response from the second database server 320 to the effect that the commit processing has ended successfully, the first database server 310 executes commit processing as to the database storage device 311 (step S511 in FIG. 5). (6) The first database server 310 then notifies the host computer 306 of the commit response to the effect that the commit processing has ended successfully.

Figure 11:
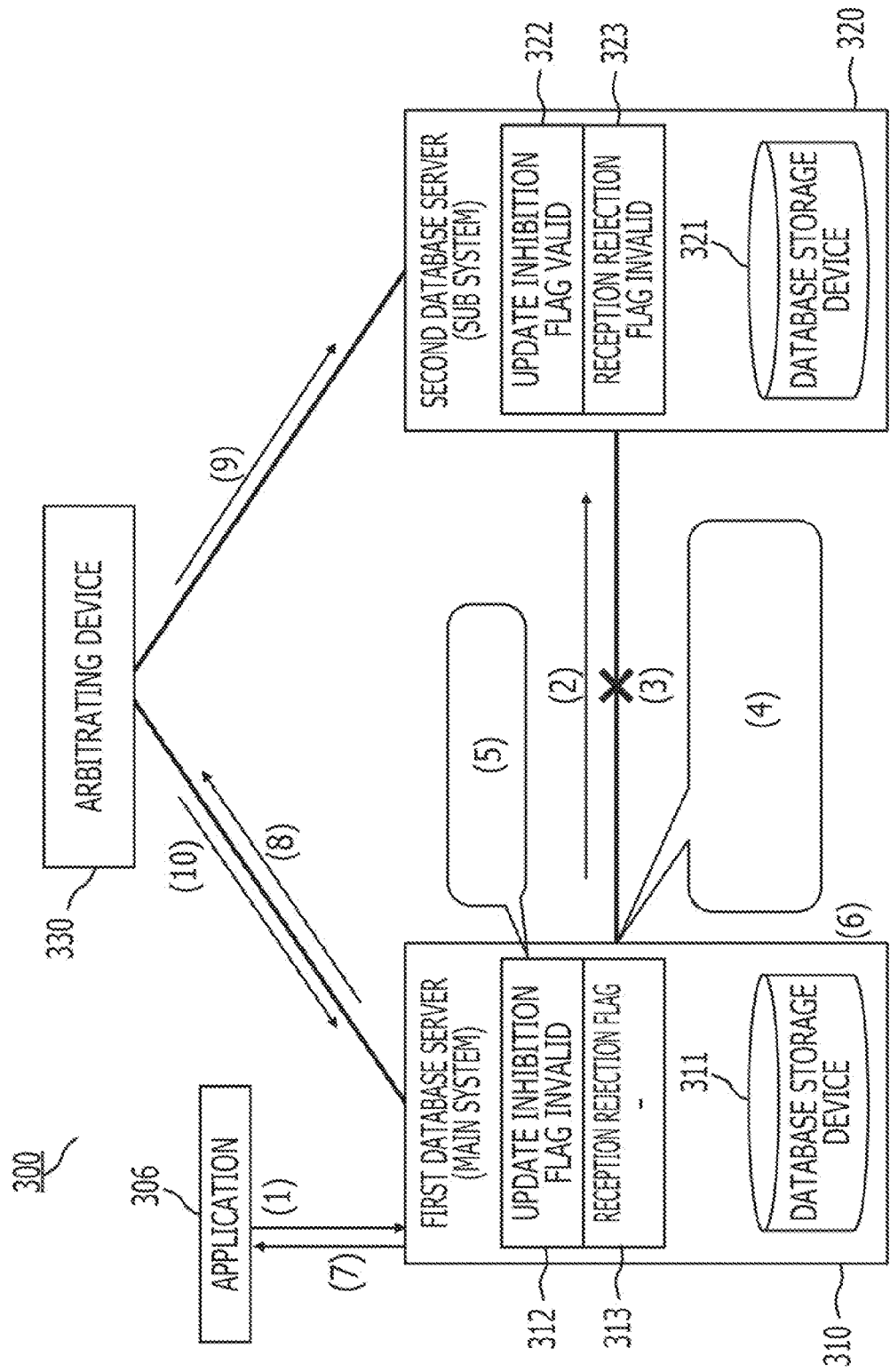
FIG. 11 is a diagram for describing operations of the main system when a network cutoff has occurred in the database system according to the second embodiment.

FIG. 11 is a diagram for describing the operations of the main system in the event that network breakage has occurred in the database system 300 according to the present embodiment. Note that (1) through (10) in FIG. 11 correspond to the (1) through (10) below.

(1) Upon a specified transaction processing ending successfully, the host computer 306 notifies the first database server 310 with a commit request. (2) Upon receiving the commit request, the first database server 310 notifies the second database server 320 with the commit request (step S507 in FIG. 5).

(3) We will assume here that there has been line breakage in the network communicably connecting between the first database server 310 and the second database server 320. (4) When an abnormality such as line breakage in the network is detected, the first database server 310 can no longer receive a commit response from the second database server 320.

(5) In the event that judgment is made that an abnormality has occurred in the network or the sub system (YES at step S509 in FIG. 5), the first database server 310 sets the update inhibition flag 312 to "valid" (step S704 in FIG. 7). (6) Subsequently, the first database server 310 performs rollback processing as to the database storage device 311 and restores the state of the database storage device 311 to the state of the previous commit, and (7) notifies the host computer 306 with a commit abnormality response to the effect that the commit processing has failed (step S513 in FIG. 5).

(8) Also, upon setting the update inhibition flag 312 to "valid", the first database server 310 makes a state transition query to the arbitrating device 330 (step S705 in FIG. 7). (9) Upon receiving the state transition query from the first database server 310 which is the main system (YES at step S904 in FIG. 9), the arbitrating device 330 notifies the second database server 320 which is the sub system with a stop instruction (step S905 in FIG. 9). The second database server 320 which has received the stop instruction stops processes and the like which are necessary for operation as a database server (step S809 in FIG. 8). Also, (10) the arbitrating device 330 notifies the first database server 310 which is the main system with an accumulating main system instruction (step S906 in FIG. 9). The first database server 310 which has received the accumulating main system instruction transitions to the accumulating main system operating state (step S804 in FIG. 8).

Figure 12:
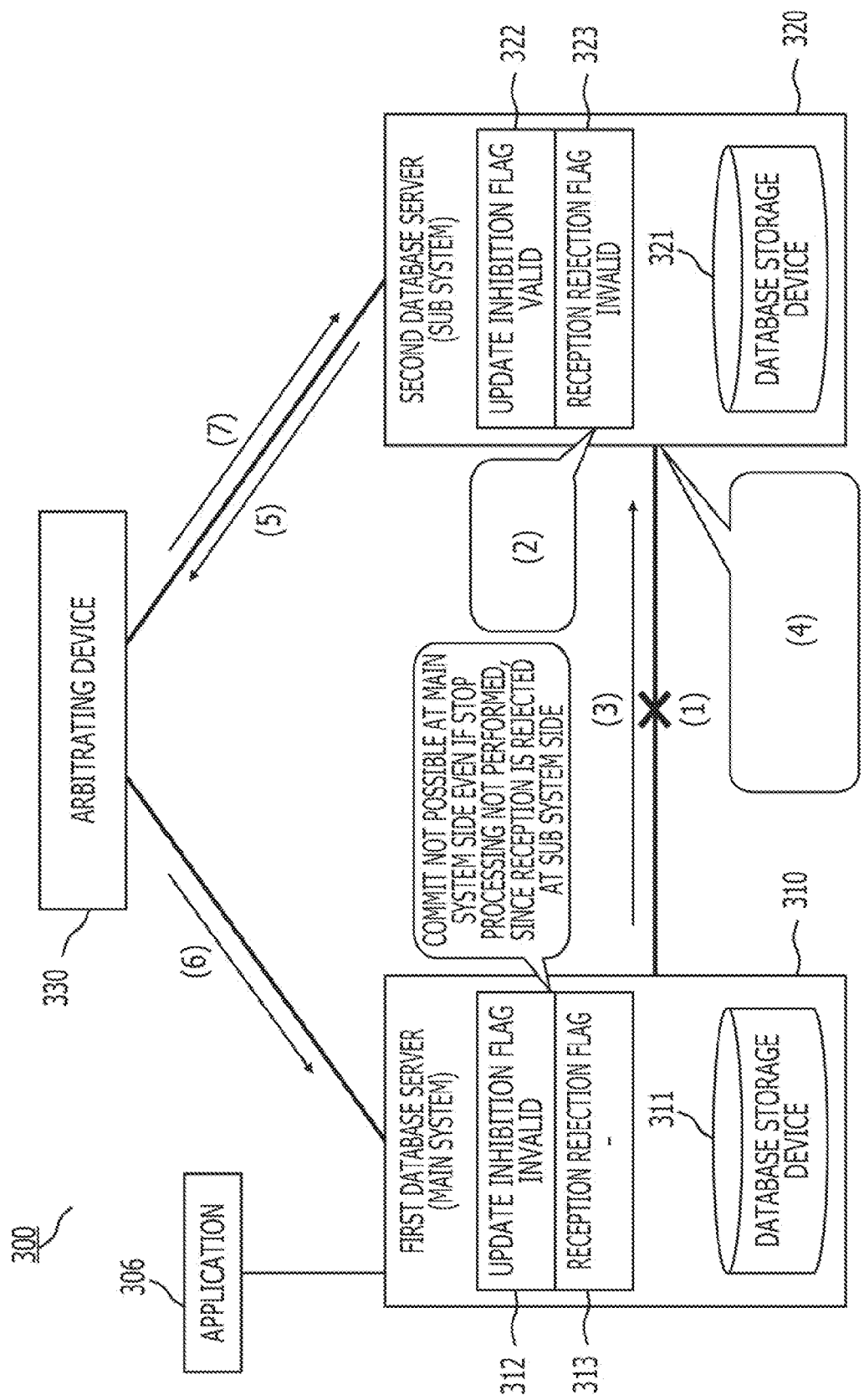
FIG. 12 is a diagram for describing operations of the main system when a network cutoff has occurred in the database system according to the second embodiment.

FIG. 12 is a diagram for describing the operations of the main system in the event that network breakage has occurred in the database system 300 according to the present embodiment. (1) through (7) in FIG. 12 correspond to the (1) through (7) below.

(1) We will assume here that there has been line breakage in the network communicably connecting between the first database server 310 and the second database server 320, in the same way as with FIG. 11. Note that a network line breakage is not restricted to a totally incommunicable state, and also includes cases of an intermittently incommunicable state. (2) When an abnormality such as line breakage in the network is detected, the second database server 320 sets the reception rejection flag 323 to "valid" (step S706 in FIG. 6).

(3) Even though the first database server 310 may notify the second database server 320 with an update log or commit request, (4) the reception rejection flag 323 is set to "valid", so the second database server 320 rejects the update log or commit request (step S603 in FIG. 6).

(5) Upon setting the reception rejection flag 323 to "valid", the second database server 320 makes a state transition query to the arbitrating device 330 (step S705 in FIG. 7). (6) Upon receiving a state transition query from the second database server 320 which is the sub system (NO at step S904 in FIG. 9), the arbitrating device 330 notifies the first database server 310 with a stop instruction (step S907 in FIG. 9). The first database server 310 which is the main system, which has received the stop instruction, stops processes and the like necessary for operating as a database server (step S809 in FIG. 8). Also, (7) the arbitrating device 330 notifies the second database server 320 which is the sub system with a promoted main system instruction (step S908 in FIG. 9). The second database server 320 which has received the promoted main system instruction transitions to a promoted main system operating state (step S806 in FIG. 8).

As described above, in the event that there is an abnormality in the network such as a line breakage or the like, the second database server 320 rejects reception of update logs or commit requests from the first database server 310, so no update processing or commit processing is performed. Accordingly, no update processing or commit processing is performed at the first database server 310 which performs update processing and commit processing upon success of update processing and commit processing at the second database server 320.

As a result, a state in which update processing or commit processing is performed as to the database storage device 311 of the first database server 310 in a period during which a stop instruction from the arbitrating device 330 is not notified to the first database server 310 for one reason or another, i.e., a split brain state, can be prevented. Accordingly, with the database system 300, systems can be switched over without a split brain state.

Third Embodiment

Figure 13:
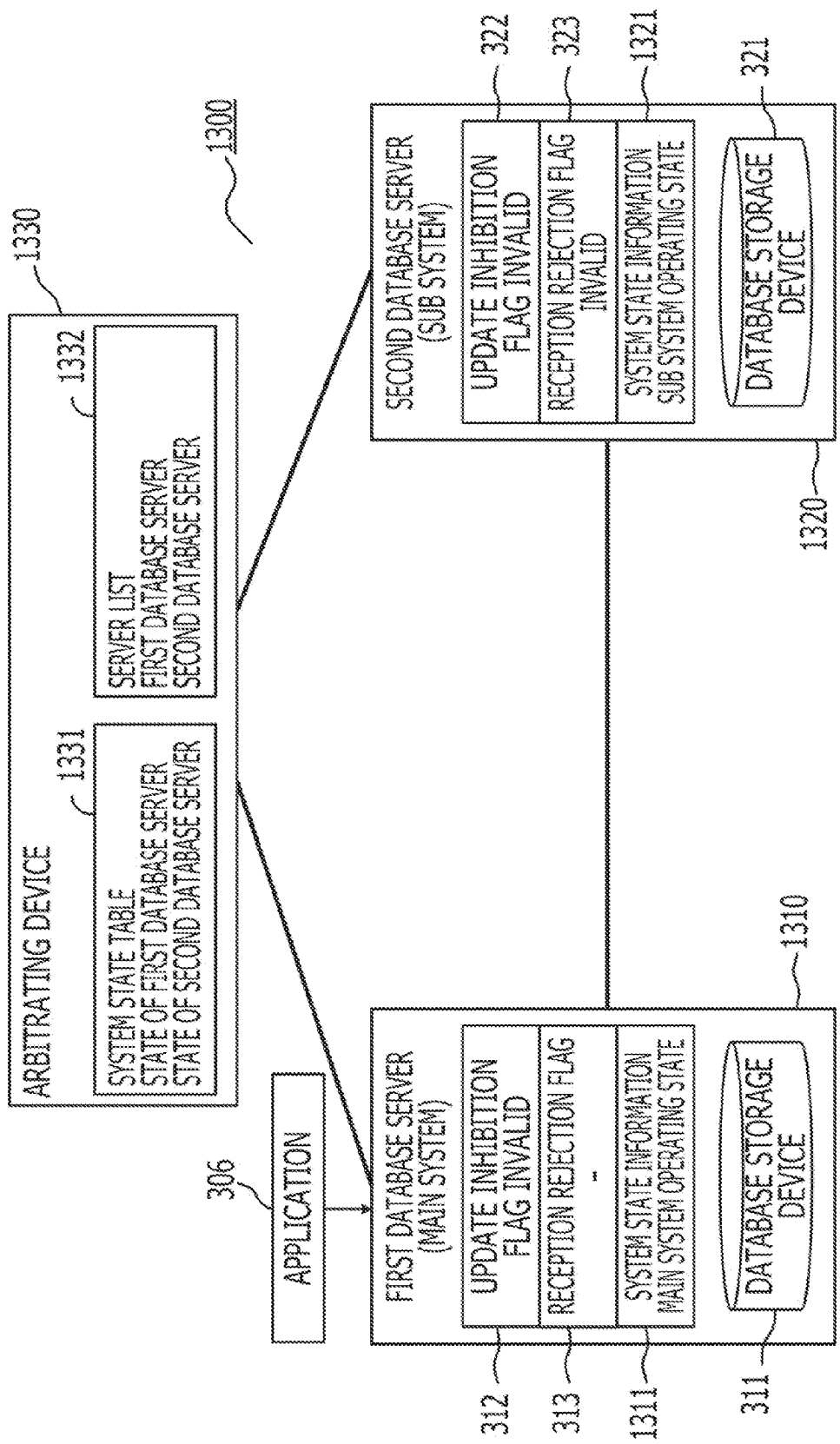
FIG. 13 is a diagram illustrating a configuration example of a database system according to a third embodiment.

FIG. 13 is a diagram illustrating a configuration example of a database system 1300 according to the present embodiment.

The database system 1300 according to FIG. 13 includes a first database server 1310, a second database server 1320, and an arbitrating device 1330. The first database server 1310, second database server 1320, and arbitrating device 1330 connected via a network so as to be mutually communicable. Note however, that the first database server 1310, second database server 1320, and arbitrating device 1330 may be connected so as to be mutually communicable via a dedicated line or the like.

The database system 1300 in FIG. 13 illustrates a case wherein the first database server 1310 is the main system and the second database server 1320 is the sub system. The first database server 1310, second database server 1320, and arbitrating device 1330 can be realized by causing an information processing device of a configuration such as illustrated in FIG. 32 to execute a specified program, for example.

The database system 1300 illustrated in FIG. 13 has all of the configurations of the database system 300 in FIG. 3. Accordingly, configurations which are the same as those in FIG. 3 are denoted with the same reference numerals, and specific description thereof will be omitted here.

The first database server 1310 performs a series of updating processing including adding, deleting changing, searching, etc., of data with regard to a database table stored in the database storage device 311 for example, i.e., transaction processing, under request from the host computer 306. At this time, the first database server 1310 stores the update log of transaction processing in the database storage device 311 or the like.

Also, upon receiving a commit request from the host computer 306, the first database server 1310 performs commit processing to permanently reflect the contents of the transaction processing in the database. Also, upon receiving a rollback request from the host computer 306, the first database server 1310 executes rollback processing to restore the state of the database to the state at which the commit processing was performed earlier.

Figure 14:
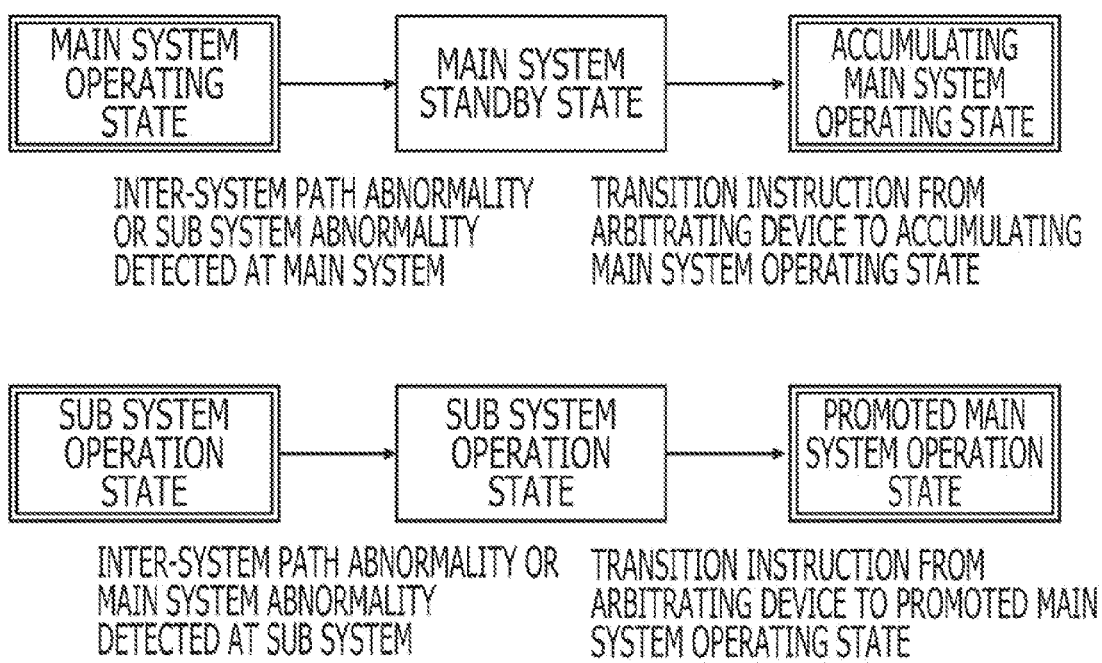
FIG. 14 is a diagram illustrating transition between one system state and another system state for each system according to the third embodiment.

Also, in addition to the configurations illustrated in FIG. 3, the first database server 1310 has system state information 1311. This system state information 1311 is information indicating the state of the currently-operating system, i.e., the state of the first database server 1310. The states of the system are illustrated in FIG. 14.

In the event of operating as a sub system, the second database server 1320 receives an update log from the first database server 1310 serving as the main system. The second database server 1320 then performs a series of updating processing including adding, deleting changing, searching, etc., of data with regard to a database table stored in the database storage device 1321 for example, i.e., transaction processing, following the update log. At this time, the second database server 1320 stores this update processing in the database storage device 1321 or the like as an update log.

Also, upon receiving a commit request from the first database server 1310, the second database server 1320 performs commit processing for permanently reflecting the contents of the transaction processing in the database. Also, upon receiving a rollback request from the first database server 1310, the first database server 1310 performs rollback to the state at which the commit processing was performed earlier.

Also, in addition to the configurations illustrated in FIG. 3, the second database server 1320 has system state information 1321. This system state information 1321 is information indicating the state of the currently-operating system, i.e., the state of the second database server 1320. The states of the system are illustrated in FIG. 14.

The arbitrating device 1330 performs state transition instruction such as stop instruction and so forth, in accordance with the states of the first database server 1310 and the second database server 1320, so as to perform arbitration of the states of the first database server 1310 and second database server 1320.

The arbitrating device 1330 has a system state table 1331 storing the system state information notified from each system, stored for each system, and a server list 1332 storing the database servers which are connected to the arbitrating device 1330 and are the object of arbitration, which are the first database server 1310 and the second database server 1320 in FIG. 13.

Note that the system state table 1331 may be held in volatile memory such as RAM (Random Access Memory) provided to the arbitrating device 1330, or may be held in nonvolatile memory such as EPROM (Erasable Programmable Read Only Memory) or a magnetic disk device or the like provided to the arbitrating device 1330. Note however, that in the case of holding the system state table 1331 in volatile memory, the arbitrating device 1330 needs to perform restarting processing without initializing the volatile memory holding the system state table 1331. This is in order to hold the contents of the system state table 1331 even when restarting.

FIG. 14 is a diagram illustrating the system states and state transition of the systems according to the present embodiment.

The main system has a "main system operating state", "main system standby state", and "accumulating main system operating state".

The state in which normal operation as a main system is being carried out, from immediately after startup, is the "main system operating state".

The state in which operations are stopped and a state transition instruction from the arbitrating device 1330 is being awaited is the "main system standby state". For example, upon detecting an abnormality in the network connecting between the first database server 1310 and second database server 1320 illustrated in FIG. 13, or an abnormality in the sub system, the main system transitions from the "main system operating state" to the "main system standby state".

The state in which normal operation as a main system is being carried out without presence of a sub system is the "accumulating main system operating state". For example, in the event of receiving a transition instruction to the accumulating main system operating state from the arbitrating device 1330, the main system transitions from the "main system standby state" to the "accumulating main system operating state". Hereinafter, a transition instruction to the accumulating main system operating state will be referred to as an "accumulating main system instruction".

The sub system has a "sub system operating state", "sub system standby state", and "promoted main system operating state".

The state in which normal operation as a sub system is being carried out, from immediately after startup, is the "sub system operating state".

The state in which operations are stopped and a state transition instruction from the arbitrating device 1330 is being awaited is the "sub system standby state". For example, upon detecting an abnormality in the network connecting between the first database server 1310 and second database server 1320 illustrated in FIG. 13, or an abnormality in the sub system, the sub system transitions from the "sub system operating state" to the "sub system standby state".

A state in which normal operation were being performed as the sub system but now operating as the main system is the "promoted main system operating state". For example, in the event of receiving a transition instruction to the promoted main system operating state from the arbitrating device 1330, the main system transitions from the "sub system standby state" to the "promoted main system operating state". Hereinafter, a transition instruction to the promoted main system operating state will be referred to as a "promoted main system instruction".

Figure 15:
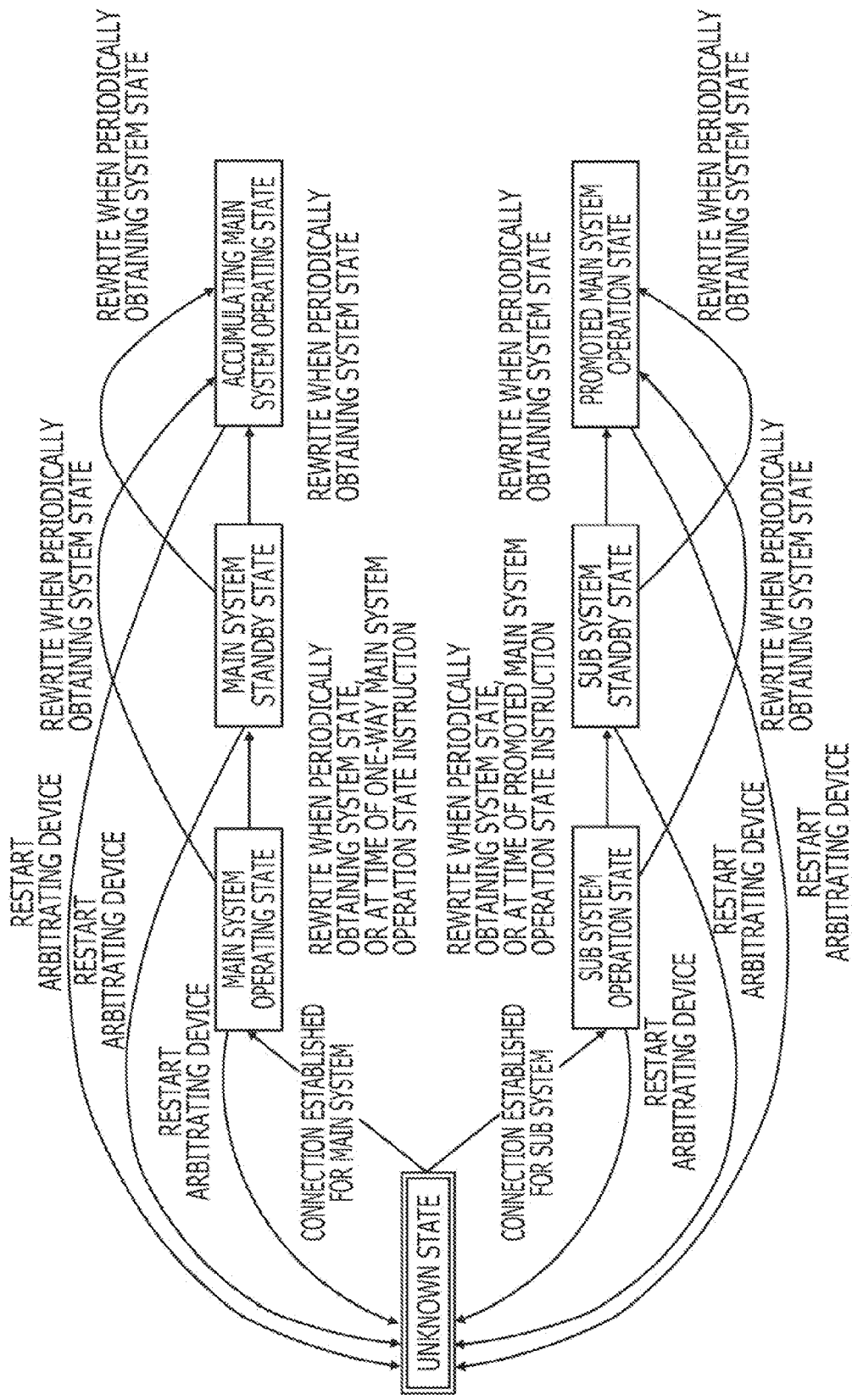
FIG. 15 is a diagram illustrating transition between one system state and another system state which the arbitrating device according to the third embodiment holds in a system state table.

FIG. 15 is a diagram illustrating system states which the arbitrating device 1330 according to the present embodiment holds in the system state table 1331, and transition between the system states.

The system states which the arbitrating device 1330 holds in the system state table 1331 are "unknown state", "main system operating state", "main system standby state", "accumulating main system operating state", "sub system operating state", "sub system standby state", and "promoted main system operating state".

After the arbitrating device 1330 starts up, the state of the main system and sub system cannot be known until a connection with the main system or sub system is established. This is called an "unknown state". Accordingly, when the arbitrating device 1330 is restarted, the state transitions to the "unknown state" regardless of the state at that time.

Upon the arbitrating device 1330 establishing connection with the main system, the arbitrating device 1330 sets the system state regarding the main system to be held in the system state table 1331 to "main system operating state". In the same way, upon the arbitrating device 1330 establishing connection with the sub system, the arbitrating device 1330 sets the system state regarding the sub system to be held in the system state table 1331 to "sub system operating state".

Upon notification being made from the main system by periodic notification of system state that the main system in is the "main system standby state", or in the event that a one-way main system operating state instruction is given to the main system, the arbitrating device 1330 sets the system state regarding the main system from "main system operating state" to "main system standby state". In the same way, upon notification being made from the sub system by periodic notification of system state that the sub system in is the "sub system standby state", or in the event that a promoted main system operating state instruction is given to the sub system, the arbitrating device 1330 sets the system state regarding the sub system from "sub system operating state" to "sub system standby state".

Upon notification being made from the main system by periodic notification of system state that the main system in is the "accumulating main system standby state", the arbitrating device 1330 sets the system state regarding the main system from "main system operating state" or "main system standby state" to "accumulating main system standby state". In the same way, upon notification being made from the sub system by periodic notification of system state that the sub system in is the "promoted system standby state", the arbitrating device 1330 sets the system state regarding the sub system from "sub system operating state" or "sub system standby state" to "promoted main system standby state".

Now, the startup processing of the main system and sub system in the database system 1300 is the same as the processing illustrated in FIG. 4. Also, the transaction processing of the main system in the database system 1300 is the same as the processing illustrated in FIG. 5. Also, the transaction processing of the sub system in the database system 1300 is the same as the processing illustrated in FIG. 6. Accordingly, description of this processing will be omitted.

Figure 16:
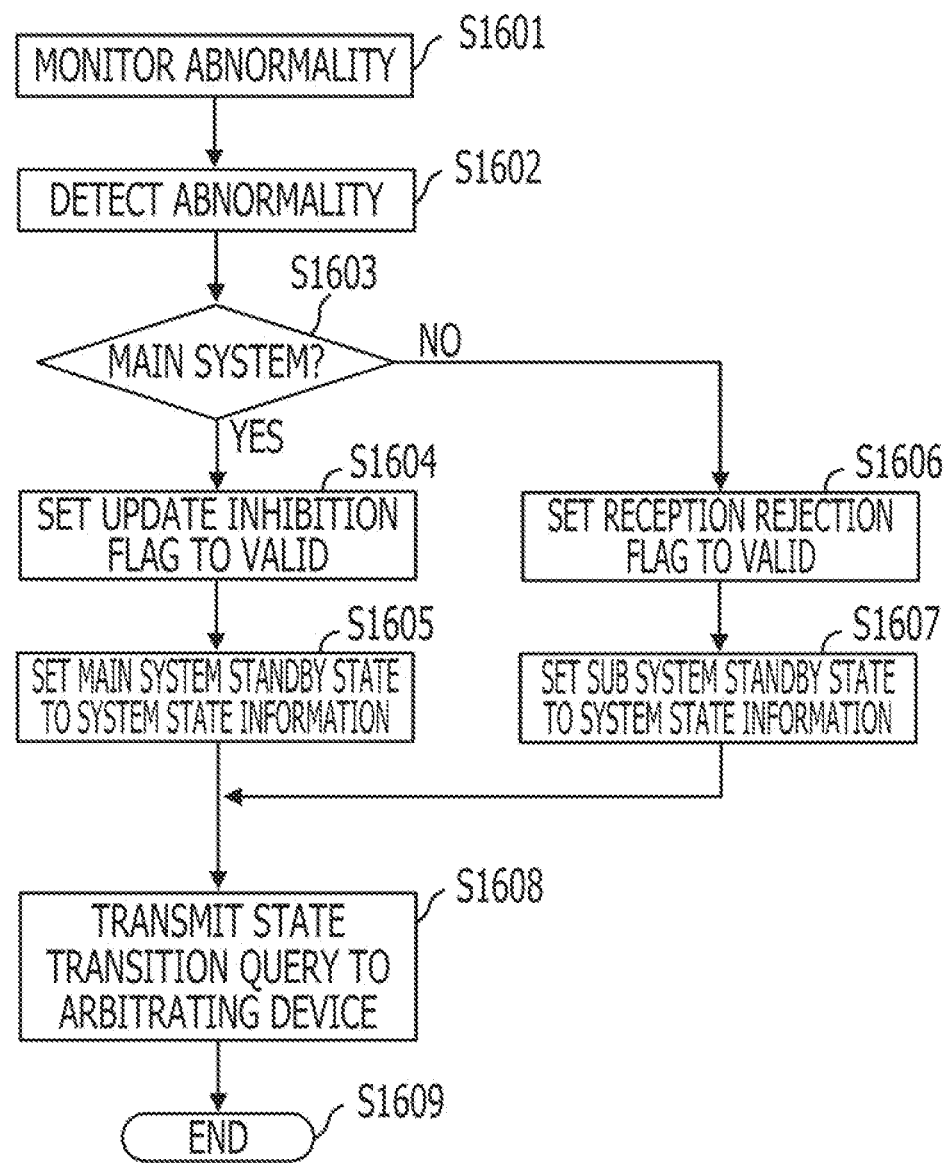
FIG. 16 is a flowchart illustrating system abnormality detection processing according to the third embodiment.

FIG. 16 is a flowchart illustrating system abnormality detection processing regarding systems according to the present embodiment.

The database server starts abnormality monitoring for network abnormalities and the like upon the startup processing being completed. (step S1601). Upon detected an abnormality (step S1602), the database server transitions the processing to step S1603.

In step S1603, in the event that the database server is the main server (YES in step S1603) the database server sets an update inhibition flag relating to the main system, the update inhibition flag 312 for example, to "valid" (step S1604). The database server then sets system state information relating to the main system to the "main system standby state" in the system state information 1311, for example (step S1605).

Also, in the event that the database server is the sub server (NO in step S1603) the database server sets a reception rejection flag relating to the sub system, the reception rejection flag 323 for example, to "valid" (step S1606). The database server then sets system state information relating to the sub system to the "sub system standby state" in the system state information 1321, for example (step S1607).

Upon the above processing ending, the database server makes a state transition query to the arbitrating device 1330 (step S1608). The database server then transitions to step S1607 or ends the abnormality detection processing, or transitions to step S1601 and restarts abnormality monitoring.

Note that a flowchart has been illustrated in FIG. 16 for a case of the main system and sub system performing the same processing, but it is needless to say that the main system may perform processing in the order of steps S1601, S1602, S1604, S1605, and 1608, and the sub system in the order of steps S1601, S1602, S1606, S1607, and S1608.

Figure 17:
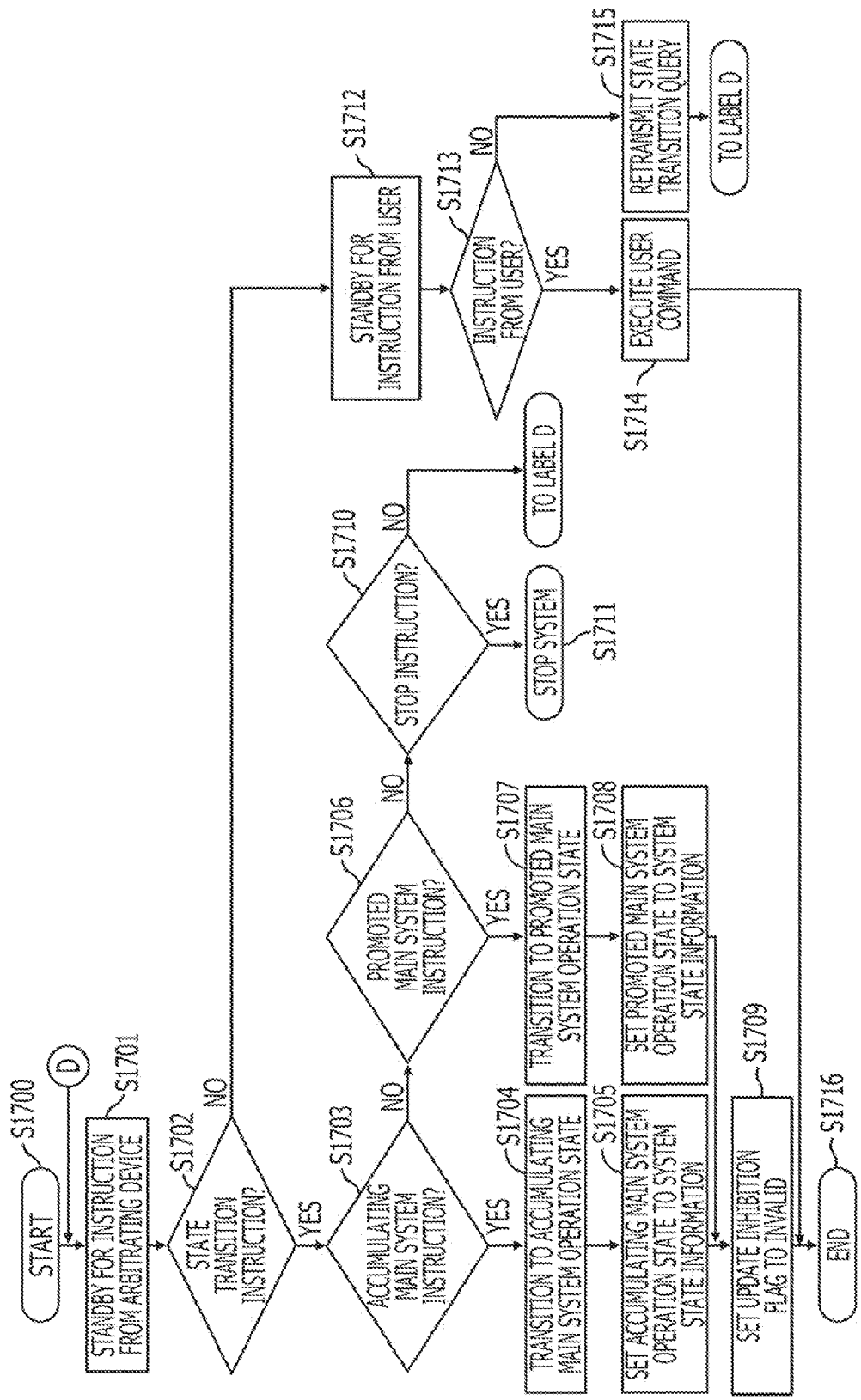
FIG. 17 is a flowchart illustrating reception daemon processing according to the third embodiment.

FIG. 17 is a flowchart illustrating the processing of a reception daemon of the system relating to the present embodiment.

Upon startup processing being completed (step S1700), the database server stands by for instructions from the arbitrating device 1330 (step S1701). Upon receiving an instruction from the arbitrating device 1330, the database server transitions the processing to step S1702.

In step S1702, in the event that the received instruction is a state transition instruction (YES in step S1702), the database server transitions the processing to step S1703. In the event that the state transition instruction is an accumulating main system instruction (YES in step S1703), the database server goes to an accumulating main system operating state (step S1704). The database server then sets system state information relating to itself, "accumulating main system operating state" in the system state information 1311, for example (step S1705).

Also, in the event that the state transition instruction is not an accumulating main system instruction (NO in step S1703), the database server transitions the processing to step S1706. In step S1706, in the event that the state transition instruction is a promoted main system instruction (YES in step S1706), the database server goes to the promoted main system operating state (step S1707). The database server then sets system state information relating to itself, "promoted main system operating state" in the system state information 1311, for example (step S1708).

In step S1702, in the event that the received instruction is not a state transition instruction (NO in step S1702), the database server transitions the processing to step S1706. In the event that the state transition instruction is a promoted main system instruction (YES in step S1706), the database server goes to a promoted main system operating state (step S1707). The database server then sets system state information relating to itself, "promoted main system operating state" in the system state information 1321, for example (step S1708).

Upon ending the processing of step S1705 or S1708, the database server transitions the processing to step S1709. The database server then sets its own update inhibition flag, i.e., update inhibition flag 312 or update inhibition flag 322, to "invalid" (step S1709).

Also, in step S1706, in the event that the state transition instruction is not the promoted main system instruction (NO in step S1706), the database server transitions the processing to step S1710. In the event that the state transition instruction is a stop instruction (YES in step S1710), the database server stops the processing of the system (step S1711). Also, the event that the state transition instruction is not a stop instruction (NO in step S1710), the database server restarts processing from step S1701.

On the other hand, in step S1702, in the event that the received instruction is not a state transition instruction (NO in step S1702), the database server judges the arbitrating device 1330 to be down, and transitions the processing to step S1712. In this case, the database server goes to a state awaiting an instruction from the user (step S1712).

In step S1713, upon receiving an instruction from the user via an input device 3203 illustrated in FIG. 32 for example (YES in step S1713), the database server executes the command which the user has instructed. By causing the database server to execute the command, the user can force-switch the state of each system to a desired state, e.g., an accumulating main system operating state or promoted main system operating state, or the like. Also, upon receiving an instruction which is not an instruction from the user (NO in step S1713), the database server resends a state transition query to the arbitrating device 1330 (step S1715). The database server then restarts the processing from step S1701.

Upon the processing of step S1709 or S1714 ending, the database server ends the reception processing (step S1716), or restarts the processing from step S1701.

Figure 18:
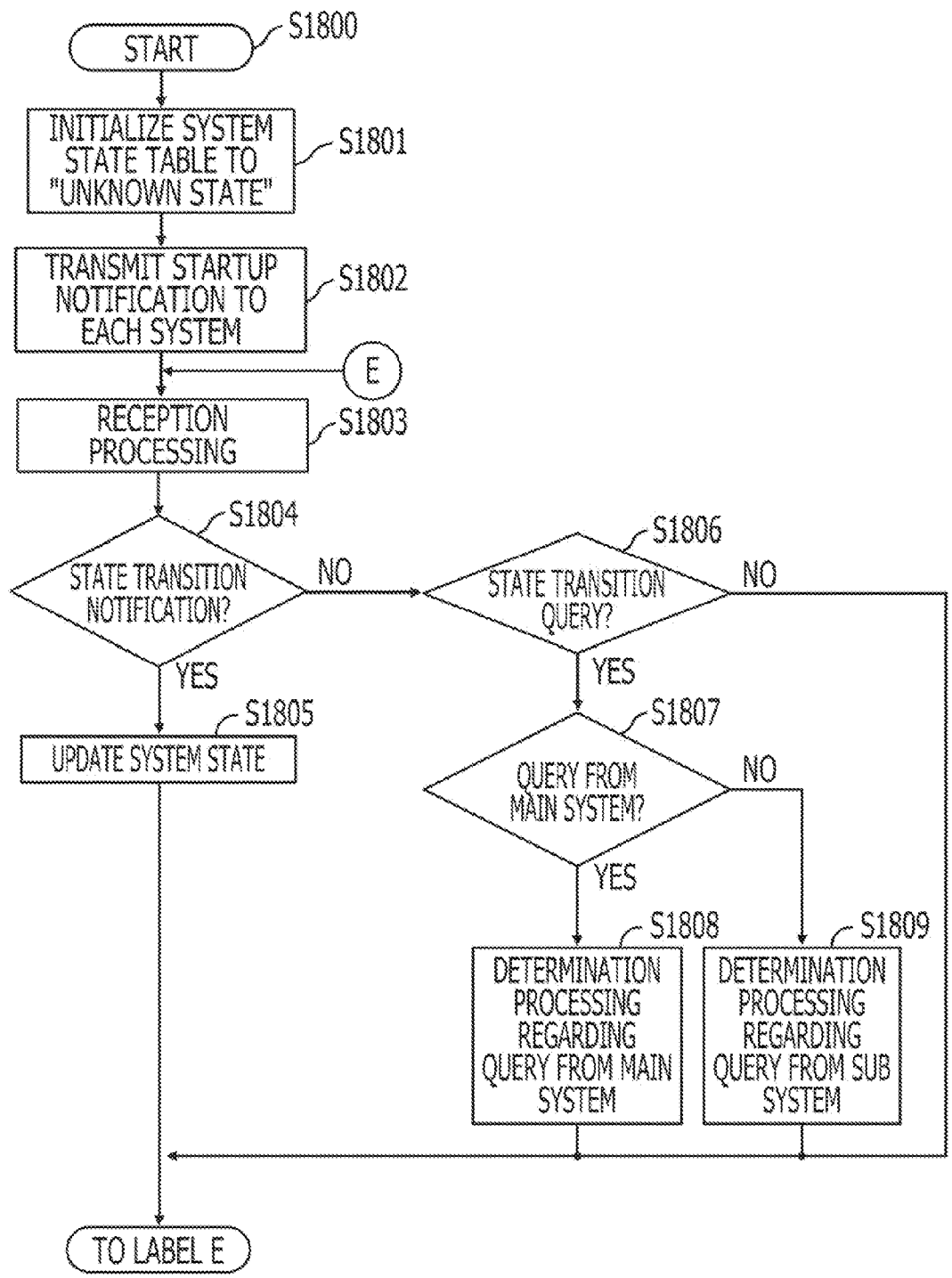
FIG. 18 is a flowchart illustrating processing of the arbitrating device according to the third embodiment.

FIG. 18 is a flowchart illustrating the processing of the arbitrating device 1330 according to the present embodiment.

Upon the power being turned on to the arbitrating device 1330, the arbitrating device 1330 starts the startup processing (step S1800) Upon the startup processing being completed, the arbitrating device 1330 executes initialization processing that is necessary for operating as an arbitrating device (step S1801). For example, the arbitrating device 1330 initializes the system state table 1331. At this time, the arbitrating device 1330 sets "unknown state" to the system state information of the first database server 1310 and the system state information of the second database server 1320 to be held in the system state table 1331.

Upon initialization being completed, the arbitrating device 1330 transmits a startup notification to the effect that startup processing of the arbitrating device 1330 has been completed (step S1801). The arbitrating device 1330 then start reception processing for receiving state notifications and the like from each of the systems (step S1803).

In step S1803, in the event of receiving a state notification or the like from a system, the arbitrating device 1330 transitions the processing to step S1804. In the event of receiving a state notification from a system (YES in step S1804), the arbitrating device 1330 updates the system state information 1311 according to the state notification from the system (step S1805).

In the event of receiving not a state notification but a state transition query from a system (YES in step S1806), the arbitrating device 1330 transitions the processing to step S1807. In the event that the state transition query received in step S1803 is a query from the main system (YES in step S1807), the arbitrating device 1330 performs determination processing regarding the query from the main system (step S1808). This "determination processing regarding query from main system" is illustrated in FIG. 19.

Figure 20:
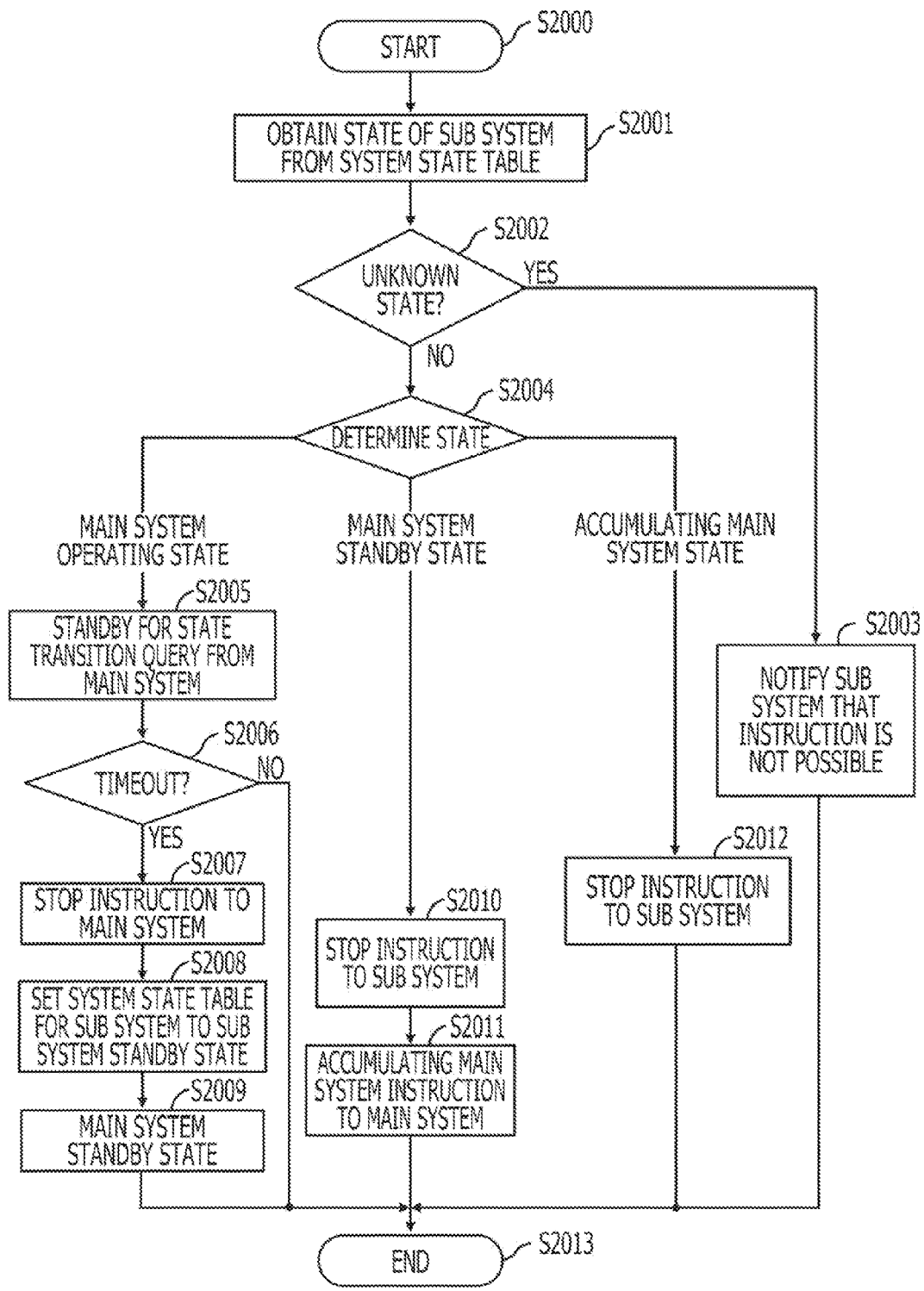
FIG. 20 is a flowchart illustrating "Determination Processing as to Query from Sub System" of the arbitrating device (step S1809) according to the third embodiment.

In the event that the state transition query received in step S1803 is a query from the sub system (NO in step S1807), the arbitrating device 1330 performs determination processing regarding the query from the sub system (step S1809). This "determination processing regarding query from sub system" is illustrated in FIG. 20.

On the other hand, in the event that the state transition query received in step S1803 is neither a state notification nor a state transition query from a system (NO in step S1806), The arbitrating device 1330 restarts the processing from step S1803. In the same way, upon the processing of steps S1805, S1808, or S1809 ending, the arbitrating device 1330 restarts the processing from step S1802.

Figure 19:
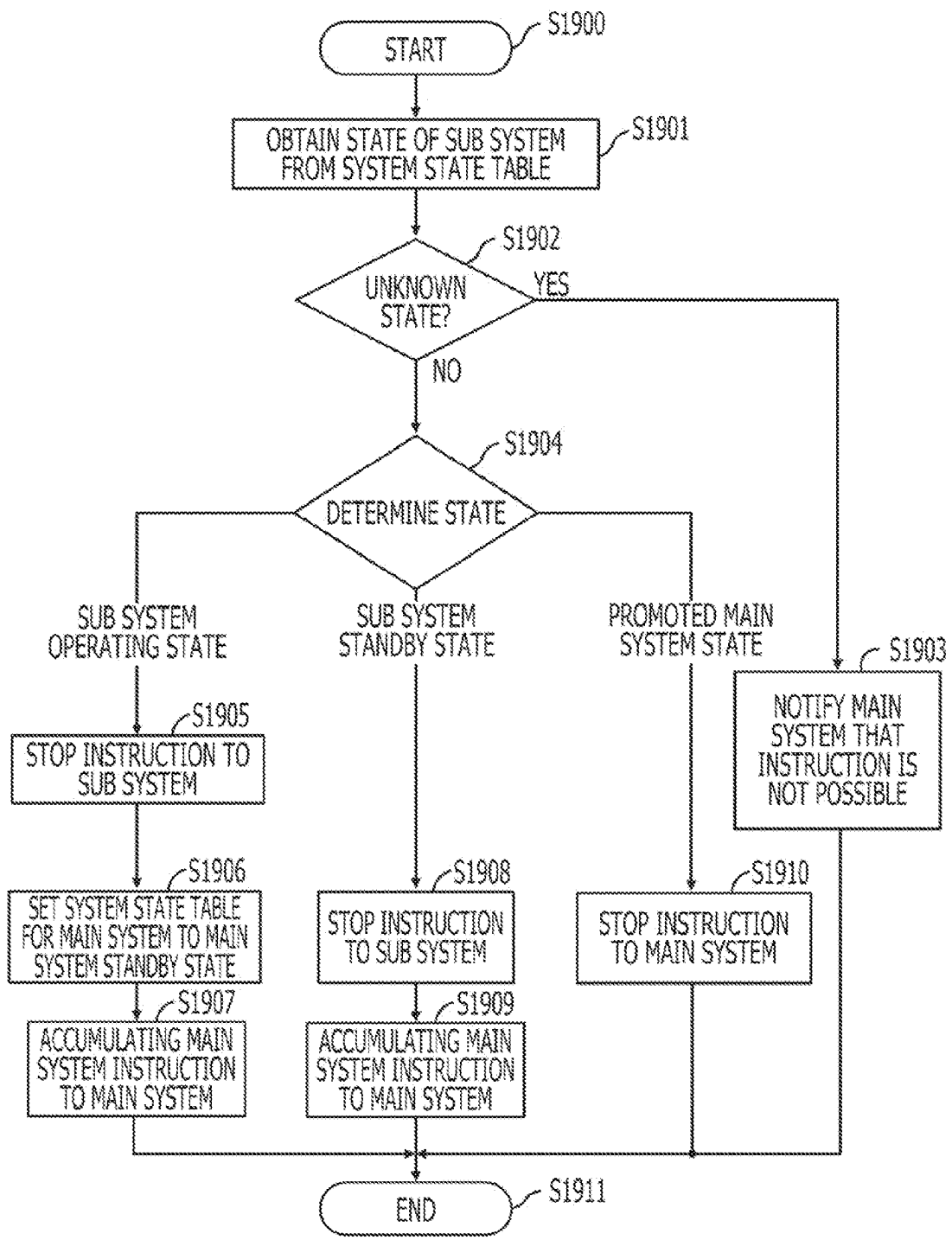
FIG. 19 is a flowchart illustrating "Determination Processing as to Query from Main System" of the arbitrating device (step S1808) according to the third embodiment.

FIG. 19 is a flowchart illustrating the "determination processing regarding query from main system" (step S1808) of the arbitrating device 1330 according to the present embodiment.

In step S1901, the arbitrating device 1330 obtains the state of the second database server 1320 which is the sub system, from the system state table 1331. In the event that the obtained state of the sub system is the "unknown state" (YES in step S1902), the arbitrating device 1330 notifies the main system that instruction is impossible (step S1903). In the event that the obtained state of the sub system is a state other than "unknown state" (NO in step S1902), the arbitrating device 1330 transitions the processing to step S1904.

In step S1904, the arbitrating device 1330 determines the state of the sub system obtained in step S1901. In the event that the state of the sub system is the "sub system operating state", the arbitrating device 1330 transitions the processing to step S1905. The arbitrating device 1330 then gives a stop instruction to the sub system (step S1905). The arbitrating device 1330 then sets the state of the main system held in the system state table 1331 to the "main system standby state" (step S1906), and gives an accumulating main system instruction to the main system (step S1907).

Also, in the event that the state of the sub system is "sub system standby state" in step S1904, the arbitrating device 1330 transitions the processing to step S1908. The arbitrating device 1330 then gives a stop instruction to the sub system (step S1908), and gives an accumulating main system instruction to the main system (step S1909).

Also, in the event that the state of the sub system is "promoted main system operating state" in step S1904, the arbitrating device 1330 transitions the processing to step S1910. The arbitrating device 1330 then gives a stop instruction to the main system (step S1910).

Upon ending the above processing, the arbitrating device 1330 transitions the processing to step S1911, and ends the "determination processing regarding query from main system".

FIG. 20 is a flowchart illustrating the "determination processing regarding query from sub system" (step S1809) of the arbitrating device 1330 according to the present embodiment.

In step S2001, the arbitrating device 1330 obtains the state of the first database server 1310 which is the main system, from the system state table 1331. In the event that the obtained state of the main system is the "unknown state" (YES in step S2002), the arbitrating device 1330 makes notification to the sub system to the effect that instructions cannot be given (step S2003). In the event that the state of the main system that has been obtained is a state other than "unknown state" (NO in step S2002), the arbitrating device 1330 transitions the processing to step S2004.

In step S2004, the arbitrating device 1330 determines the state of the main system obtained in step S2001. In the event that the state of the main system is the "main system operating state", the arbitrating device 1330 transitions the processing to step S2005. The arbitrating device 1330 stands by for a state transition query from the main system for a certain time period. In the event that no state transition query is received from the main system after the certain time period, the arbitrating device 1330 detects a timeout.

In the event that a timeout is not detected (NO in Step S2006), the arbitrating device 1330 transitions the processing to step S2013 and ends the "determination processing regarding query from sub system". Also, in the event that a timeout is detected (YES in Step S2006), the arbitrating device 1330 gives a stop instruction to the main system (step S2007). The arbitrating device 1330 then sets the state of the sub system held in the system state table 1331 to the "sub system standby state" (step S2008), and gives a promoted main system instruction to the sub system.

Also, in the event that the state of the main system is "main system standby state" in step S2004, the arbitrating device 1330 transitions the processing to step S2010. The arbitrating device 1330 then gives a stop instruction to the sub system (step S2010), and gives an accumulating main system instruction to the main system (step S2011).

Also, in the event that the state of the main system is "accumulating main system operating state" in step S2004, the arbitrating device 1330 transitions the processing to step S2012. The arbitrating device 1330 then gives a stop instruction to the sub system (step S2012).

Upon ending the above processing, the arbitrating device 1330 transitions the processing to step S2013, and ends the "determination processing regarding query from sub system".

Figure 21:
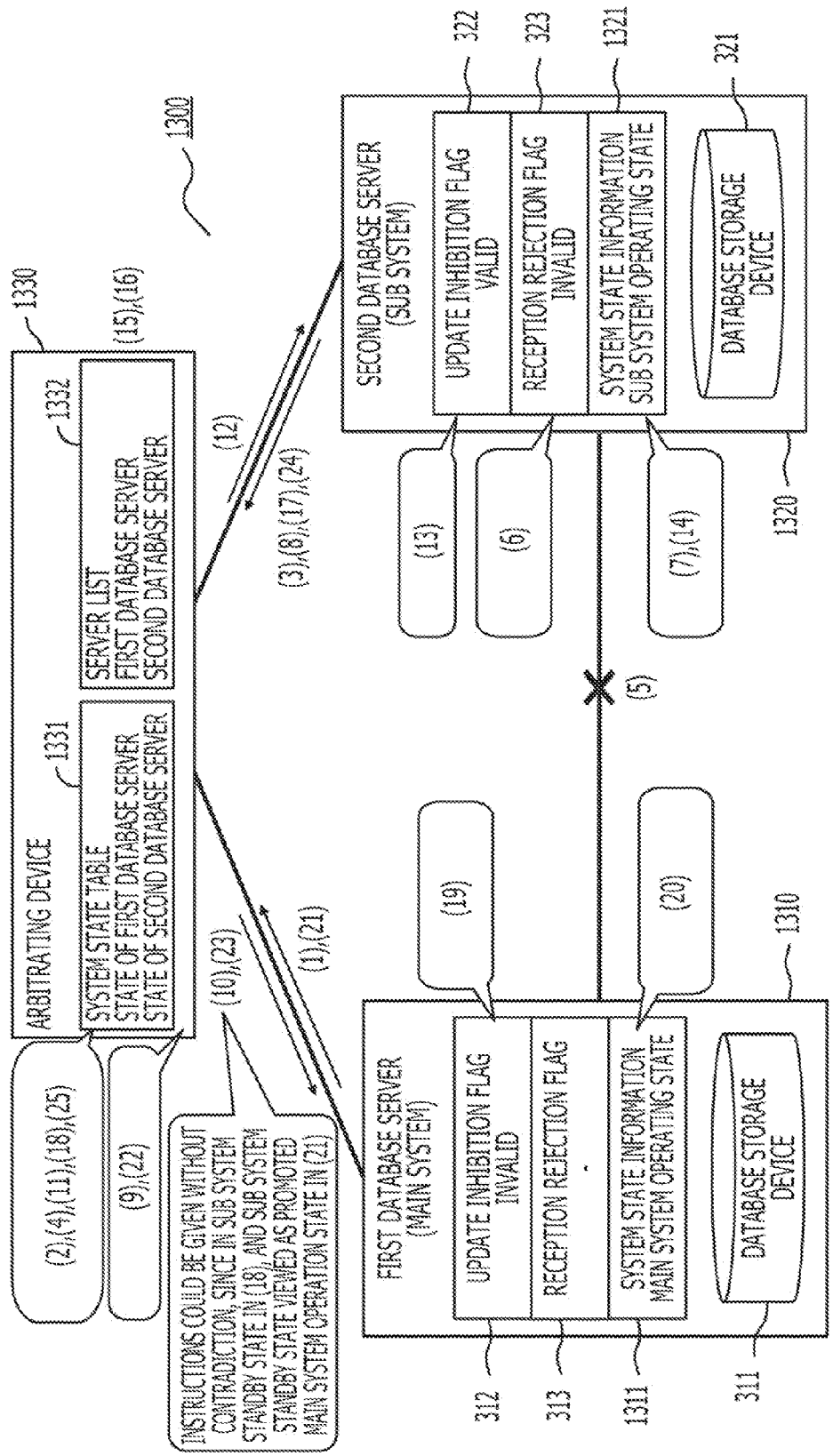
FIG. 21 is a diagram for describing operations of the database system according to the third embodiment.

FIG. 21 is a diagram for describing the operations of the database system 1300 according to the present embodiment. (1) through (25) in FIG. 21 correspond to the (1) through (25) below.

(1) The first database server 1310 which is the main system performs state notification to the arbitrating device 1330 to the effect that the first database server 1310 is in the "main system operating state". The first database server 1310 performs state notification periodically.

(2) Upon receiving notification from the first database server 1310 which is the main system to the effect of being in the "main system operating state", the arbitrating device 1330 sets the state of the first database server 1310 to be held in the system state table 1331 to "main system operating state" (step S1805 in FIG. 18).

(3) On the other hand, the second database server 1320 which is the sub system performs state notification to the arbitrating device 1330 to the effect that the second database server 1320 is in the "sub system operating state". The second database server 1320 performs state notification periodically.

(4) Upon receiving state notification from the second database server 1320 to the effect of being in the "sub system operating state", the arbitrating device 1330 sets the state of the second database server 1320 to be held in the system state table 1331 to "sub system operating state" (step S1805 in FIG. 18).

(5) Now, we will say that line breakage occurs in the network communicably connecting between the first database server 1310 and the second database server 1320. (6) Upon detecting an abnormality such as line breakage or the like in the network, the second database server 1320 which is the sub system sets the reception rejection flag 323 to "valid" (step S1606 in FIG. 16). Further, (7) the second database server 1320 changes the system state information 1321 from the "sub system operating state" to the "sub system standby state" (step S1607 in FIG. 16). Then, (8) the second database server 1320 makes a state transition query to the arbitrating device 1330 (step S1608 in FIG. 16).

(9) Upon receiving the state transition query from the second database server 1320 which is the sub system (NO at step S1807 in FIG. 18), the arbitrating device 1330 evaluates the first database server 1310 which is the main system (step S1809 in FIG. 18). Then, (10) following the evaluation, the arbitrating device 1330 gives a stop instruction to the first database server 1310 (step S2007 in FIG. 20).

(11) Also, the arbitrating device 1330 sets the state of the first database server 1310 to be held in the system state table 1331 to the "sub system standby state", in accordance with the system state information 1321 notified along with the state transition query (step S2008 in FIG. 20). Then, (12) the arbitrating device 1330 gives a promoted main system instruction to the second database server 1320 which is the sub system (step S2009 in FIG. 20).

(13) Upon receiving the promoted main system instruction, the second database server 1320 transitions to the promoted main system operating state (step S1707 in FIG. 17). The second database server 1320 then sets the update inhibition flag 322 to "invalid" (step S1709 in FIG. 17). Also, (14) the second database server 1320 changes the system state information 1321 to the "promoted main system operating state" (step S1708 in FIG. 17).

(15) Let us consider a case wherein the arbitrating device 1330 goes down. (16) In this case, the arbitrating device 1330 restarts in response to user instructions or the like. Then, (17) the second database server 1320 which is the sub system performs state notification to the effect that the second database server 1320 is in the "sub system standby state".

(18) Upon receiving the state notification from the second database server 1320 to the effect that it is in the "sub system standby state", the arbitrating device 1330 sets the state of the second database server 1320 to be held in the system state table 1331 to the "sub system standby state" (step S1805 in FIG. 18).

On the other hand, (19) upon detecting an abnormality such as a liken breakage or the like in the network, the first database server 1310 sets the update inhibition flag 312 to "valid" (step S1604 in FIG. 16). Then, (20) the first database server 1310 changes the system state information 1311 from "main system operation state" to "main system standby state" (step S1605 in FIG. 16). Further, (21) the first database server 1310 makes a state transition query to the arbitrating device 1330 (step S1608 in FIG. 16).

(22) Upon receiving the state transition query from the first database server 1310 which is the main system, the arbitrating device 1330 evaluates the second database server 1320 which is the sub system (step S1808 in FIG. 18). Then, (23) following the evaluation, the arbitrating device 1330 gives a stop instruction to the first database server 1310 (step S1910 in FIG. 19).

(24) Upon receiving a state notification from the second database server 1320 which is the sub system to the effect of being in the "promoted main system operation state", the arbitrating device 1330 sets the state of the second database server 1320 to be held in the system state table 1331 to "promoted main system operation state" (step S1805 in FIG. 18).

Figure 22:
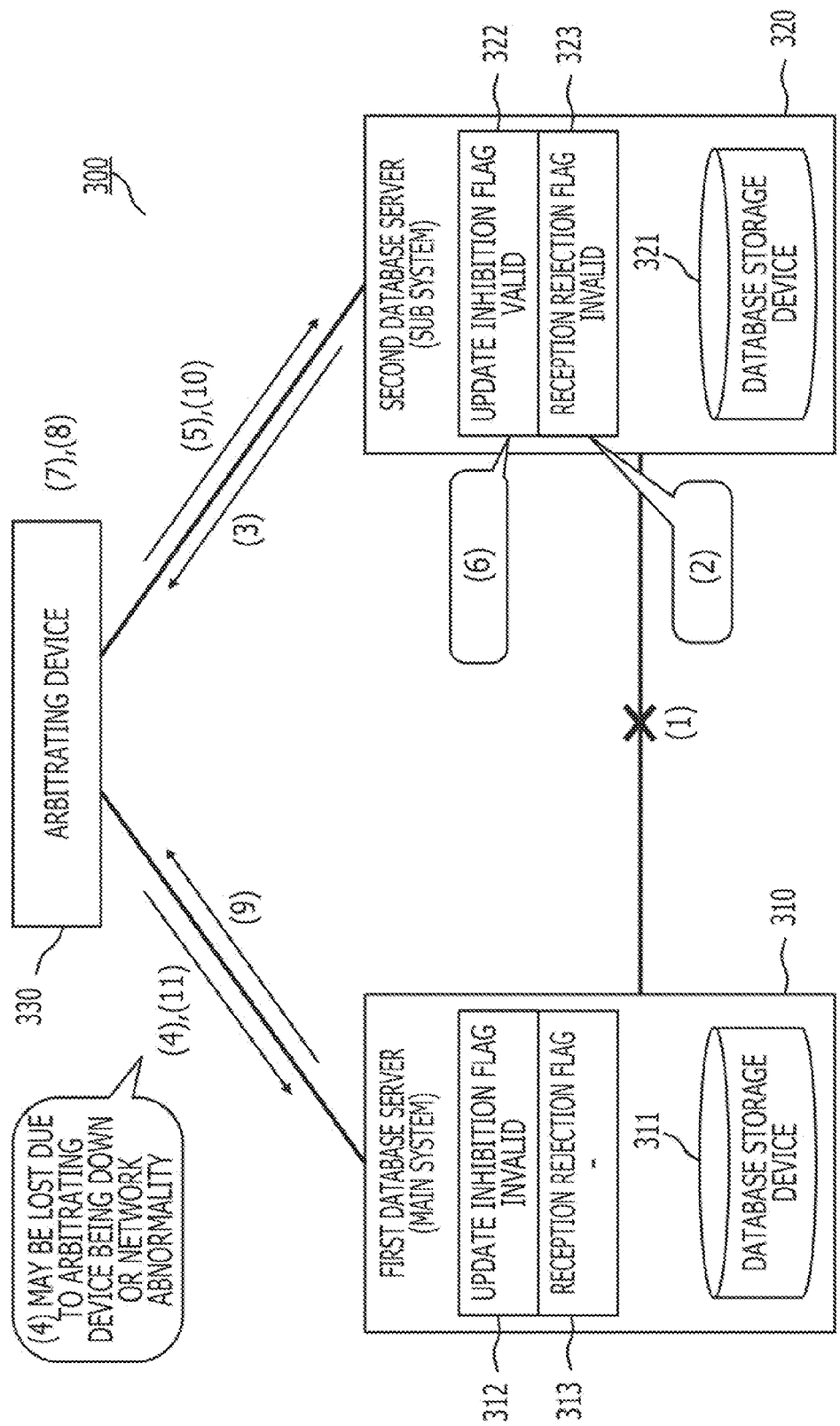
FIG. 22 is a diagram for describing contradicting instructions to systems at the time of the arbitrating device restarting.

With the processing described above, contradicting instructions to the systems due to restarting of the arbitrating device 1330 as illustrated in FIG. 22, can be inhibited. Note that FIG. 22 illustrates an example of problems which the database system 1300 can solve, and does not imply that only the problem illustrated in FIG. 22 can be solved. It is needless to say that, for example, the advantages illustrated in the second embodiment can also be had.

FIG. 22 is a diagram for describing contradicting instructions to systems at the time of the arbitrating device 1330 restarting. (1) through (11) in FIG. 21 correspond to the (1) through (11) below.

(1) We will say that line breakage has occurred in the network communicably connecting between the first database server 1310 and the second database server 1320. (2) Upon detecting an abnormality such as a line breakage or the like in the network, the second database server 320 sets the reception rejection flag 323 to "valid" (step S706 in FIG. 7). (3) Upon setting the reception rejection flag 323 to "valid", the second database server 320 makes a state transition query to the arbitrating device 330 (step S705 in FIG. 7). (4)

Upon receiving the state transition query from the second database server 320 which is the sub system (NO at step S904 in FIG. 9), the arbitrating device 330 notifies the first database server 310 which is the main system with a stop instruction (step S907 in FIG. 9). The first database server 310 which has received the stop instruction stops processes and the like necessary for operating as a database server (step S809 in FIG. 8). Also, (5) the arbitrating device 330 notifies the second database server 320 which is the sub system with a promoted main system instruction (step S908 in FIG. 9). (6) The second database server 320 which has received the promoted main system instruction sets the update inhibition flag 312 to invalid, and transitions to the promoted main system operation state (step S806 in FIG. 8).

(7) Now, we will consider a case where the arbitrating device 330 has gone down. (8) In the event that the arbitrating device 330 goes down, restarting processing of the arbitrating device 330 is performed, either manually or automatically.

(9) Upon receiving a state transition query from the first database server 310 following completion of restarting of the arbitrating device 330 (YES at step S904 in FIG. 9), (10) the arbitrating device 330 notifies the second database server 320 which is the sub system with a stop instruction (step S905 in FIG. 9). Also, (11) the arbitrating device 330 notifies the first database server 310 which is the main system with an accumulating main system instruction (step S906 in FIG. 9). The reason that the arbitrating device 330 operates in this way is that the restarting causes instructions, which had been given to the systems before restarting, to be lost.

In this way, the first database server 310 can (11) receive an accumulating main system instruction from the arbitrating device 330 and perform updating. The second database server 320 can (5) receive a promoted main system instruction from the arbitrating device 330 and perform updating. As a result, the database system 300 is in a split brain state.

On the other hand, the database system 1300 according to the present embodiment has the system state table 1331 for storing the state of the systems in the arbitrating device 1330. Upon receiving a state transition query from the main system, the arbitrating device 1330 evaluates the state of the sub system (step S1904 in FIG. 19), and upon receiving a state transition query from the sub system, evaluates the state of the main system (step S2004 in FIG. 20). The arbitrating device 1330 then following the evaluation results and gives state transition instructions as illustrated in FIG. 21 (23). Consequently, the contradicting instructions illustrated in FIG. 22 can be inhibited even when the arbitrating device 1330 restarts.

Fourth Embodiment

Figure 23:
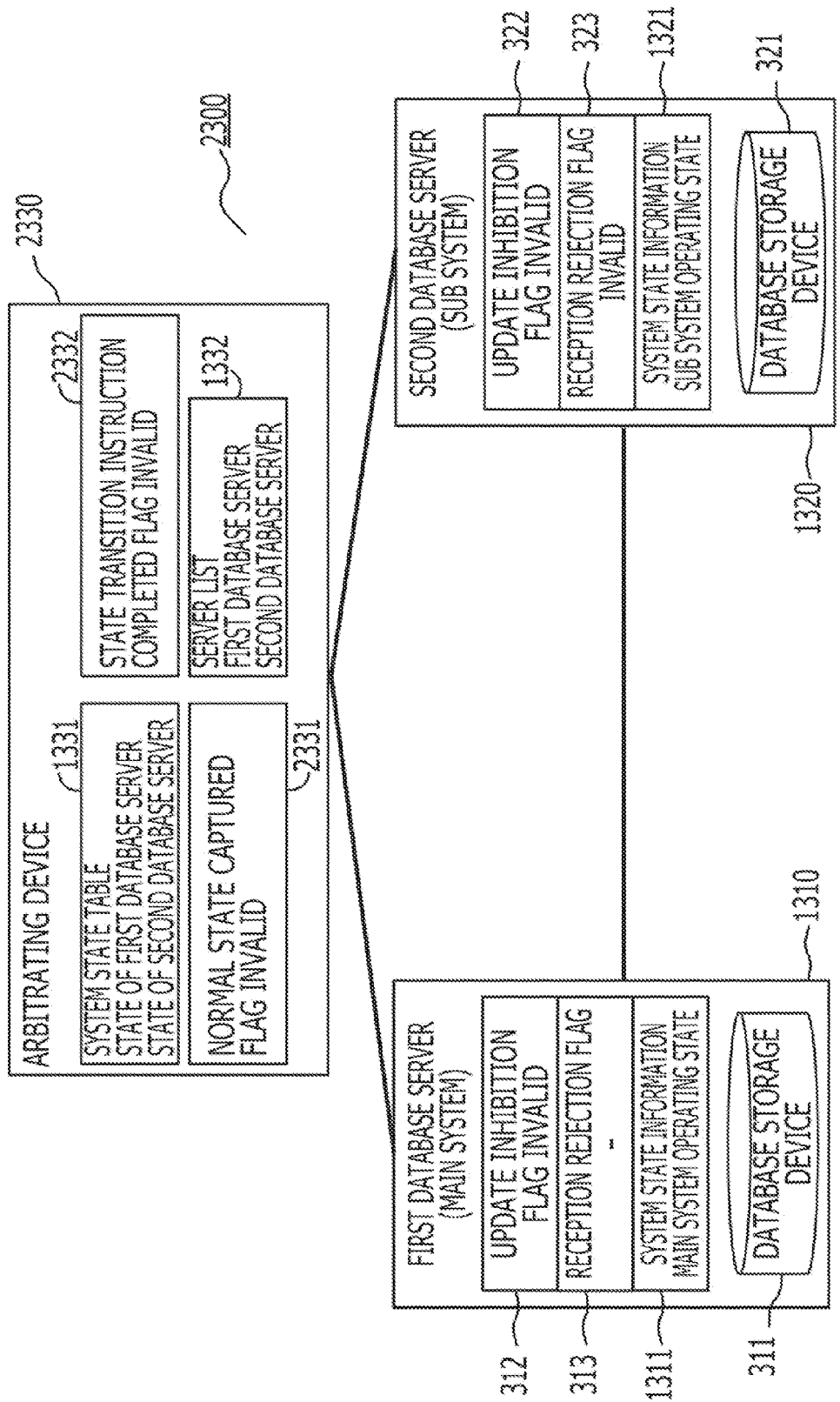
FIG. 23 is a diagram illustrating a configuration example of a database system according to a fourth embodiment.

FIG. 23 is a diagram illustrating a configuration example of a database system 2300 according to the present embodiment.

The database system 2300 according to FIG. 23 includes the first database server 1310, the second database server 1320, and an arbitrating device 2330. The first database server 1310, second database server 1320, and arbitrating device 2330 are connected via a network so as to be mutually communicable. Note however, that the first database server 1310, second database server 1320, and arbitrating device 2330 may be connected so as to be mutually communicable via a dedicated line or the like.

The database system 2300 in FIG. 23 illustrates a case wherein the first database server 1310 is the main system and the second database server 1320 is the sub system. The first database server 1310, second database server 1320, and arbitrating device 2330 can be realized by causing an information processing device of a configuration such as illustrated in FIG. 32 to execute a specified program, for example.

The database system 1300 in FIG. 23 has all of the configurations of the database system 1300 illustrated in FIG. 13. Accordingly, configurations which are the same as those in FIG. 13 are denoted with the same reference numerals, and specific description thereof will be omitted here.

The configurations, operations, and so forth of the first database server 1310 and second database server 1320 are as illustrated in FIGS. 13, 14, 16, and 17.

The arbitrating device 2330 gives state transition instruction such as stop instructions in accordance with the states of the first database server 1310 and the second database server 1320, so as to performing arbitration of the states of the first database server 1310 and the second database server 1320.

The arbitrating device 2330 has the system state table 1331 storing system state information notified from each system, and a server list 1332 storing the database servers which are connected to the arbitrating device 2330 and are the object of arbitration, which are the first database server 1310 and the second database server 1320 in FIG. 23.

Further, the arbitrating device 2330 has a normal state captured flag 2331 indicating that detection has been made that the database system 2300 is in a normal state, and a state transition instruction completed flag 2332 indicating that state transition instruction has been made as to a system.

Here, the database system 2300 being in a "normal state" means that the first database server 1310 which is the main system is in the main system operation state, and the second database server 1320 which is the sub system is in the sub system operation state, i.e., that the database system 2300 is being operated in a redundant state.

The system state table 1331, normal state captured flag 2331, and state transition instruction completed flag 2332 may be held in volatile memory such as RAM provided to the arbitrating device 2330, or may be held in non-volatile memory such as EPROM or a magnetic disk or the like provided to the arbitrating device 2330. Note however, that in the case of holding the system state table 1331, normal state captured flag 2331, or state transition instruction completed flag 2332 in volatile memory, the arbitrating device 2330 needs to perform restarting processing without initializing the volatile memory. This is in order to hold the contents of the system state table 1331, normal state captured flag 2331, and state transition instruction completed flag 2332 even when restarting.

Figure 24:
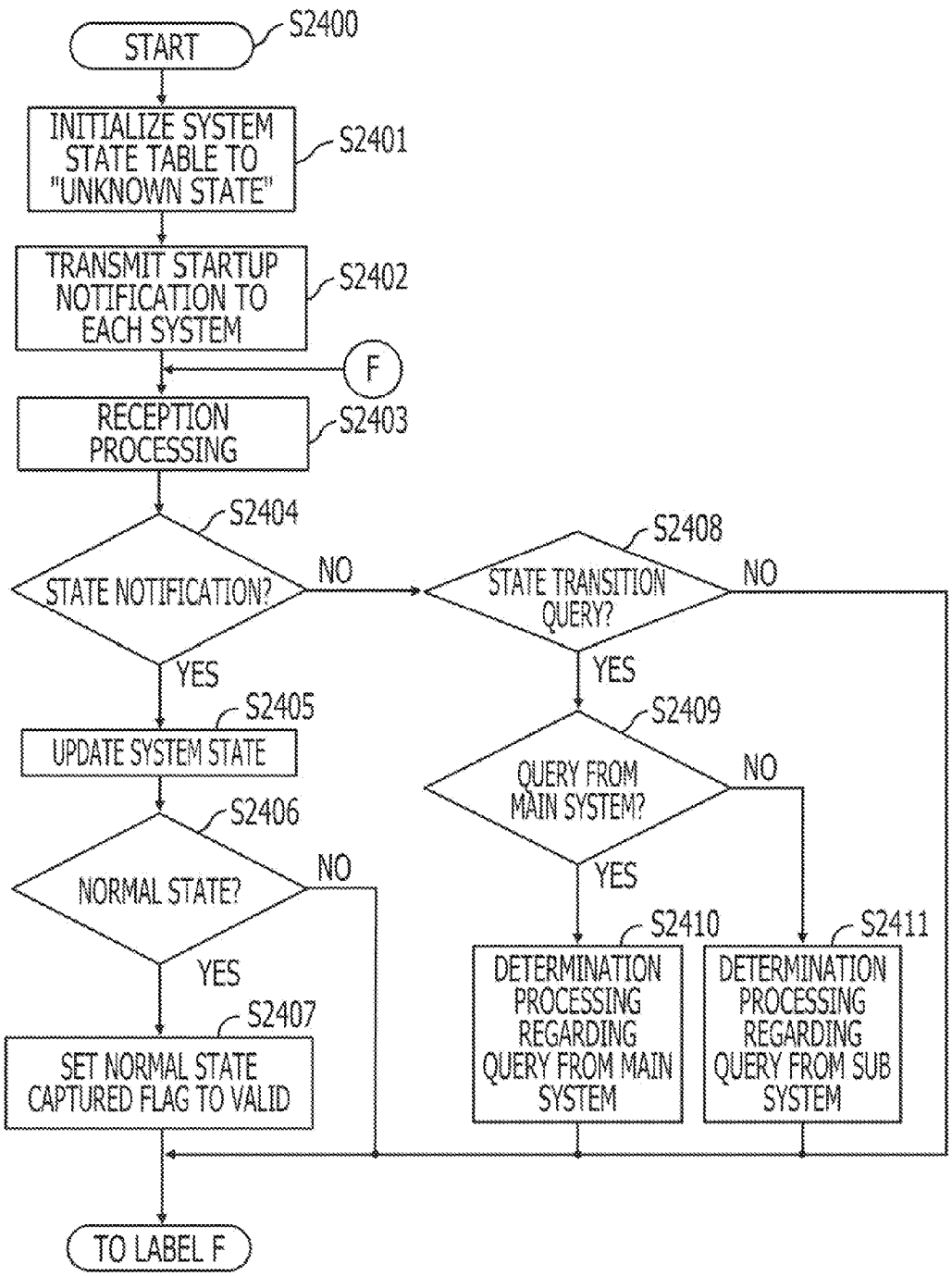
FIG. 24 is a flowchart illustrating processing of the arbitrating device according to the fourth embodiment.

FIG. 24 is a flowchart illustrating the processing of the arbitrating device 2330 according to the present embodiment.

Upon the power being turned on to the arbitrating device 2330, the arbitrating device 2330 starts the startup processing (step S2400). Upon the startup processing being completed, the arbitrating device 2330 executes initialization processing that is necessary for operating as an arbitrating device (step S2401). For example, the arbitrating device 2330 initializes the system state table 1331. At this time, the arbitrating device 2330 sets "unknown state" to the system state information of the first database server 1310 and the system state information of the second database server 1320 to be held in the system state table 1331.

Upon initialization being completed, the arbitrating device 2330 transmits a startup notification to the effect that startup processing of the arbitrating device 2330 has been completed (step S2402).

In step S2403, in the event of receiving a state notification or the like from a system, the arbitrating device 2330 transitions the processing to step S2404. In the event of receiving a state notification from a system (YES in step S2404), the arbitrating device 2330 updates the system state information 1311 according to the state notification from the system (step S2405).

In step S2406, the arbitrating device 2330 references the system state table 1311 and distinguishes whether or not the database system 2300 is in the normal state, i.e., that the first database server 1310 which is the main system is in the main system operating state and the second database server 1320 which is the sub system is in the sub system operating state.

In the event that the database system 2300 is in the normal state (YES in step S2406), the normal state captured flag 2331 is set to "valid" (step S2407). The arbitrating device 2330 then restarts the processing from step S2403. Even in the event that the database system 2300 is not is in the normal state (NO in step S2406), the arbitrating device 2330 restarts the processing.

On the other hand, in the event of receiving not a state notification but a state transition query from a system (NO in step S2404, YES in step S2408), the arbitrating device 2330 transitions the processing to step S2409. In the event that the state transition query received in step S2403 is a query from the main system (YES in step S2409), the arbitrating device 2330 performs determination processing regarding the query from the main system (step S2410). This "determination processing regarding query from main system" is illustrated in FIG. 25.

Figure 26:
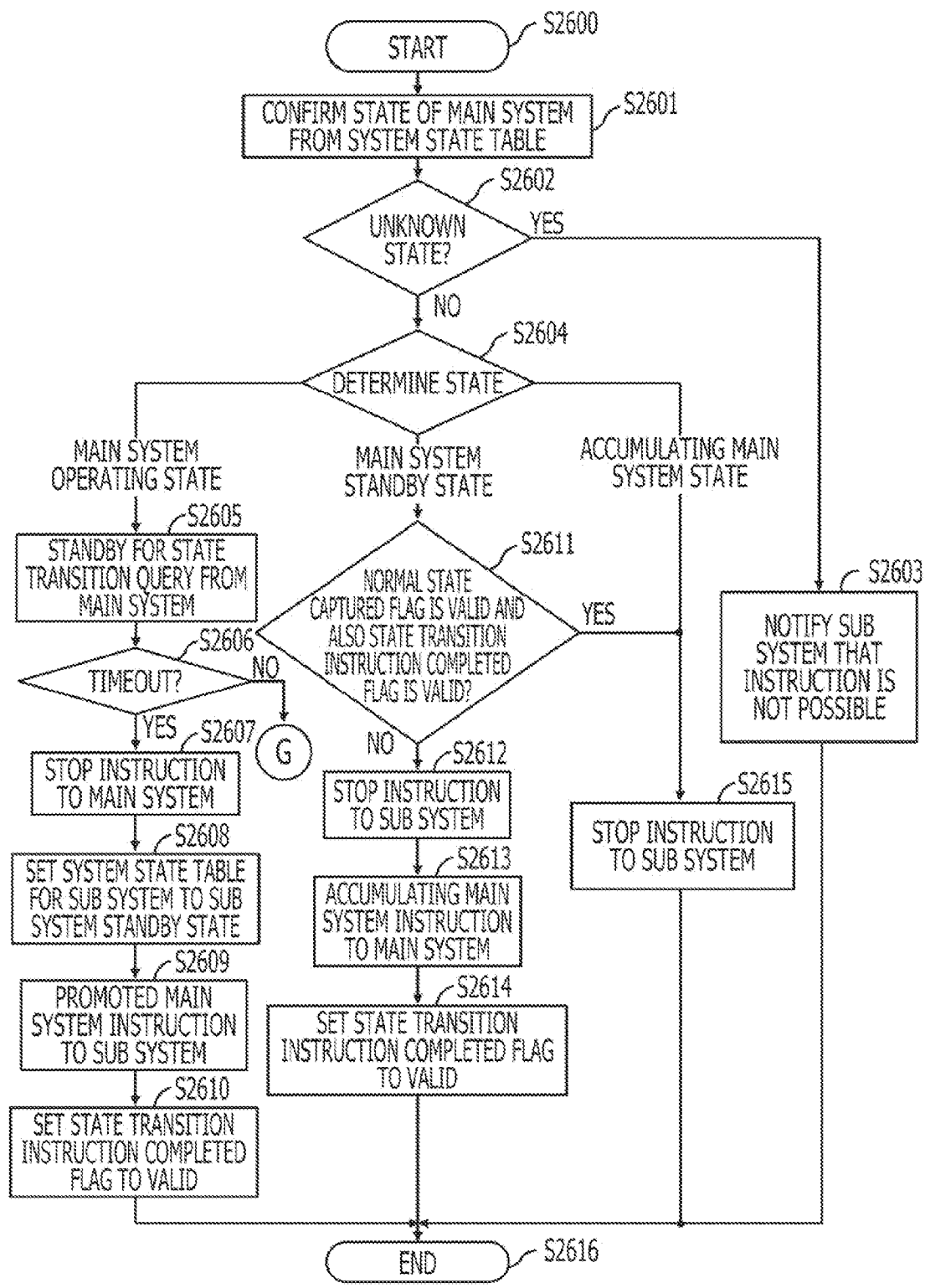
FIG. 26 is a flowchart illustrating "Determination Processing as to Query from Sub System" of the arbitrating device (step S2411) according to the fourth embodiment.

Also, in the event that the state transition query received in step S2403 is a query from the sub system (NO in step S2409), the arbitrating device 2330 performs determination processing regarding the query from the sub system (step S2411). This "determination processing regarding query from sub system" is illustrated in FIG. 26.

On the other hand, in the event that the state transition query received in step S2403 is neither a state notification nor a state transition query from a system (NO in step S2408), The arbitrating device 2330 restarts the processing from step S2403. In the same way, upon the processing of steps S2410 and 2411 ending, the arbitrating device 2330 restarts the processing from step S2403.

Figure 25:
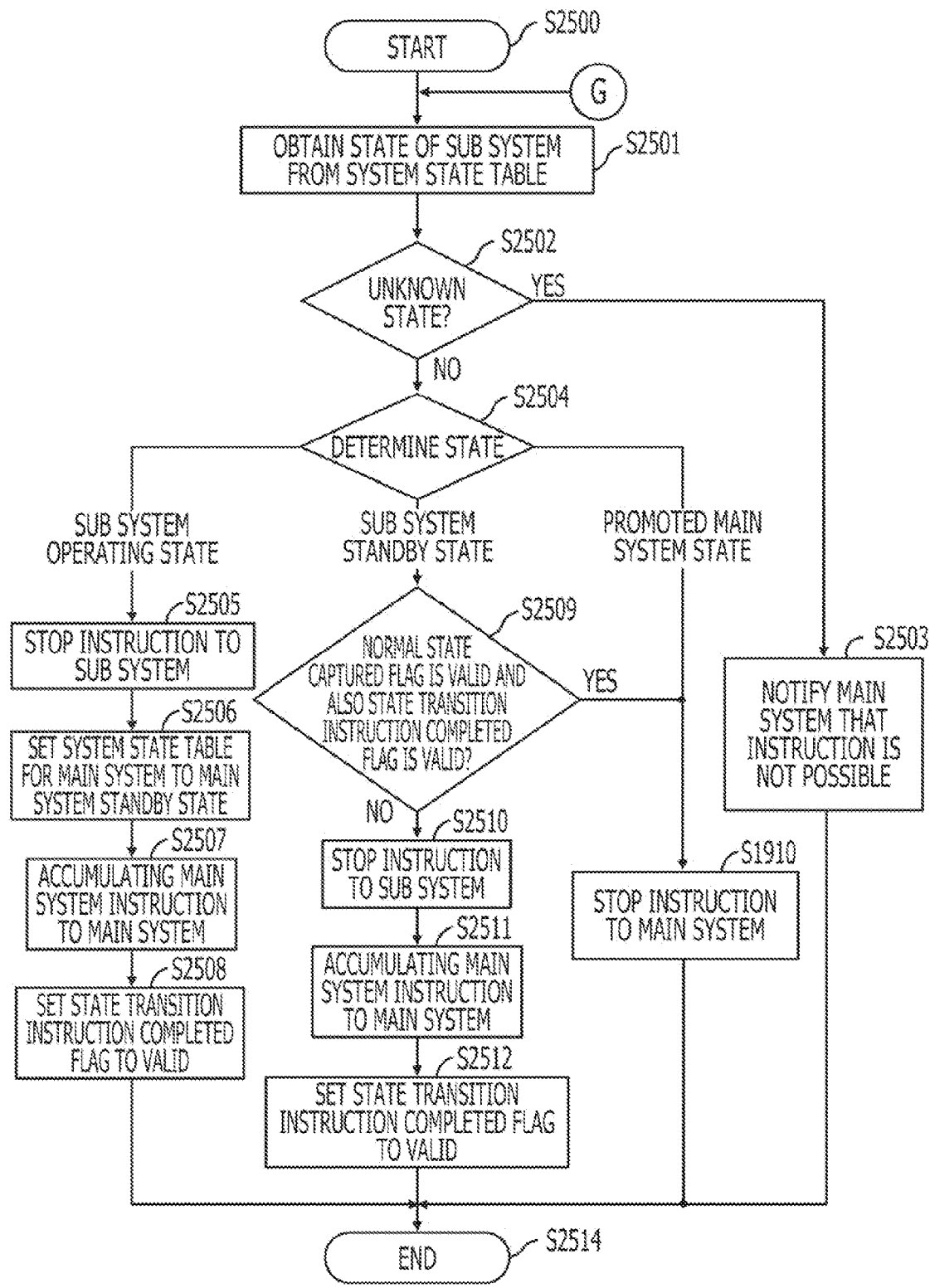
FIG. 25 is a flowchart illustrating "Determination Processing as to Query from Main System" of the arbitrating device (step S2410) according to the fourth embodiment.

FIG. 25 is a flowchart illustrating the "determination processing regarding query from main system" (step S2410) of the arbitrating device 2330 according to the present embodiment.

In step S2501, the arbitrating device 2330 obtains the state of the second database server 1320 which is the sub system, from the system state table 1331. In the event that the obtained state of the sub system is "unknown state" (YES in step S2502), the arbitrating device 2330 notifies the main system that instruction is impossible (step S2503). Also, in the event that the obtained state of the sub system is a state other than "unknown state" (NO in step S2502), the arbitrating device 2330 transitions the processing to step S2504.

In step S2504, the arbitrating device 2330 determines the state of the sub system obtained in step S2501. In the event that the state of the sub system is the "sub system operating state", the arbitrating device 2330 transitions the processing to step S2505. The arbitrating device 2330 then gives a stop instruction to the sub system (step S2505). The arbitrating device 2330 then sets the state of the main system held in the system state table 1331 to the "main system standby state" (step S2506). The arbitrating device 2330 then gives an accumulating main system instruction to the main system (step S2507), and sets the state transition instruction completed flag 2332 to "valid" (step S2508).

Also, in the event that the state of the sub system is "sub system standby state" in step S2504, the arbitrating device 2330 transitions the processing to step S2509. In the event that at least one of the normal state captured flag 2331 and state transition instruction completed flag 2332 is "invalid" (NO in step S2509), the arbitrating device 2330 transitions the processing to step S2510.

The arbitrating device 2330 then gives a stop instruction to the sub system (step S2510), and gives an accumulating main system instruction to the main system (step S2511). Further, the arbitrating device 2330 sets the state transition instruction completed flag 2332 to "valid" (step S2512).

Also, in the event that in step S2509, the normal state captured flag 2331 is "valid" and the state transition instruction completed flag 2332 is "valid" (YES in step S2509), the arbitrating device 2330 gives a stop instruction to the main system (step S2513).

Also, in the event that the state of the sub system is "promoted main system operating state" in step S2504, the arbitrating device 2330 transitions the processing to step S2513. The arbitrating device 2330 then gives a stop instruction to the main system (step S2513).

Upon ending the above processing, the arbitrating device 2330 transitions the processing to step S2514, and ends the "determination processing regarding query from main system".

FIG. 26 is a flowchart illustrating the "determination processing regarding query from sub system" (step S2411) of the arbitrating device 2330 according to the present embodiment.

In step S2601, the arbitrating device 2330 obtains the state of the first database server 1310 which is the main system, from the system state table 1331. In the event that the obtained state of the main system is the "unknown state" (YES in step S2602), the arbitrating device 2330 makes notification to the sub system to the effect that instructions cannot be given (step S2603). In the event that the state of the main system that has been obtained is a state other than "unknown state" (NO in step S2602), the arbitrating device 2330 transitions the processing to step S2604.

In step S2604, the arbitrating device 2330 determines the state of the main system obtained in step S2601. In the event that the state of the main system is the "main system operating state", the arbitrating device 2330 transitions the processing to step S2605. The arbitrating device 2330 then stands by for a state transition query from the main system for a certain time period. In the event that no state transition query is received from the main system after the certain time period, the arbitrating device 2330 detects a timeout.

In the event that a timeout is not detected (NO in Step S2606), the arbitrating device 2330 transitions the processing to step S2613 and ends the "determination processing regarding query from sub system". Also, in the event that a timeout is detected (YES in Step S2606), the arbitrating device 2330 gives a stop instruction to the main system (step S2607). The arbitrating device 2330 then sets the state of the sub system held in the system state table 1331 to the "sub system standby state" (step S2608), and gives a promoted main system instruction to the sub system (step S2609). Further, the arbitrating device 2330 sets the state transition instruction completed flag 2332 to "valid" (step S2610).

Also, in the event that the state of the main system is "main system standby state" in step S2604, the arbitrating device 2330 transitions the processing to step S2610. In the event that at least one of the normal state captured flag 2331 and state transition instruction completed flag 2332 is "invalid" (NO in step S2611), the arbitrating device 2330 transitions the processing to step S2612.

The arbitrating device 2330 then gives a stop instruction to the sub system (step S2612), and gives an accumulating main system instruction to the main system (step S2613). Further, the arbitrating device 2330 sets the state transition instruction completed flag 2332 to "valid" (step S2614).

Also, in the event that the normal state captured flag 2331 is "valid" and the state transition instruction completed flag 2332 is "valid" in step S2611 (YES in step S2611), the arbitrating device 2330 gives a stop instruction to the sub system (step S2615).

Also, in the event that the state of the main system is "accumulating main system operating state" in step S2604, the arbitrating device 2330 transitions the processing to step S2615. The arbitrating device 2330 then gives a stop instruction to the sub system (step S2615).

Upon ending the above processing, the arbitrating device 2330 transitions the processing to step S2616, and ends the "determination processing regarding query from sub system".

The following is a description of the operations of the database system 2300 according to the present embodiment with reference to FIGS. 27 through 30.

Figure 27:
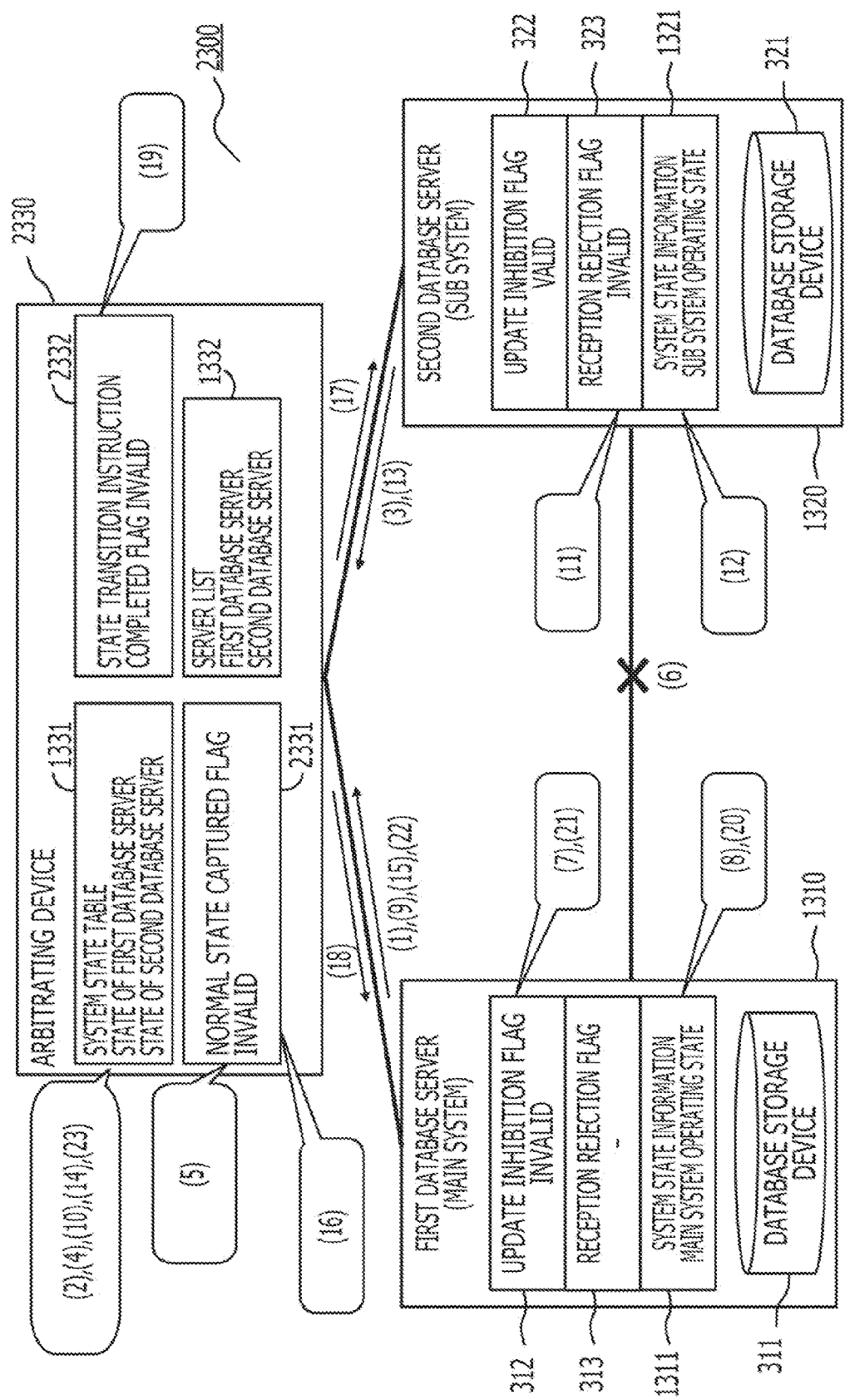
FIG. 27 is a diagram for describing specific processing of the database system according to the fourth embodiment.

FIG. 27 is a diagram for describing the detailed operations of the database system 2300 according to the present embodiment. Note that FIG. 27 illustrates a cases where the arbitrating device 2330 does not have processing for standing by (step S2605 in FIG. 26) for a state transition query from the main system for a specified amount of time in the event of receiving a state transition query from the sub system. (1) through (23) in FIG. 27 correspond to the (1) through (23) below.

(1) The first database server 1310 which is the main system periodically performs state notification to the arbitrating device 2330. The first database server 1310 in FIG. 27 has system state information 1311 that the first database server 1310 is in the main system operating state, so state notification to the effect of being in the main system operating state is made to the arbitrating device 2330.

(2) Upon receiving state notification from the first database server 1310 which is the main system (YES at step S2404 in FIG. 24), the arbitrating device 2330 stores the system state of the first database server 1310 in the system state table 1331 (step S2405 in FIG. 24). For example, upon receiving state notification from the first database server 1310 to the effect of being in the main system operating state, the arbitrating device 2330 makes storage to the system state table 1331 to the effect that the first database server 1310 is in the main system operating state.

(3) The second database server 1320 which is the sub system periodically performs state notification to the arbitrating device 2330. The second database server 1320 in FIG. 27 has system state information 1321 that the second database server 1320 is in the sub system operating state, so state notification to the effect of being in the sub system operating state is made to the arbitrating device 2330.

(4) Upon receiving state notification from the second database server 1320 which is the sub system (YES at step S2404 in FIG. 24), the arbitrating device 2330 stores the system state of the second database server 1320 in the system state table 1331 (step S2405 in FIG. 24). For example, upon receiving state notification from the second database server 1320 to the effect of being in the sub system operating state, the arbitrating device 2330 makes storage to the system state table 1331 to the effect that the second database server 1320 is in the sub system operating state.

(5) The arbitrating device 2330 checks the system state table 1331, periodically for example. In the event that the arbitrating device 2330 detects that the first database server 1310 which is the main system is in the main system operating state and the second database server 1320 which is the sub system is in the sub system operating state, the arbitrating device 2330 judges that the state is a normal state (YES at step S2406 in FIG. 24). The arbitrating device 2330 then sets the normal state captured flag 2331 to "valid" (step S2407 in FIG. 24).

Let us say that once the normal state captured flag 2331 is set to "valid", this is not changed hereafter.

(6) Now, we will say that line breakage has occurred in the network communicably connecting between the first database server 1310 and the second database server 1320. (7) Upon detecting an abnormality such as line breakage or the like in the network, the first database server 1310 which is the main system sets the update inhibition flag 312 to "valid" (step S1604 in FIG. 16). Then, (8) the first database server 1310 sets the system state information 1311 to the main system standby state (step S1605 in FIG. 16).

(9) Now, the first database server 1310 periodically performs state notification. In the event of performing state notification at this timing, the first database server 1310 performs state notification to the arbitrating device 2330 to the effect of being in the main system standby state.

(10) Upon receiving the state notification from the first database server 1310 which is the main system (YES at step S2404 in FIG. 24), the arbitrating device 2330 stores the system state of the first database server 1310 in the system state table 1331 (step S2405 in FIG. 24). For example, in the event of receiving state notification from the first database server 1310 to the effect of being in the main system standby state, the arbitrating device 2330 updates the information in the system state table 1331 regarding the first database server 1310 from the main system operation state to the main system standby state.

(11) On the other hand, in the event of detecting an abnormality such as a line breakage or the like in the network, the second database server 1320 which is the sub system sets the reception rejection flag 323 to "valid" (step S1606 in FIG. 16). Then, (12) the second database server 1320 sets the system state information 1321 to the sub system standby state (step S1607 in FIG. 16).

(13) The second database server 1320 periodically performs state notification. In the event of performing state notification at this timing, the second database server 1320 performs state notification to the arbitrating device 2330 to the effect of being in the sub system standby state.

(14) Upon receiving the state notification from the second database server 1320 which is the sub system (YES at step S2404 in FIG. 24), the arbitrating device 2330 stores the system state of the second database server 1320 in the system state table 1331 (step S2405 in FIG. 24). For example, in the event of receiving state notification from the second database server 1320 to the effect of being in the sub system standby state, the arbitrating device 2330 updates the information in the system state table 1331 regarding the second database server 1320 from the sub system operation state to the sub system standby state.

(15) Now, we will say that the first database server 1310 makes a state transition query to the arbitrating device 2330 before the second database server 1320 (step S1608 in FIG. 16).

(16) Upon receiving the state transition query from the first database server 1310 which is the main system, the arbitrating device 2330 refers to the system state table 1331 and evaluates the second database server 1320 which is the sub system (step S2504 in FIG. 25).

Now, information in the system state table 1331 regarding the second database server 1320 is the sub system standby state (from step S2504 to S2509 in FIG. 25). Also, the normal state captured flag 2331 is set to "valid", and the state transition instruction completed flag 2332 is set to "invalid" (NO at step S2509 in FIG. 25).

(17) Accordingly, the arbitrating device 2330 gives a stop instruction to the second database server 1320 which is the sub system (step S2510 in FIG. 25). Then, (18) the arbitrating device 2330 gives an accumulating main system instruction to the first database server 1310 which is the main system (step S2511 in FIG. 25). Accordingly, (19) the arbitrating device 2330 sets the state transition instruction completed flag 2332 to "valid" (step S2512 in FIG. 25).

(20) The first database server 1310 which has received the accumulating main system instruction from the arbitrating device 2330 sets the system state information 1311 to the accumulating main system operation state (step S1705 in FIG. 17). The first database server 1310 transitions to the accumulating main system operation state. Further, (21) the first database server 1310 sets the update inhibition flag 312 to "invalid" (step S1709 in FIG. 17). Subsequently, the database storage device 311 can be updated at the first database server 1310.

(22) The first database server 1310 notifies the arbitrating device 2330 to the effect that the system state is the accumulating main system operation state, by the state notification performed periodically.

(23) Upon receiving the state notification from the first database server 1310 which is the main system (YES at step S2404 in FIG. 24), the arbitrating device 2330 stores the system state of the first database server 1310 in the system state table 1331 (step S2405 in FIG. 24). For example, upon receiving state notification from the first database server 1310 to the effect of being in the accumulating main system operation state, the arbitrating device 2330 updates the information in the system state table 1331 regarding the first database server 1310 from the main system standby state to the accumulating main system operation state.

Figure 28:
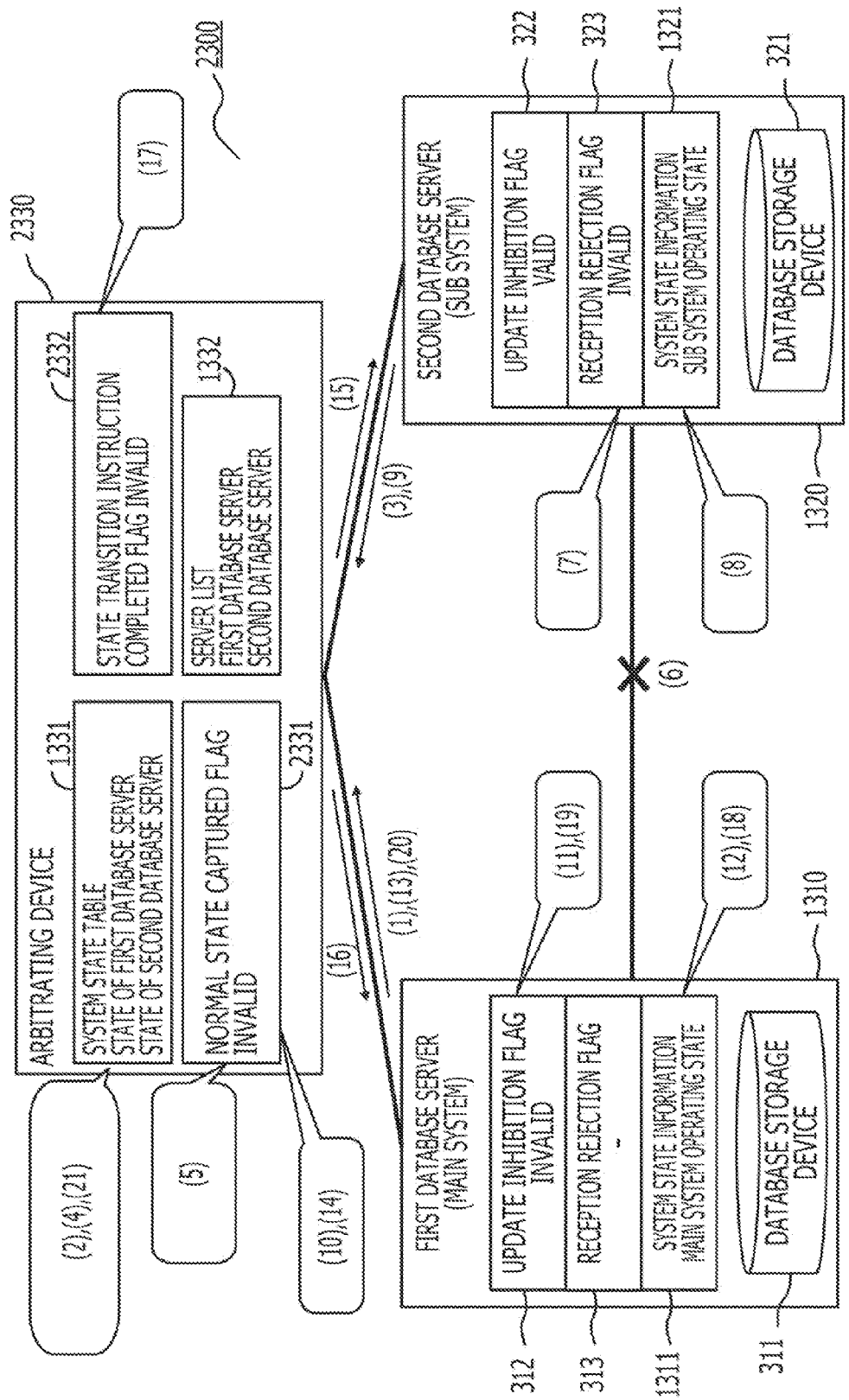
FIG. 28 is a diagram for describing specific processing of the database system having processing for standing by for a certain amount of time for a state transition query from the main system (step S2605), in the event that the arbitrating device according to the fourth embodiment has received a state transition query from the sub system.

FIG. 28 is a diagram for describing specific operations of the database system 2300 with the arbitrating device 2330 having processing for standby for a state transition query from the main system for a certain time period in the event of having received a state transition query from the sub system (step S2605). FIG. 28 illustrates a case in which the standby from the main system does not timeout. Note that (1) through (21) in FIG. 28 correspond to the (1) through (21) below.

(1) The first database server 1310 which is the main system periodically performs state notification to the arbitrating device 2330. The first database server 1310 in FIG. 28 has system state information 1311 that the first database server 1310 is in the main system operating state, so state notification to the effect of being in the main system operating state is made to the arbitrating device 2330.

(2) Upon receiving state notification from the first database server 1310 which is the main system (YES at step S2404 in FIG. 24), the arbitrating device 2330 stores the system state of the first database server 1310 in the system state table 1331 (step S2405 in FIG. 24). For example, upon receiving state notification from the first database server 1310 to the effect of being in the main system operating state, the arbitrating device 2330 makes storage to the system state table 1331 to the effect that the first database server 1310 is in the main system operating state.

(3) The second database server 1320 which is the sub system periodically performs state notification to the arbitrating device 2330. The second database server 1320 in FIG. 28 has system state information 1321 that the second database server 1320 is in the sub system operating state, so state notification to the effect of being in the sub system operating state is made to the arbitrating device 2330.

(4) Upon receiving state notification from the second database server 1320 which is the sub system (YES at step S2404 in FIG. 24), the arbitrating device 2330 stores the system state of the second database server 1320 in the system state table 1331 (step S2405 in FIG. 24). For example, upon receiving state notification from the second database server 1320 to the effect of being in the sub system operating state, the arbitrating device 2330 makes storage to the system state table 1331 to the effect that the second database server 1320 is in the sub system operating state.

(5) The arbitrating device 2330 checks the system state table 1331, periodically for example. In the event that the arbitrating device 2330 detects that the first database server 1310 which is the main system is in the main system operating state and the second database server 1320 which is the sub system is in the sub system operating state, the arbitrating device 2330 judges that the state is a normal state (YES at step S2406 in FIG. 24). The arbitrating device 2330 then sets the normal state captured flag 2331 to "valid" (step S2407 in FIG. 24).

Let us say that once the normal state captured flag 2331 is set to "valid", this is not changed hereafter.

(6) Now, we will say that line breakage has occurred in the network communicably connecting between the first database server 1310 and the second database server 1320. (7) Upon detecting an abnormality such as line breakage or the like in the network, the second database server 1320 which is the sub system sets the reception rejection flag 323 to "valid" (step S1606 in FIG. 16). Then, (8) the second database server 1320 sets the system state information 1321 to the sub system standby state (step S1607 in FIG. 16). Thereupon, (9) the second database server 1320 makes a state transition query to the arbitrating device 2330 (step S1608 in FIG. 16).

(10) Upon receiving a state transition query from the second database server 1320 which is the sub system (YES at step S1807 in FIG. 18), the arbitrating device 2330 evaluates the first database server 1310 which is the main system (step S2604 in FIG. 26). In the event that the first database server 1310 which is the main system is in the main system operation state, the arbitrating device 2330 stands by for a certain period of time for a state transition query from the main system before instructing each system to perform state transition (step S2605 in FIG. 26).

(11) On the other hand, in the event of detecting an abnormality such as a line breakage or the like in the network, The first database server 1310 sets the update inhibition flag 312 to "valid" (step S1604 in FIG. 16). Then (12) the first database server 1310 sets the system state information 1321 to the main system standby state (step S1605 in FIG. 16). Thereupon, (13) the first database server 1310 performs a state transition query to the arbitrating device 2330 (step S1608 in FIG. 16).

(14) In the event of receiving the state transition query from the first database server 1310 in (10) above within the set certain time period (NO at step S2606 in FIG. 26), the arbitrating device 2330 discards the state transition query from the sub system in (9) above. The arbitrating device 2330 then performs processing regarding the state transition query from the main system.

Now, the information in the system state table 1331 regarding the second database server 1320 is the sub system standby state (from step S2504 to S2509 in FIG. 25). Also, the normal state captured flag 2331 is set to "valid", and the state transition instruction completed flag 2332 is set to "invalid" (NO at step S2509 in FIG. 25).

(15) Accordingly, the arbitrating device 2330 gives a stop instruction to the second database server 1320 which is the sub system (step S2510 in FIG. 25). Then, (16) the arbitrating device 2330 gives an accumulating main system instruction to the first database server 1310 which is the main system (step S2511 in FIG. 25). Thereupon, (17) the arbitrating device 2330 sets the state transition instruction completed flag 2332 to "valid" (step S2512 in FIG. 25).

(18) The first database server 1310 which has received the accumulating main system instruction from the arbitrating device 2330 sets the system state information 1311 to the accumulating main system operation state (step S1705 in FIG. 17). Hereafter, the first database server 1310 transitions to the accumulating main system operation state. Further, (19) the first database server 1310 sets the update inhibition flag 312 to "invalid" (step S1709). Subsequently, the database storage device 311 can be updated at the first database server 1310.

(20) The first database server 1310 notifies the arbitrating device 2330 to the effect that the system state is the accumulating main system operation state, by the state notification performed periodically.

(21) Upon receiving the state notification from the first database server 1310 which is the main system (YES at step S2404 in FIG. 24), the arbitrating device 2330 stores the system state of the first database server 1310 in the system state table 1331 (YES at step S2405 in FIG. 24). For example, upon receiving state notification from the first database server 1310 to the effect of being in the accumulating main system operation state, the arbitrating device 2330 updates the information in the system state table 1331 regarding the first database server 1310 from the main system standby state to the accumulating main system operation state.

Figure 29:
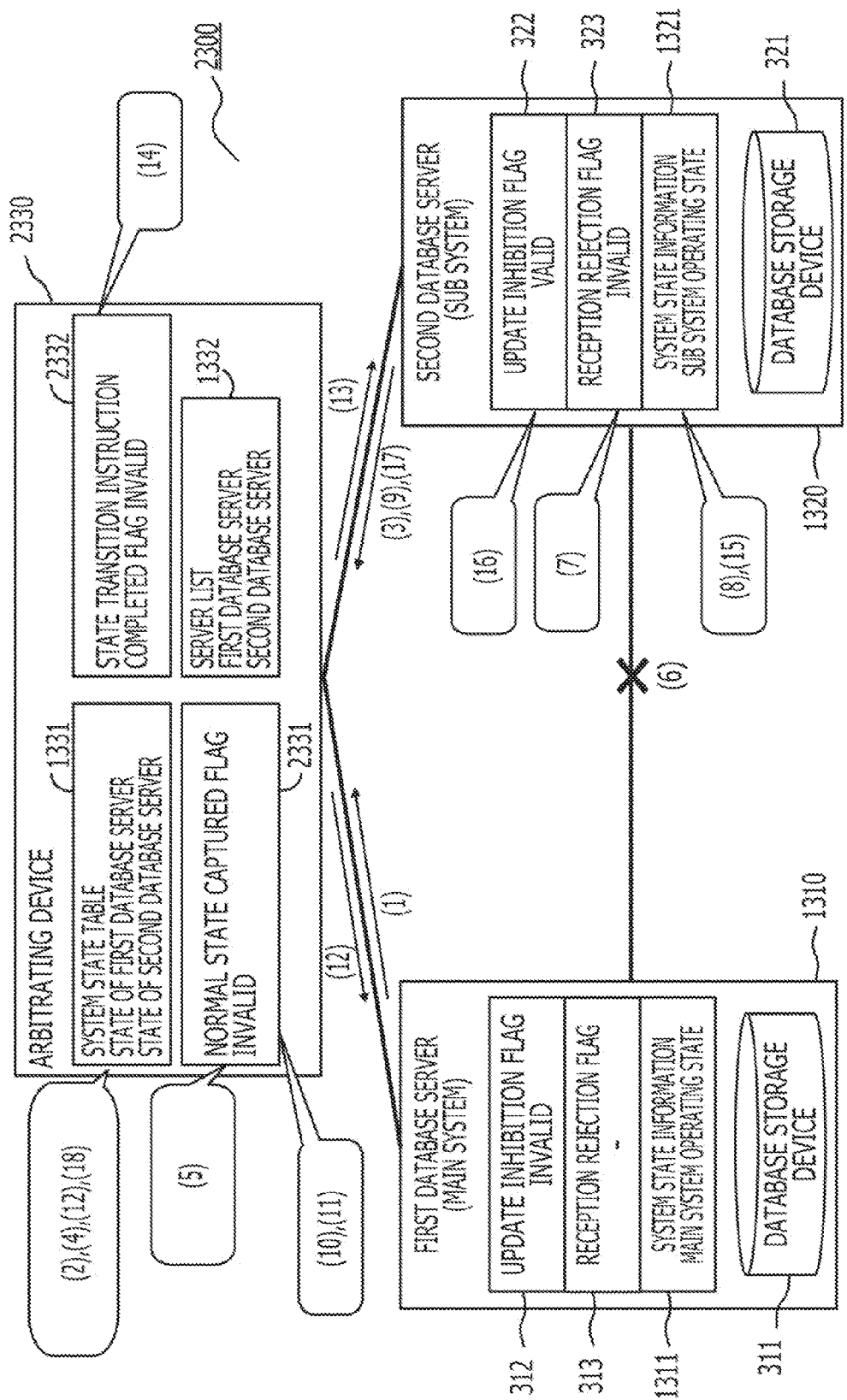
FIG. 29 is a diagram for describing specific processing of the database system having processing for standing by for a certain amount of time for a state transition query from the main system (step S2605), in the event that the arbitrating device according to the fourth embodiment has received a state transition query from the sub system.

FIG. 29 is a diagram for describing specific operations of the database system 2300 with the arbitrating device 2330 having processing for standby for a state transition query from the main system for a certain time period in the event of having received a state transition query from the sub system (step S2605 in FIG. 26). FIG. 29 illustrates a case in which the standby from the main system does timeout. Note that (1) through (18) in FIG. 29 correspond to the (1) through (18) below.

(1) The first database server 1310 which is the main system periodically performs state notification to the arbitrating device 2330. The first database server 1310 in FIG. 29 has system state information 1311 that the first database server 1310 is in the main system operating state, so state notification to the effect of being in the main system operating state is made to the arbitrating device 2330.

(2) Upon receiving state notification from the first database server 1310 which is the main system (YES at step S2404 in FIG. 24), the arbitrating device 2330 stores the system state of the first database server 1310 in the system state table 1331 (step S2405 in FIG. 24). For example, upon receiving state notification from the first database server 1310 to the effect of being in the main system operating state, the arbitrating device 2330 makes storage to the system state table 1331 to the effect that the first database server 1310 is in the main system operating state.

(3) The second database server 1320 which is the sub system periodically performs state notification to the arbitrating device 2330. The second database server 1320 in FIG. 29 has system state information 1321 that the second database server 1320 is in the sub system operating state, so state notification to the effect of being in the sub system operating state is made to the arbitrating device 2330.

(4) Upon receiving state notification from the second database server 1320 which is the sub system (YES at step S2404 in FIG. 24), the arbitrating device 2330 stores the system state of the second database server 1320 in the system state table 1331 (step S2405 in FIG. 24). For example, upon receiving state notification from the second database server 1320 to the effect of being in the sub system operating state, the arbitrating device 2330 makes storage to the system state table 1331 to the effect that the second database server 1320 is in the sub system operating state.

(5) The arbitrating device 2330 checks the system state table 1331, periodically for example. In the event that the arbitrating device 2330 detects that the first database server 1310 which is the main system is in the main system operating state and the second database server 1320 which is the sub system is in the sub system operating state, the arbitrating device 2330 judges that the state is a normal state (YES at step S2406 in FIG. 24). The arbitrating device 2330 then sets the normal state captured flag 2331 to "valid" (step S2407 in FIG. 24).

Let us say that once the normal state captured flag 2331 is set to "valid", this is not changed hereafter.

(6) Now, we will say that line breakage has occurred in the network communicably connecting between the first database server 1310 and the second database server 1320. (7) Upon detecting an abnormality such as line breakage or the like in the network, the second database server 1320 which is the sub system sets the reception rejection flag 323 to "valid" (step S1606). Then, (8) the second database server 1320 sets the system state information 1321 to the sub system standby state (step S1607 in FIG. 16). Thereupon, (9) the second database server 1320 makes a state transition query to the arbitrating device 2330 (step S1608 in FIG. 16).

(10) Upon receiving a state transition query from the second database server 1320 which is the sub system (YES at step S1807 in FIG. 18), the arbitrating device 2330 evaluates the first database server 1310 which is the main system (step S2604 in FIG. 26). In the event that the first database server 1310 which is the main system is in the main system operation state, the arbitrating device 2330 stands by for a certain period of time for a state transition query from the main system before instructing each system to perform state transition (step S2605 in FIG. 26).

(11) In the event that no state transition query is received from the main system within the certain time, the arbitrating device 2330 will timeout. In this case, the arbitrating device 2330 performs processing as to the state transition query from the sub system (YES at step S2606 in FIG. 26).

(12) First, the arbitrating device 2330 gives a stop instruction to the first database server 1310 which is the main system (step S2607 in FIG. 26). Then, (13) the arbitrating device 2330 gives a promoted main system instruction to the second database server 1320 which is the sub system (step S2609 in FIG. 26). Thereupon, (14) the arbitrating device 2330 sets the state transition instruction completed flag 2332 to "valid" (step S2610 in FIG. 26).

(15) The second database server 1320 which has received the promoted main system instruction from the arbitrating device 2330 sets the system state information 1321 to the promoted main system operation state (step S1708 in FIG. 17). Thereafter, the second database server 2320 transitions to the promoted main system operation state. Further, (16) the second database server 1320 sets the update inhibition flag 322 to "invalid" (step S1709 in FIG. 17). Hereafter, the database storage device 321 can be updated at the second database server 1320.

(17) The second database server 1320 makes notification to the arbitrating device 2330 to the effect that the system state is the promoted main system operation state, by the state notification performed periodically.

(18) Upon receiving the state notification from the second database server 1320 which is the sub system (YES at step S2404 in FIG. 24), the arbitrating device 2330 stores the system state of the second database server 1320 in the system state table 1331 (step S2405 in FIG. 24). For example, upon receiving a state notification from the second database server 1320 to the effect of being in the promoted main system operation state, the arbitrating device 2330 updates the information in the system state table 1331 regarding the second database server 1320 from the sub system standby state to the promoted main system operation state.

Figure 30:
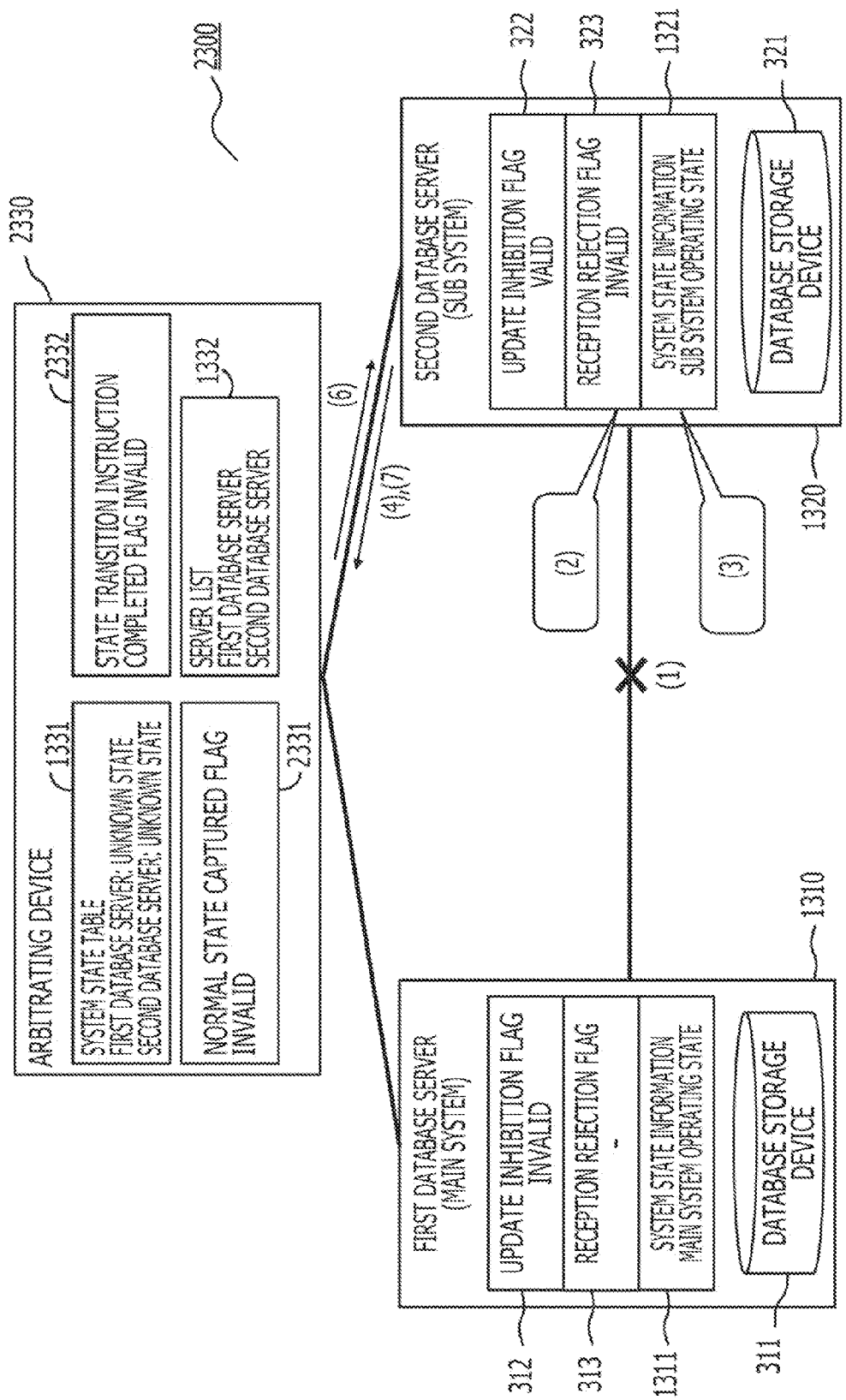
FIG. 30 is a diagram for describing processing at the time of startup of the database system according to the fourth embodiment.

FIG. 30 is a diagram for describing the operations of the database system 2300 according to the present embodiment at startup. Note that (1) through (7) in FIG. 30 correspond to the (1) through (7) below.

Upon starting up, the arbitrating device 2330 initializes the system state table 1331 to "unknown state" (step S2401 in FIG. 24). Accordingly, the system state table 1331 stores that the first database server 1310 is in the unknown state and also that the second database server 1320 is in the unknown state.

(1) At this time, let us say that a line breakage occurs in the network communicably connecting between the first database server 1310 and the second database server 1320. (2) Upon detecting the abnormality such as a line break on the network, the second database server 1320 which is the sub system sets the reception rejection flag 323 to "valid" (step S1606 in FIG. 16). Further, (3) the second database server 1320 changes the system state information 1321 from "sub system operation state" to "sub system standby state" (step S1607 in FIG. 16). Then, (4) the second database server 1320 makes a state transition query to the arbitrating device 2330 (step S1608 in FIG. 16).

(5) Upon receiving the state transition query from the second database server 1320 which is the sub system (NO at step S2409 in FIG. 24), the arbitrating device 2330 evaluates the first database server 1310 which is the main system (step S2604 in FIG. 26).

(6) Now, since the first database server 1310 is described as being in the "unknown state" in the system state table 1331 (YES at step S2602 in FIG. 26), the arbitrating device 2330 makes notification to the sub system that a state transition instruction is impossible (step S2603 in FIG. 26).

Figure 31:
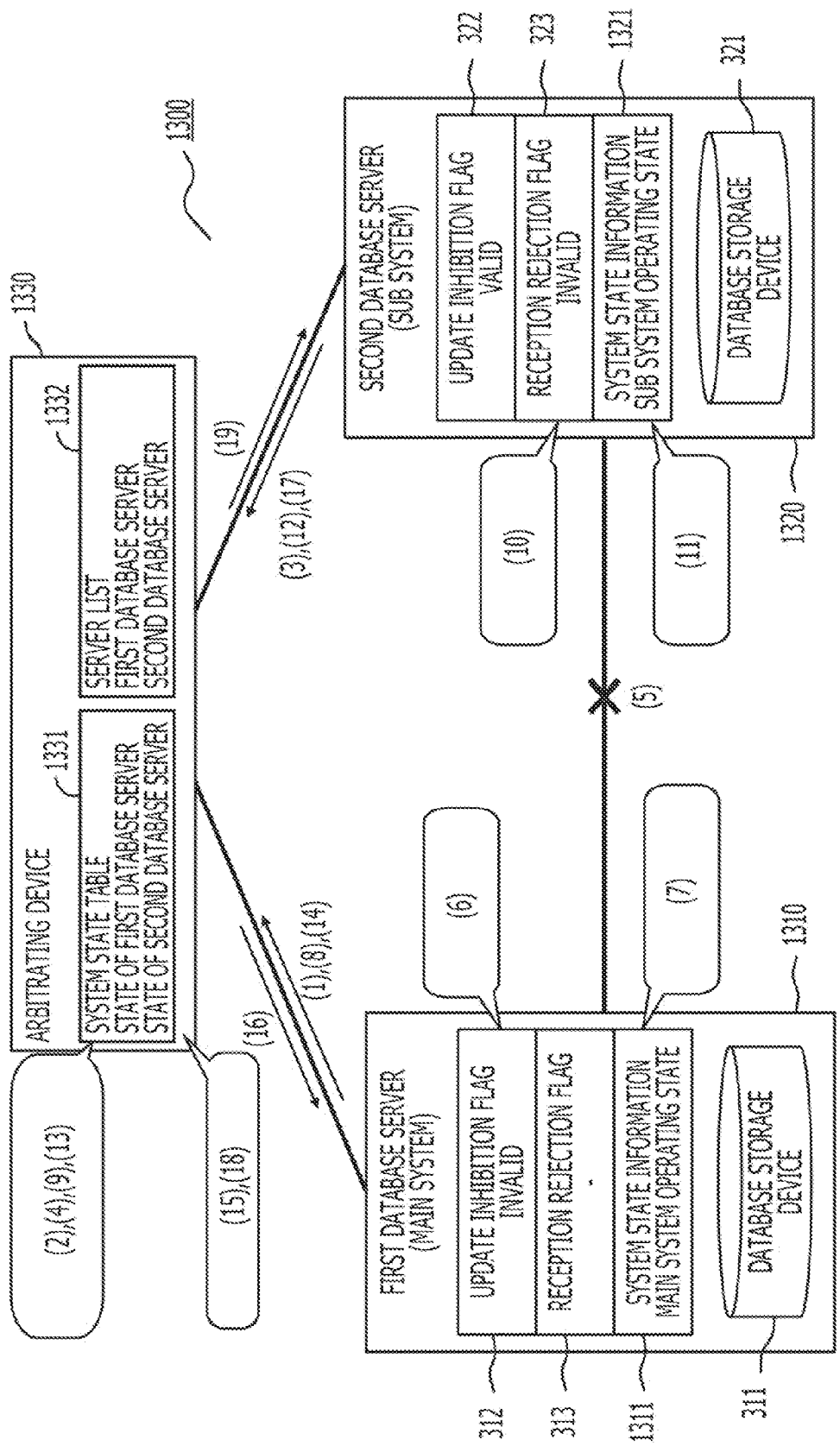

Due to the above-described processing, in a case such as illustrated in FIG. 31, i.e., in a case wherein an abnormality such as a line break on the network is detected, a situation wherein the database system 2300 overreacts and stops both systems of the main system and sub system can be prevented. Note that FIG. 31 illustrates an example of problems which the database system 2300 can solve, and does not imply that only the problem illustrated in FIG. 31 can be solved. It is needless to say that, for example, the advantages illustrated in the second and third embodiments can also be had.

FIG. 31 is a diagram for describing a problem in which both systems of the database system 1300 stop due to an abnormality such as a line break on the network. (1) through (18) in FIG. 31 correspond to the (1) through (18) below.

(1) The first database server 1310 which is the main system performs state notification to the arbitrating device 1330 periodically. The first database server 1310 in FIG. 31 performs state notification to the arbitrating device 1330 to the effect of being in the main system operating state, since the system state information 1311 shows the main system operating state.

(2) Upon receiving state notification from the first database server 1310 which is the main system (YES at step S1804 in FIG. 18), the arbitrating device 1330 stores the system state of the first database server 1310 to be held in the system state table 1331 (step S1805 in FIG. 18). For example, upon receiving state notification from the first database server 1310 to the effect of being in the main system operating state, the arbitrating device 1330 stores in the system state table 1331 that the first database server 1310 is in the main system operating state.

(3) The second database server 1320 which is the sub system performs state notification to the arbitrating device 1330 periodically. The second database server 1320 in FIG. 31 performs state notification to the arbitrating device 1330 to the effect of being in the sub system operating state, since the system state information 1321 shows the sub system operating state.

(4) Upon receiving state notification from the second database server 1320 which is the sub system (YES at step S1804 in FIG. 18), the arbitrating device 1330 stores the system state of the second database server 1320 to be held in the system state table 1331 (step S1805 in FIG. 18). For example, upon receiving state notification from the second database server 1320 to the effect of being in the sub system operating state, the arbitrating device 1330 stores in the system state table 1331 that the second database server 1320 is in the sub system operating state.

(5) Now, we will say that line breakage occurs in the network communicably connecting between the first database server 1310 and the second database server 1320. (6) Upon detecting an abnormality such as line breakage or the like in the network, the first database server 1310 sets the update inhibition flag 312 to "valid" (step S1604 in FIG. 16). Then, (7) the first database server 1310 sets the system state information 1311 to the main system standby state (step S1605 in FIG. 16).

(8) Now, the first database server 1310 periodically performs state notification. In the event of performing state notification at this timing, the first database server 1310 performs state notification to the arbitrating device 1330 to the effect of being in the main system standby state.

(9) Upon receiving the state notification from the first database server 1310 which is the main system (YES at step S1804 in FIG. 18), the arbitrating device 1330 stores the system state of the first database server 1310 in the system state table 1331 (step S1805 in FIG. 18). For example, in the event of receiving state notification from the first database server 1310 to the effect of being in the main system standby state, the arbitrating device 1330 updates the information in the system state table 1331 regarding the first database server 1310 from the main system operation state to the main system standby state.

(10) On the other hand, in the event of detecting an abnormality such as a line breakage or the like in the network, the second database server 1320 which is the sub system sets the reception rejection flag 323 to "valid" (step S1606). Then,

(11) the second database server 1320 sets the system state information 1321 to the sub system standby state (step S1607 in FIG. 16).

(12) The second database server 1320 periodically performs state notification. In the event of performing state notification at this timing, the second database server 1320 performs state notification to the arbitrating device 1330 to the effect of being in the sub system standby state.

(13) Upon receiving the state notification from the second database server 1320 which is the sub system (YES at step S1804 in FIG. 18), the arbitrating device 1330 stores the system state of the second database server 1320 in the system state table 1331 (step S1805 in FIG. 18). For example, in the event of receiving state notification from the second database server 1320 to the effect of being in the sub system standby state, the arbitrating device 1330 updates the information in the system state table 1331 regarding the second database server 1320 from the sub system operation state to the sub system standby state.

(14) Now, we will say that the first database server 1310 makes a state transition query to the arbitrating device 1330 before the second database server 1320 (step S1608 in FIG. 16).

(15) Upon receiving the state transition query from the first database server 1310 which is the main system, the arbitrating device 1330 refers to the system state table 1331 and evaluates the second database server 1320 which is the sub system (step S1904).

Now, information in the system state table 1331 regarding the second database server 1320 is the sub system standby state (from step S1904 to S1908). Accordingly, (16) the arbitrating device 1330 gives a stop instruction to the second database server 1320 which is the sub system (step S1908 in FIG. 19). The arbitrating device 1330 then gives an accumulating main system instruction to the first database server 1310 which is the main system (step S1909 in FIG. 19).

(17) In the event that the second database server 1320 makes a state transition query to the arbitrating device 1330 (NO at step S1807 in FIG. 18) at the same time, (18) the arbitrating device 1330 evaluates the second database server 1320 which is the main system (step S2004 in FIG. 20).

Now, information in the system state table 1331 regarding the first database server 1310 is the accumulating main system operation state (from step S2004 to S2012 in FIG. 20). Accordingly, (19) the arbitrating device 1330 gives a stop instruction to the second database server 1320 which is the sub system (step S2012 in FIG. 12).

As described above, with the database system 1300, the first database server 1310 receives the (16) stop instruction from the arbitrating device 1330 and stops. In the same way, the second database server 1320 also receives the (19) stop instruction from the arbitrating device 1330 and stops. Thus, in the event of detecting an abnormality such as a line breakage or the like in the network, the database system 1300 overreacts and stops both systems of the main system and sub system.

On the other hand, the database system 2300 according to the present embodiment has the normal state captured flag 2331 indicating whether or not a normal state has been detected, and the state transition instruction completed flag 2332 indicating whether or not there is a state transition instruction to each of the systems. Upon detecting a normal state, the arbitrating device 2330 sets the normal state captured flag 2331 to "valid" (step S2407). Also, upon giving a state transition instruction to the systems, the arbitrating device 2330 sets the state transition instruction completed flag 2332 to "valid" (steps S2508, S2512, S2610, S2614 in FIGS. 25 and 26).

In the event that the normal state captured flag 2331 and state transition instruction completed flag 2332 are set to "valid", upon receiving a state transition query from the main system when the sub system is in the sub system standby state (YES at step S2509 in FIG. 25), the arbitrating device 2330 only gives a stop instruction to the main system (step S2513 in FIG. 25).

Also, in the event that the normal state captured flag 2331 and state transition instruction completed flag 2332 are set to "valid", upon receiving a state transition query from the sub system when the main system is in the main system standby state (YES at step S2611 in FIG. 26), the arbitrating device 2330 only gives a stop instruction to the sub system (step S2615 in FIG. 26).

As a result, in the event of detecting an abnormality such as a line breakage or the like in the network, a situation wherein the database system 2300 overreacts and stops both systems of the main system and sub system, such as illustrated in FIG. 31, can be prevented.

FIG. 32 is a diagram illustrating a specific configuration example of a device realizing the first database server, second database server, and arbitrating device according to the second through fourth embodiments.

An information processing device 3200 in FIG. 32 includes a CPU 3201, memory 3202, an input device 3203, an output device 3204, an external recording device 3205, a media drive 3206, and a network connection device 3208, with these devices being connected to a bus so as to be capable of mutually exchanging data.

The CPU 3201 executes a program for realizing the arbitrating device and first database server or second database server according to the present embodiment, besides executing programs (drivers) for controlling peripheral devices and executing various types of software. The memory 3202 is volatile memory used for executing programs. For example, RAM or the like can be used as the memory 3202. Also, the input device 3203 is external data input means. For example, a keyboard and mouse or the like can be used as the input device 3203.

The external recording device 3205 records programs for realizing the arbitrating device and first database server or second database server according to the present embodiment, as well as programs necessary for the information processing device 3200 to operate. For example, a magnetic disc device or the like can be used.

The media drive 3206 outputs the data of the memory 3202 and external recording device 3205 to detachable recording media 3207, and reads out programs, data, and the like, from the detachable recording media 3207. Examples of the detachable recording media 3207 include storage media such as floppy disks, MO discs, CD-Rs, DVD-Rs, and so forth.

The network connection device 3208 is an interface for communicably connecting with other information processing devices and the like via network.

Note that in the first through third embodiments, the first database server, second database server, and arbitrating device, and the components in FIG. 32 have been described in a correlated manner, so that the correlation of the components can be clearly understood. However, it is needless to say that the first database server, second database server, and arbitrating device in the first through third embodiments are each independent devices.

Also, FIG. 32 illustrates a configuration example, and does not illustrate all necessary components. The first database server, second database server, and arbitrating device according to the second through fourth embodiments can be realized using just necessary components as appropriate.

All examples and conditional language recited herein are intended for pedagogical purposes to aid the reader in understanding the principles of the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. A database control system comprising:
  a first server apparatus including:
    a first processor configured to:
      perform a first update process for a first database; and
      in response to detecting an error in a communication between the first server apparatus and a second server apparatus, inhibit the first update process and send a first request to an arbitrating apparatus;
    a memory configured to store first state information indicating one of:
      a first operation state in which the first update process is being operated,
      a first standby state in which the first update process is being inhibited and awaiting instruction for resuming from a third processor, and
      an accumulating state in which the result of the first update process is not received by a second processor and the first update process is being operated;
  the second server apparatus including:
    the second processor which is configured to:
      perform a second update process for a second database, which is a redundant database of the first database; and
      in response to detecting the error, send a second request to the arbitrating apparatus;
    a memory configured to store second state information indicating one of:
      a second operation state in which the second update process is being operated,
      a second standby state in which the second update process is being stopped and awaiting instruction from the third processor, and
      a promoted state in which the second update process is being operated; and
  the arbitrating apparatus including:
    the third processor which is configured to:
      manage the first state information and the second state information, receive the second request that is sent from the second server in response to detecting the error,
      transmit to the first server a first instruction for shutting down based on the second request,
      set the second standby state for the second server based on the second request,
      transmit to the second server a second instruction for transitioning to the promoted state based on the second request,
      set a parameter indicating that the second instruction has been transmitted based on the second request, and
      transmit the first instruction to the first server based on the parameter when receiving the first request from the first server before receiving updated second state information from the second server, the updated second state information indicating an operation state of the second server is the promoted state.

2. The database control system according to claim 1, wherein
  the first update process is resumed by the arbitrating apparatus when the first request is received before the arbitrating apparatus receives the second request.

3. The database control system according to claim 1, wherein the first processor is configured to inhibit the first update process before sending the first request.

4. The database control system according to claim 1, wherein
  the first update process is performed based on instruction from a computer,
  the first processor is configured to transmit a result of the first update process to the second server apparatus with the communication,
  the second processor is configured to receive the result of the first update process transmitted by the first processor,
  the second update process is performed based on the received result of the first update process.

5. The database control system according to claim 1, wherein the second update process is inhibited in response to detecting the error.

6. The database control system according to claim 4, wherein the second update process is not performed in a case of detecting the error.

7. The database control system according to claim 4, wherein the first update process is committed after the second update process is performed.

8. The database control system according to claim 1, wherein when the error in the communication is detected, the first processor is configured to rollback the first update process which is not committed.

9. The database control system according to claim 1, wherein
  the first processor is configured to provide the first state information to the third processor,
  the second processor is configured to provide the second state information to the third processor, and the arbitrating apparatus further includes:
    a memory configured to store the first state information provided from the first processor and the second state information provided from the second processor.

10. The database control system according to claim 9, wherein
  upon detecting the error in the communication between the first server apparatus and the second server apparatus, the first state information is transitioned from the first operation state to the first standby state,
  upon detecting the error in the communication, the second state information is transitioned from the second operation state to the second standby state, and
  in accordance with the second instruction from the third processor, the second state information is transitioned from the first standby state to the promoted state.

11. A database control method comprising:
  performing a first update process for a first database;
  detecting an error in a communication between a first server apparatus and a second server apparatus;
  inhibiting the first update process when the error is detected;

sending a first request to an arbitrating apparatus;
performing a second update process for a second database, which is a redundant database of the first database;
sending a second request to the arbitrating apparatus when the error is detected;
storing first state information indicating one of:
a first operation state in which the first update process is being operated,
a first standby state in which the first update process is being inhibited and awaiting instruction for resuming, and
an accumulating state in which the result of the first update process is not received and the first update process is being operated;
storing second state information indicating one of:
a second operation state in which the second update process is being operated,
a second standby state in which the second update process is being stopped and awaiting instruction from the processor, and
a promoted state in which the second update process is being operated;
managing the first state information and the second state information;
receiving the second request that is sent from the second server apparatus in response to detecting the error;
transmitting to the first server apparatus a first instruction for shutting down based on the second request;
setting the second standby state for the second server apparatus based on the second request;
transmitting to the second server apparatus a second instruction for transitioning to the promoted state based on the second request;
setting a parameter indicating that the second instruction has been transmitted based on the second request; and
transmitting the first instruction to the first server apparatus based on the parameter when receiving the first request from the first server apparatus before receiving updated second state information from the second server apparatus, the updated second state information indicating an operation state of the second server apparatus is the promoted state.

12. The database control method according to claim 11, wherein
the first update process is resumed by the arbitrating apparatus, when the first request is received before the arbitrating apparatus receives the second request.

13. The database control method according to claim 11, wherein the first update process is inhibited before sending the first request.

14. The database control method according to claim 11, wherein the first update process is performed based on an instruction from a computer, and further comprising:
transmitting a result of the first update process to the second server apparatus with the communication,
receiving the result of the first update process, and
performing the second update process based on the result of the first update process.

15. The database control method according to claim 11, wherein the performing of the second update process is inhibited in response to detecting the error.

16. The database control method according to claim 14, wherein the second update process is not performed when the error is detected.

17. The database control method according to claim 14, wherein the first update process is committed after the second update process is performed.

18. The database control method according to claim 11, wherein when the error in the communication is detected, rolling back the first update process which is not committed.

19. The database control method according to claim 11, further comprising:
notifying the first state information to a processor; and
notifying the second state information to the processor.

20. The database control method according to claim 19, wherein
upon detecting the error in the communication, the first state information is transitioned from the first operation state to the first standby state,
upon detecting the error in the communication, the second state information is transitioned from the second operation state to the second standby state, and
in accordance with the second instruction, the second state information is transitioned from the first standby state to the promoted state.

21. An arbitrating apparatus in a system including a first apparatus including a first database and a second apparatus including a second database which is a redundant database of the first database, the arbitrating apparatus comprising:
a memory; and
a processor coupled to the memory and configured to:
perform a receiving process of a first state information from the first apparatus, a second request from the second apparatus that is sent from the second apparatus in response to detecting an error, and a second state information,
manage the first state information and the second state information,
transmit to the first apparatus a first instruction for shutting down based on the second request,
set a second standby state for the second apparatus based on the second request,
transmit to the second apparatus a second instruction for transitioning to a promoted state based on the second request,
set a parameter indicating that the second instruction has been transmitted based on the second request, and
transmit the first instruction to the first apparatus based on the parameter when receiving a first request from the first apparatus before receiving updated second state information from the second apparatus, the updated second state information indicating an operation state of the second apparatus is the promoted state,
wherein
the first apparatus inhibits a first update process and sends the first request to the arbitrating apparatus in response to detecting the error in a communication between the first apparatus and the second apparatus,
the second apparatus sends the second request to the arbitrating apparatus in response to detecting the error,
the first state information indicates one of:
a first operation state in which the first update process is being operated,
a first standby state in which the first update process is being inhibited and awaiting instruction for resuming from the arbitrating apparatus, and
an accumulating state in which the result of the first update process is not received by the second apparatus and the first update process is being operated, and the second state information indicates one of:
a second operation state in which a second update process is being operated, the second standby state in which the second update process is being stopped and awaiting instruction from the arbitrating apparatus, and the promoted state in which the second update process is being operated.

* * * * *